United States Patent [19]
Tanahashi et al.

[11] Patent Number: 6,008,156
[45] Date of Patent: Dec. 28, 1999

[54] HEAT SENSITIVE COLOR DEVELOPING MATERIAL AND HEAT SENSITIVE ELEMENT USING THE SAME

[75] Inventors: Ichiro Tanahashi, Hirakata; Takao Tohda, Ikoma; Hiroshi Kanno, Sakai, all of Japan

[73] Assignee: Matsushita Electric Industrial Co., Ltd., Osaka, Japan

[21] Appl. No.: 08/930,545

[22] PCT Filed: Jan. 30, 1997

[86] PCT No.: PCT/JP97/00210

§ 371 Date: Dec. 5, 1997

§ 102(e) Date: Dec. 5, 1997

[87] PCT Pub. No.: WO97/28228

PCT Pub. Date: Aug. 7, 1997

[30] Foreign Application Priority Data

| Feb. 1, 1996 | [JP] | Japan | 8-016324 |
| Jun. 20, 1996 | [JP] | Japan | 8-159370 |
| Jul. 12, 1996 | [JP] | Japan | 8-183003 |
| Oct. 4, 1996 | [JP] | Japan | 8-264282 |

[51] Int. Cl.$^6$ .................................................. B41M 5/26
[52] U.S. Cl. ............... 503/207; 106/31.23; 427/150; 503/201; 503/206; 503/214
[58] Field of Search ................. 503/200, 201, 503/207, 226, 206, 214; 106/31.23; 427/150

[56] References Cited

U.S. PATENT DOCUMENTS

| 4,954,327 | 9/1990 | Blount | 423/338 |
| 5,061,355 | 10/1991 | Rose, Jr. | 204/182.8 |

FOREIGN PATENT DOCUMENTS

| 60-171191 | 9/1985 | Japan | 503/201 |
| 61-110585 | 5/1986 | Japan | 503/201 |
| 6-24148 | 2/1994 | Japan | 503/201 |
| 6-312581 | 11/1994 | Japan | 503/201 |
| 7-149057 | 6/1995 | Japan | 503/201 |
| 62-68789 | 3/1997 | Japan | 503/201 |
| WO 94/16361 | 7/1994 | WIPO | 503/201 |

*Primary Examiner*—Bruce H. Hess
*Attorney, Agent, or Firm*—Ratner & Prestia

[57] ABSTRACT

A thermal-sensitive color developing material containing metal particles and a matrix substance where the size of the metal particles irreversibly increase at room temperature due to cohesion, and a thermal-sensitive element using the thermal-sensitive color developing material are disclosed. The thermal-sensitive color developing material irreversibly develops a color at a temperature of room temperature or higher.

51 Claims, 12 Drawing Sheets

HEAT SENSITIVE COLOR DEVELOPING MATERIAL AND HEAT SENSITIVE ELEMENT USING THE SAME

THIS APPLICATION IS A U.S. NATIONAL PHASE APPLICATION OF PCT INTERNATIONAL APPLICATION PCT/JP97/00210.

TECHNICAL FIELD

The present invention relates to a thermal-sensitive color developing material and a thermal-sensitive element using the same, and more particularly, the present invention relates to a thermal-sensitive color developing material which develops a color at room temperature due to surface plasmon absorption of metal particles, and a thermal-sensitive element using the same. The present invention further relates to methods for producing the thermal-sensitive color developing material and the thermal-sensitive element.

BACKGROUND ART

Conventionally, various thermal-sensitive color developing materials that develop a color upon heat application, and various thermal-sensitive elements using the same are known. For example, Japanese Laid-Open Publication No. 7-149057 discloses a thermal-sensitive element 150 shown in FIG. 15 in which an air layer 154 and an organic layer 153 are sequentially provided on a colored layer 155. The organic layer 153 contains a material which reversibly changes the scattering of light depending on the temperature. Specifically, such a material is made of a resin (e.g., a vinyl chloride resin) and a low molecular weight organic substance dispersed therein. The low molecular weight organic substance may be a material which reversely changes between a transparent state and an opaque state depending on the temperature. Such a low molecular weight organic substance is usually transparent at room temperature and becomes opaque at a temperature of about 70–80° C. or higher. Accordingly, in such a thermal-sensitive element 150, when the organic layer 153 is in the transparent state at a predetermined temperature, the color of the colored layer 155 is identifiable through the organic layer 153. Furthermore, when the organic layer 153 is in the opaque state at a temperature different from the above-mentioned predetermined temperature, the color of the colored layer 155 is screened by the organic layer 153, thereby the color being unidentifiable through the organic layer 153. The thermal-sensitive element having such a structure can be utilized as a display element which changes its color tones depending on the temperature by using a mechanism of transmitting and screening the color of the colored layer 155 by the organic layer 153.

However, since the above-described thermal-sensitive element 150 utilizes transition between the transparent state and the opaque state of the organic layer 153 depending on the temperature, it is extremely difficult to color the whole thermal-sensitive element in various colors and moreover, a colored layer must always be provided. In addition, since the transparent/opaque states of the low molecular weight organic substance used in the thermal-sensitive element 150 reversibly transit depending on the temperature, the thermal-sensitive element 150 may be preferably used, for example, as a display element which changes its color tones depending on the temperature. However, it cannot be used as an element for displaying temperature history indicating that the temperature has once risen to induce the opaque state, and thereafter fallen to recover the transparent state. Furthermore, in such a thermal-sensitive element 150, since the transition to the opaque state initiates at a relatively high temperature, a change in the temperature cannot be checked in the case where a product, such as a frozen food or a drug, that usually needs to be stored at a relatively low temperature (for example, about −20° C. to about 4° C.) has been exposed, e.g., to about room temperature.

Japanese Laid-Open Publication No. 61-110585 discloses a thermal-sensitive element having a thermal-sensitive color developing layer and a protective layer sequentially provided on a support. The thermal-sensitive color developing layer which contains a leuco pigment, developer and a zirconium compound, reversibly develops color at a temperature of about 50° C. or higher. As is the case of the above-described thermal-sensitive element, such a thermal-sensitive element, too, cannot be used as an element for displaying temperature history indicating that the temperature has once risen to induce a colorless state, and thereafter fallen to recover the color developed state.

Japanese Laid-Open Publication No. 60-171191 discloses a packaging material provided with a thermal-sensitive portion which can be subjected to thermal printing at the time of shipping or distribution of a packaged item. Such a packaging material is fabricated by applying, printing or adhering a thermal-sensitive color changing material as a thermal-sensitive portion on a surface of a packaging film (for example, polypropylene).

However, since the color of the above-described thermal-sensitive color changing material changes only when exposed at a high temperature (for example, about 200° C.), a change in the temperature cannot be checked in the case where a product, such as a frozen food or a drug, that needs to be stored at a relatively low temperature has been exposed, e.g., to about room temperature.

DISCLOSURE OF INVENTION

A thermal-sensitive color developing material according to the present invention contains metal particles and a matrix substance. The size of the metal particles irreversibly increases at room temperature due to cohesion.

In a preferred embodiment, the metal particles are made of at least one metal selected from the group consisting of gold, platinum, silver, copper, tin, rhodium, palladium and iridium.

In a preferred embodiment, the matrix substance is selected from the group consisting of an inorganic substance, an inorganic/organic composite and a resin. The inorganic substance is formed of at least one inorganic alkoxide which contains silicon, aluminum or titanium; the inorganic/organic composite is formed of a composite-forming material which contains at least one inorganic composite-forming component and at least one organic composite-forming component. The inorganic composite-forming component is formed of an inorganic alkoxide which contains silicon, aluminum, or titanium and the organic composite-forming component is selected from the group consisting of a polyacrylic acid, a polyacrylate and a polyethylene oxide; and the resin is formed of a matrix-forming resin selected from the group consisting of a polyvinyl alcohol, a polyvinyl butyral, a polystyrene, an acrylonitrile-styrene copolymer and a fluorocarbon resin.

A method for producing a thermal-sensitive color developing material according to the present invention includes the steps of: preparing a mixture containing a metal ion, an α-hydrogen-containing alcohol and a matrix-forming material; and irradiating the mixture with UV light.

In a preferred embodiment, the above-mentioned an a-hydrogen-containing alcohol is a dihydric alcohol selected from the group consisting of ethylene glycol and propylene glycol.

In a preferred embodiment, the metal ion is selected from the group consisting of gold ion, platinum ion, silver ion, copper ion, tin ion, rhodium ion, palladium ion and iridium ion.

In a preferred embodiment, the matrix-forming material is formed of at least one inorganic alkoxide which contains silicon, aluminum, or titanium.

In a preferred embodiment, the matrix-forming material is a composite-forming material, which contains at least one inorganic composite-forming component and at least one organic composite-forming component. The inorganic composite-forming component is formed of an inorganic alkoxide which contains silicon, aluminum or titanium and the organic composite-forming component is selected from the group consisting of a polyacrylic acid, a polyacrylate and a polyethylene oxide.

In a preferred embodiment, the matrix-forming material is a matrix-forming resin selected from the group consisting of a polyvinyl alcohol, a polyvinyl butyral, a polystyrene, an acrylonitrile-styrene copolymer and a fluorocarbon resin.

A first thermal-sensitive element according to the present invention is provided with a base substrate and a thermal-sensitive color developing material held by the base substrate. The thermal-sensitive color developing material contains metal particles and a matrix substance. The size of the metal particles irreversibly increases at room temperature due to cohesion.

In a preferred embodiment, the metal particles and the matrix substance are the same as those contained in the thermal-sensitive color developing material according to the present invention.

In a preferred embodiment, the thermal-sensitive color developing material is placed directly on the base substrate as a color developing layer or is placed on the base substrate as a color development layer via an adhesive layer.

In a more preferred embodiment, the base substrate is a sheet or a plate that is made from at least one material selected from the group consisting of a metal film, a plastic film, fabric, paper and glass.

In a preferred embodiment, the thermal-sensitive color developing material is impregnated in the base substrate.

In a still preferred embodiment, the base substrate is a sheet made from at least one material selected from the group consisting of fabric, paper, a metal film having a plurality of pores and a plastic film having a plurality of pores.

In a preferred embodiment, the thermal-sensitive color developing material forms color developing regions held by a plurality of regions of the base substrate. Each of the color developing regions contains the metal particles, where the concentrations of the metal particles being different in the different color developing regions.

In a preferred embodiment, the thermal-sensitive color developing material forms color developing regions held by a plurality of regions of the base substrate. Each of the color developing regions contains the metal particles, where the average particle diameters of the metal particles being different in the different color developing regions.

In a preferred embodiment, the thermal-sensitive color developing material forms color developing regions held by a plurality of regions of the base substrate.

Each of the thermal-sensitive color developing materials contains the matrix substance and the metal particles, where different drying conditions for forming the matrix substance and the metal particles are employed for different color development regions.

In a preferred embodiment, a first thermal-sensitive element according to the present invention is provided with a light-shielding layer for preventing the above-mentioned thermal-sensitive color developing material from developing a color by exposure to light.

A method for producing the first thermal-sensitive element according to the present invention includes the steps of: preparing a mixture containing a metal ion, an a-hydrogen-containing alcohol and a matrix-forming material; making the mixture to be held by the base substrate; and irradiating the mixture held by the base substrate with UV light so as to form the thermal-sensitive color developing material.

In a preferred embodiment, the metal ion, the α-hydrogen-containing alcohol and the matrix-forming material are the same as those used in the method for producing the thermal-sensitive color developing material according to the present invention.

In a preferred embodiment, the base substrate is a sheet or a plate made of at least one material selected from the group consisting of a metal film, a plastic film, fabric, paper and glass.

In a preferred embodiment, the above-mentioned mixture is held by the above-mentioned base substrate by a painting method, a spin coating method or an immersion method.

In a preferred embodiment, the method further includes a step of placing a light-shielding layer for preventing the above-mentioned thermal-sensitive color developing material from developing a color by exposure to light.

In a preferred embodiment, a second thermal-sensitive element according to the present invention is provided with a base substrate containing metal particles. The size of the metal particles irreversibly increases at room temperature due to cohesion.

In a preferred embodiment, the metal particles are made of a metal selected from the group consisting of gold, platinum, silver, copper, tin, rhodium, palladium and iridium.

In a preferred embodiment, the base substrate is a sheet made of at least one material selected from the group consisting of paper, fabric and a porous material.

A method for producing the second thermal-sensitive element according to the present invention includes the steps of: preparing a mixture containing a metal ion and an α-hydrogen-containing alcohol;

impregnating the mixture into the base substrate; and irradiating the mixture impregnated in the base substrate with UV light so as to form the metal particles.

In a preferred embodiment, the metal ion and the α-hydrogen-containing alcohol are the same as those used in the method for producing the thermal-sensitive color developing material according to the present invention.

In a preferred embodiment, the base substrate is a sheet or a plate made of at least one material selected from the group consisting of paper, fabric and a porous material.

Thus, the present invention can provide the advantages of:

(1) providing a thermal-sensitive color developing material which can be used to check a change in the temperature in the case where a product, such as a frozen food or a drug, that needs to be stored at a relatively low temperature (for example, about −20° C. to about 4° C.) has been exposed at about room temperature, and a thermal-sensitive element using the same;

(2) providing a thermal-sensitive color developing material which irreversibly develops a color depending on the temperature such that a temperature history can be checked, and a thermal-sensitive element using the same; and (3) providing a thermal-sensitive color developing material having a higher contrast which is physically and chemically stable and optically transparent over a wide range of wavelength region before color development, and a thermal-sensitive element using the same; and (4) providing a thermal-sensitive element which does not require an additional colored layer and is flexible and capable of being molded into various shapes.

These and other advantages of the present invention will become apparent to those skilled in the art upon reading and understanding the following detailed description with reference to the accompanying figures.

BRIEF DESCRIPTION OF THE DRAWINGS

FIG. 4A is a schematic view where the thermal-sensitive color developing material according to the present invention is stored in a dark place at a relatively low temperature (for example, 0° C. or lower) before heat application; and FIG. 4B is a schematic view of a thermal-sensitive color developing material according to the present invention in which the metal particles have cohered after the heat application;

FIG. 8A shows an example where the thermal-sensitive element according to the present invention is stored in a dark place at a relatively low temperature (for example, 0° C. or lower) before heat application; and FIG. 8B shows an example of the thermal-sensitive element according to the present -invention in which the metal particles have cohered after the heat application;

FIG. 10A and 11B are perspective views each showing an example of a thermal-sensitive element according to the present invention, in which thermal-sensitive color developing materials having different thermal-sensitive characteristics are provided on a base substrate. FIG. 11B shows an example of the thermal-sensitive element according to the present invention which has developed a color due to cohesion of the metal particles after the heat application;

FIG. 12A shows a step of applying a mixture containing a metal ion to a base substrate, thereby obtaining a laminated body; FIG. 12B shows a step of irradiating the laminated body with a light beam (hv); and FIG. 12C shows the thermal-sensitive element according to the present invention obtained through the above-mentioned steps shown in FIG. 12A and 12B;

FIG. 13A shows a step of applying a mixture containing a metal ion to a base substrate, thereby obtaining a laminated body; FIG. 13B shows a step of irradiating the laminated body with different light beams (hvand hv'); and FIG. 13C shows the thermal-sensitive element according to the present invention obtained through the above-mentioned steps shown in FIGS. 13A and 13B;

FIG. 14A shows a laminated body obtained by applying a mixture containing a metal ion to a base substrate and then drying under different conditions; FIG. 14B shows a step of irradiating the laminated body with light (hv); and FIG. 14C shows a thermal-sensitive element according to the present invention obtained through the above-mentioned steps shown in FIGS. 14A and 14B.

BEST MODE FOR CARRYING OUT THE INVENTION

<Thermal-sensitive Color Developing Material>

Hereinafter, a thermal-sensitive color developing material according to the present invention will be described.

The thermal-sensitive color developing material according to the present invention contains metal particles and a matrix substance. Herein, the term "color development" includes the state where a color tone of a material changes from colorless to a predetermined color, or from a predetermined color to a different predetermined color.

The metal particles used in the present invention develop a color based on surface plasmon absorption resulting from an irreversible increase in the size of the metal particles due to cohesion which will be described later and are made of a metal with a relatively high purity such that they are hardly affected by oxygen or other impurities which cause oxidation or reduction.

Typically, the metal particles are made of at least one metal selected from the group consisting of gold, platinum, silver, tin, rhodium, palladium and iridium.

Figure 1:
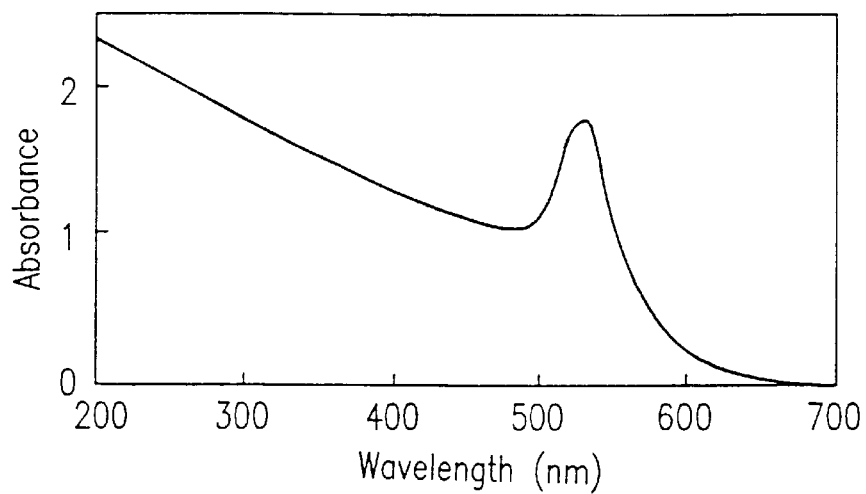
FIG. 1 is a surface plasmon absorption spectrum obtained in the case where gold is used as the metal particles in the present invention.
Figure 2:
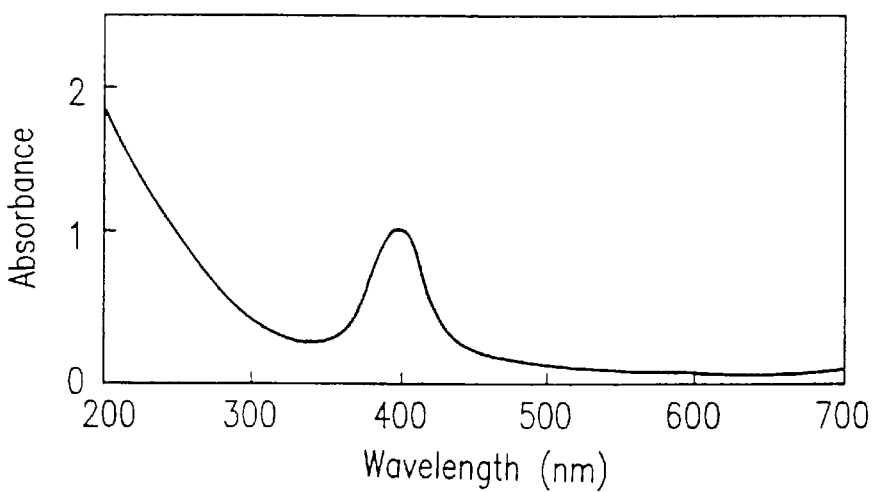
FIG. 2 is a surface plasmon absorption spectrum obtained in the case where silver is used as the metal particles in the present invention.
Figure 3:
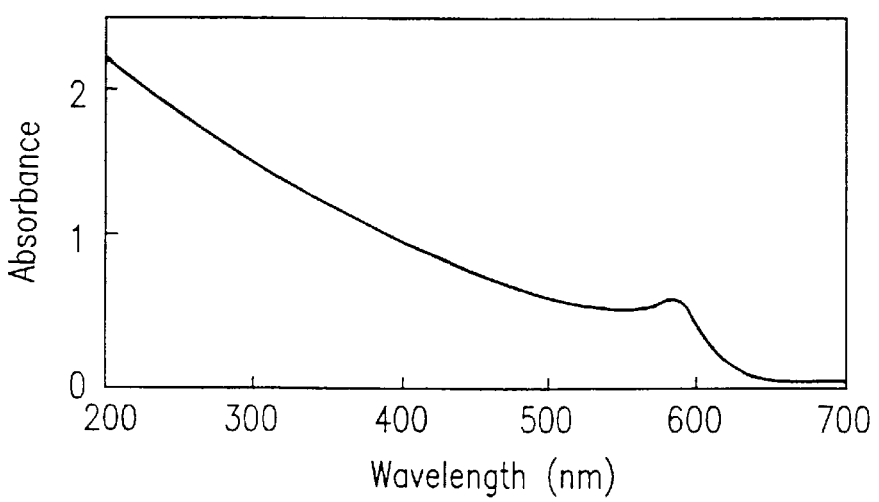
FIG. 3 is a surface plasmon absorption spectrum obtained in the case where copper is used as the metal particles in the present invention.

As shown in FIG. 1, since metal particles made of gold have a steep peak at about 530 nm based on surface plasmon absorption caused by cohesion, a thermal-sensitive color developing material containing gold particles according to the present invention exhibits brilliant color tones ranging from purple to red upon color development. As shown in FIG. 2, since metal particles made of silver have a peak at about 400 nm based on surface plasmon absorption caused by cohesion, a thermal-sensitive color developing material containing silver particles according to the present invention exhibits a brown color tone upon color development. As shown in FIG. 3, since metal particles made of copper have a peak at about 590 nm based on surface plasmon absorption caused by cohesion, a thermal-sensitive color developing material containing copper particles according to the present invention exhibits a light green color tone upon color development. Therefore, gold is preferably used as the metal forming the metal particles used in the present invention since it is easier to observe the color tone of the thermal-sensitive color developing material upon cohesion of the metal particles. Gold is also known to be chemically stable by itself as compared to the above-mentioned metals.

Although the content of the metal particles varies depending on a type of metal used, it is preferably about 0.01 wt % to about 20 wt %, and more preferably about 0.05 wt % to about 10 wt % based on the total weight of the thermal-sensitive color developing material. Such a content allows a particle diameter to be easily controlled and prevents the metal particles from cohering independent from heat application. When the content of the metal particles is lower than 0.01 wt %, even if heat of a later-described temperature is applied to the thermal-sensitive color developing material, the particles may not cohere to a size sufficient to develop a color (i.e., to visualize a color). When the content of the metal particles exceeds 20 wt %, the metal particles tend to cohere independent from the heat application and the thermal-sensitive color developing material may partially develop a color.

According to the present invention, the metal particles cohere at room temperature and irreversibly increase the size thereof. Herein, the term "room temperature" indicates any temperature in a range of about 10° C. to about 40° C. In general, such metal particles may start to irreversibly increase their size at a temperature of about −100° C. or higher. However, in fact, the thermal-sensitive color developing material according to the present invention develops a color in accordance with the increase in the size of the metal particles preferably at a temperature of about 5° C. or higher, and more preferably at room temperature or higher (although this may vary depending on the time of the heat application at the selected temperature).

A matrix substance used in the present invention which allows uniform dispersion of the metal particles therein, is physically and chemically stable and is optically transparent over a wide range of wavelength region. Examples of such a matrix substance include an inorganic substance, an inorganic/organic composite and a resin.

An inorganic substance used as the matrix substance is formed of at least one inorganic alkoxide which contains silicon, aluminum or titanium. Such an inorganic substance contains at least one gel selected from the group consisting of silica gel, alumina gel and titania gel.

The inorganic/organic composite is formed of a composite-forming material which contains at least one inorganic composite-forming component and at least one organic composite-forming component. Examples of the inorganic composite-forming component include an inorganic alkoxide which contains silicon, aluminum or titanium. Examples of the organic composite-forming component include a polyacrylic acid, a polyacrylate and a polyethylene oxide. The inorganic/organic composite used as the matrix substance is considered to have a structure in which the organic composite-forming component is adsorbed to a gel resulting from hydrolysis of the inorganic composite-forming component (see K. Nakanishi, "Gelation of organic/inorganic composite system", Abstract of Izumi Forum Workshop (1992), pp.15–16)

Examples of the resin include a matrix-forming resin selected from the group consisting of a polyvinyl alcohol, a polyvinyl butyral, a polystyrene, an acrylonitrile-styrene copolymer and a fluorocarbon resin. The fluorocarbon resin is preferable for obtaining a transparent matrix substance with an excellent mechanical strength. When a resin is used as the matrix substance, the thermal-sensitive color developing material may preferably contain a stabilizer for providing protection for the metal ions forming the metal particles. Examples of such a stabilizer include polyvinylpyrrolidone. The content of the stabilizer is preferably about 0.01 wt % to about 3 wt % based on the total weight of the thermal-sensitive color developing material.

Among the inorganic substance, the inorganic/organic composite and the resin, silica gel which is physically and chemically stable and which is easy to form, is especially preferable to be used as the matrix substance used in the present invention.

Figure 4A:
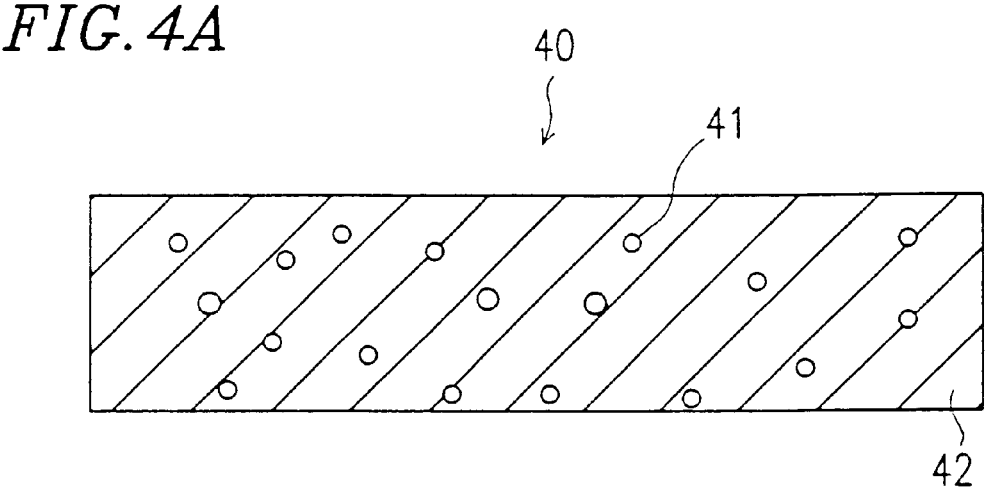
FIGS. 4A and 4B are schematic views illustrating a mechanism of a thermal-sensitive color developing material according to the present invention for developing a color due to cohesion of the metal particles contained therein upon heat application.
Figure 4B:
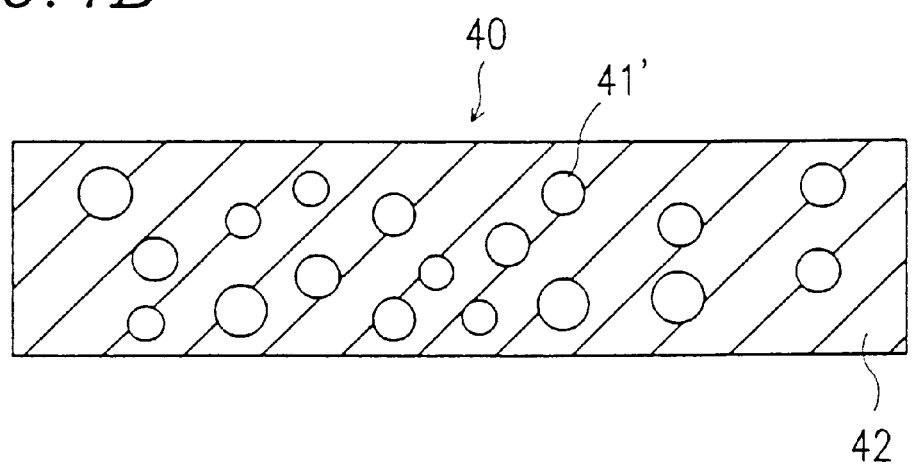

Generally, when a thermal-sensitive color developing material 40 according to the present invention is placed in a dark place at a relatively low temperature (e.g., 0° C. or lower), particle diameters of metal particles present in the thermal-sensitive color developing material 40 are too small for actual measurement as shown in FIG. 4A. Under such a circumstances, for example, when heat of about room temperature is applied to the thermal-sensitive color developing material according to the present invention placed in a dark place, the metal particles cohere together so as to irreversibly increase the size thereof as shown in FIG. 4B. An average particle diameter of the metal particles 41' having the increased size may preferably lie in a range of about 1 nm to about 50 nm, and more preferably in a range of about 3 nm to about 30 nm. The color development of the thermal-sensitive color developing material may be very uniform if the distribution of the particle diameters of the metal particles having the irreversibly increased size is small, and particularly if the average particle diameter lies in a range of about 3 nm to about 30 nm. The particle diameter of these metal particles may be measured by a transmission electron microscope. However, the average particle diameter of the metal particles after the heat application in actual use may not be limited to the above-described range since the average particle diameter of the metal particles varies in actual use depending on, for example, a type of metal used and the temperature (thermal temperature) and time (thermal time) of the heat application.

<Method for Producing Thermal-sensitive Color Developing Material>

Hereinafter, a method for producing a thermal-sensitive color developing material according to the present invention will be described.

First, a mixture containing a metal ion, an α-hydrogen-containing alcohol and a matrix-forming material is prepared.

Examples of the metal ion include gold ion, platinum ion, silver ion, copper ion, tin ion, rhodium ion, palladium ion and iridium ion. The metal ion is obtained from a metal compound which can be dispersed in a sol-like matrix-forming material which will be described later. Examples of such a metal compound include $AuHCl_4$, $AuNaCl_4$, $H_2PtCl_6$, $AgClO_4$, $CuCl_2$, $SnCl_2$, $IrCl_3$, $RhCl_3$ and $PdCl_2$. $AuHCl_4$ is more preferable. The metal compound is added in an amount that satisfies the above-described content of the metal particles in the thermal-sensitive color developing material according to the present invention.

The α-hydrogen-containing alcohol used in the present invention is preferably a dihydric alcohol containing an α-hydrogen, and typical examples thereof include ethylene glycol and propylene glycol. The content of the α-hydrogen-containing alcohol in the prepared mixture is preferably 0.5 mol to 1.5 mol, and more preferably 1.0 mol to 1.2 mol per 1 mol of the metal ion.

Examples of the matrix-forming material include: (1) at least one type of inorganic alkoxide; (2) a composite-forming material; and (3) a matrix-forming resin.

The inorganic alkoxide (1) used as the matrix-forming material may contain silicon, aluminum or titanium. Typical examples of such an inorganic alkoxide include silicon-containing lower alkoxide such as methyl silicate and ethyl silicate, aluminum-containing lower alkoxide such as aluminum methoxide and aluminum ethoxide, and titanium-containing lower alkoxide such as titanium methoxide and titanium ethoxide. Inexpensive methyl silicate and ethyl silicate are particularly preferable.

When an inorganic alkoxide is used as the matrix-forming material, for example, water, methanol, ethanol and/or propanol as a dispersing medium is added to the mixture to be prepared. Furthermore, a predetermined proportion of a hydrochloric acid or ammonia is added as a catalyst. Under the presence of such a dispersing medium and catalyst, the above-described inorganic alkoxide is subjected to hydrolysis (polycondensation) for gelatinization and then dried (i.e., subjected to a sol-gel process), thereby forming a glass or ceramic-like matrix substance.

The composite-forming material (2) used as the matrix-forming material contains at least one type of inorganic composite-forming component and at least one type of organic composite-forming component. Examples of the inorganic composite-forming component include inorganic alkoxide containing silicon, aluminum or titanium. Examples of the organic composite-forming component include a polyacrylic acid, a polyacrylate and a polyethylene oxide.

When the composite-forming material is used as the matrix-forming material, for example, water, methanol, ethanol and/or propanol is added to the mixture to be prepared as a dispersing medium. Furthermore, a predetermined proportion of a hydrochloric acid or ammonia is added as a catalyst. Under the presence of such a dispersing medium and catalyst, the above-described inorganic alkoxide of the composite-forming material is subjected to hydrolysis/polycondensation for complete gelatinization and dried (i.e., subjected to a sol-gel process), thereby forming a glass or ceramic-like matrix substance.

Examples of the matrix-forming resin (3) used as the matrix-forming material include the above-mentioned polyvinyl alcohol, polyvinyl butyral, polystyrene, acrylonitrile-styrene copolymer and a fluorocarbon resin.

When a matrix-forming resin is used as the matrix-forming material, a predetermined amount of polyvinylpyrrolidone as a stabilizer is preferably added to the mixture to be prepared. Moreover, if necessary, a dispersing medium may be added to the mixture. As the dispersing medium, for example, water, methanol, ethanol and/or propanol can be used.

Formamide or dimethylfoamamide may be further added as a drying control chemical additive to the above-described mixture containing the metal ion, the α-hydrogen-containing alcohol and the matrix-forming material, in order to prevent the matrix substance from cracking or foaming. The amount of the drying control chemical additive to be added may be suitably determined by those skilled in the art according to necessity.

The prepared mixture is preferably dried at a temperature of about 50° C. to about 110° C. for a predetermined time (e.g., about 0.5 hours to about 100 hours).

Then, the mixture is irradiated with UV light.

Conditions of the UV light irradiation differ according to the type and the amount of the metal ion used, and may be suitably selected by those skilled in the art. Such UV light irradiation allows the metal ions in the mixture to be reduced by the α-hydrogen-containing alcohol. As a result, metal particles each forming a metal unit, are dispersedly formed in the matrix substance. The UV light is preferably radiated until the color of the metal ions in the mixture (for example, when gold ions are used, the mixture exhibits a light yellow color) disappears such that the thermal-sensitive color developing material to be obtained becomes colorless and transparent. Otherwise, if UV light is excessively radiated, the metal particles cohere independent from heat application, thereby developing a color.

In such a manner, the thermal-sensitive color developing material according to the present invention is formed. Since the thermal-sensitive color developing material develops color by UV light radiation at room temperature, it is preferably stored in a dark place at a relatively low temperature (e.g., about −20° C. to about 4° C.) immediately after the formation.

<First Thermal-sensitive Element>

Hereinafter, a first thermal-sensitive element according to the present invention will be described.

The first thermal-sensitive element according to the present invention includes a base substrate and a thermal-sensitive color developing material held by the base substrate.

The thermal-sensitive color developing material used in the first thermal-sensitive element according to the present invention is the same as that described previously. The thermal-sensitive color developing material is held by the base substrate. More specifically, the color developing material is directly placed on the base substrate; placed on the base substrate via an adhesive layer (for example, an adhesive layer made from an epoxy type adhesive); or impregnated in the base substrate. Although the amount of the thermal-sensitive color developing material held by the base substrate is not particularly limited, it is preferably about 0.1 mg to about 100 mg, and more preferably about 1 mg to about 10 mg per 1 $cm^2$ of the base substrate.

When the thermal-sensitive color developing material is directly placed on the base substrate or placed on the base substrate via the adhesive layer, the base substrate according to the present invention may be, for example, a sheet or a plate made of at least one type of material selected from the group consisting of a metal film, a plastic film, fabric, paper and glass.

Furthermore, when the thermal-sensitive color developing material is impregnated in the base substrate, the base substrate used in the present invention may be, for example, a sheet made of at least one material selected from the group consisting of fabric, paper, a metal film having a plurality of pores and a plastic film having a plurality of pores. The size of the pores of the metal film and the plastic film is not specifically limited.

Examples of the metal film include aluminum foil and a film or a sheet made of stainless steel. Examples of the plastic film include a sheet made of ethylene-vinyl acetate copolymer, a polyethylene sheet and a polypropylene sheet. Examples of the fabric include woven fabric, knitted fabric and nonwoven fabric made of rayon, cotton, glass fiber, silica fiber, alumina fiber or the like. Examples of paper include filter paper, kraft paper and Kent paper. The base substrate may be a body obtained by laminating the above-described sheets, for example, a three-layered sheet sequentially including the ethylene-vinyl acetate copolymer sheet, the aluminum foil and the polyethylene sheet. The glass to be used as the base substrate can be a glass plate made of transparent glass or ground glass. The filter paper is particularly preferable to be used as the base substrate in the present invention. In addition, the base substrate used in the present invention may preferably be a packaging material. The thickness of the base substrate is not particularly limited.

Different color tones can be obtained for the first thermal-sensitive element according to the present invention under specific conditions where heat of a predetermined temperature (e.g., room temperature) is applied in a dark place for a certain time, by varying the concentration of the metal particles contained in the thermal-sensitive color developing material. For example, when the first thermal-sensitive element according to the present invention, which has a gold (Au) particle concentration of about 0.05 mg per 1 $cm^2$ of the base substrate, is kept at about 25° C. for about 10 minutes in the dark place, the thermal-sensitive element exhibits a purple color tone. On the other hand, a thermal-sensitive element having a gold particle concentration of about 0.5 mg per 1 $cm^2$ of the base substrate exhibits a dark brown tone under the same heat application conditions as described above.

Moreover, different color tones can be obtained for the first thermal-sensitive elements according to the present invention, even when the concentrations of the metal particles contained therein are the same under specific conditions where heat is applied in the dark place for a predetermined time, by varying the temperature of the heat. This is because the percentages of the irreversible increases in the size of the metal particles differ depending on the concentrations of the metal particles in the thermal-sensitive color developing materials. For example, when the first thermal-sensitive element of the present invention, which has a gold (Au) particle concentration of about 0.05 mg per 1 $cm^2$ of the base substrate, is kept at about 25° C. in the dark place for 10 minutes, the thermal-sensitive element exhibits a purple color tone. On the other hand, when such a thermal-sensitive element is kept at about 20° C. in the dark place for about 10 minutes, the thermal-sensitive element exhibits a dark brown color tone.

The thermal-sensitive color developing material in the first thermal-sensitive element according to the present invention forms color developing regions held by a plurality of regions of the base substrate. Each of the color developing regions may contain the metal particles of a different concentration.

Figure 5:
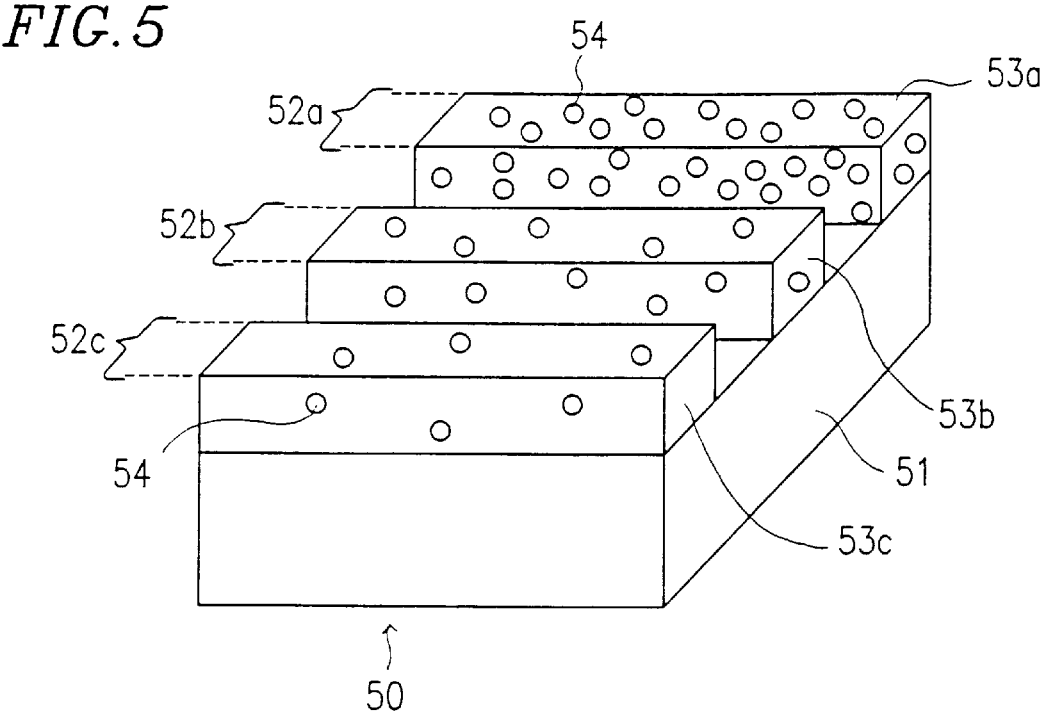
FIG. 5 is a schematic view showing an example of a first thermal-sensitive element according to the present invention, which includes a plurality of color developing regions each containing metal particles of a different concentration.

For example, in the case where the thermal-sensitive color developing material is directly placed on the base substrate, as shown in FIG. 5, the first thermal-sensitive element 50 according to the present invention may hold, on a base substrate 51, thermal-sensitive color developing materials 53a, 53b and 53c containing metal particles 54 of different concentrations in a bar code manner as color developing regions 52a, 52b and 52c. A plurality of color developing regions may be placed in a bar code manner in the first thermal-sensitive element according to the present invention, so that only regions that developed a color upon heat application can be read by a known bar code reader, thereby checking the temperature of heat that contributed to the color development.

Figure 6:
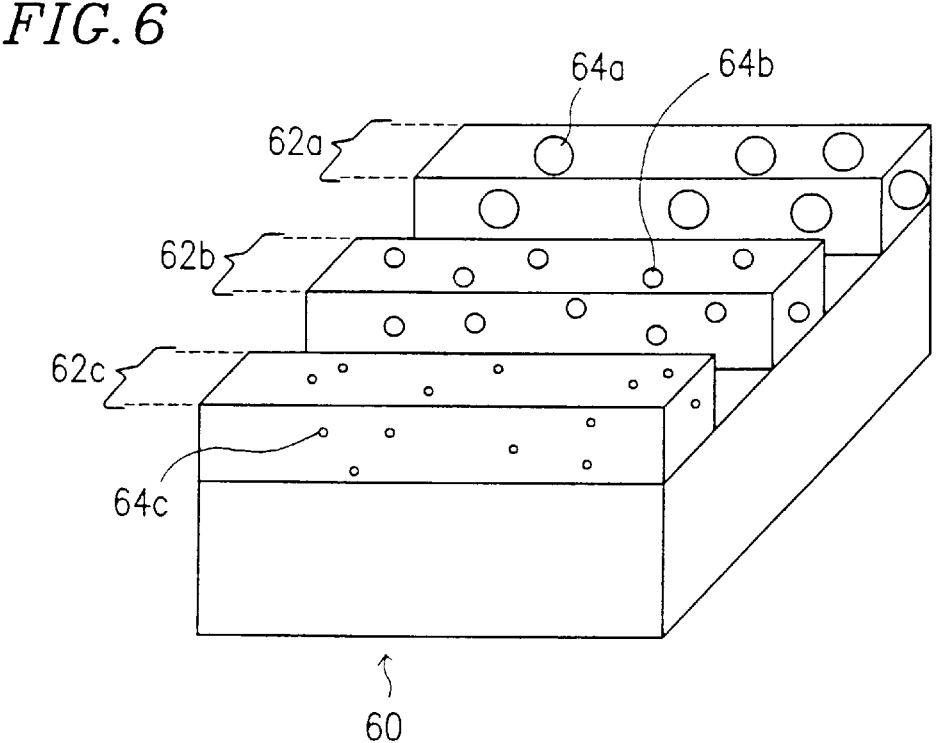
FIG. 6 is a schematic view showing an example of the first thermal-sensitive element according to the present invention, which includes a plurality of color developing regions each containing metal particles of a different average particle diameter.

In the case where the thermal-sensitive color developing material used in the present invention is held by the base substrate as a plurality of color developing regions, these color developing regions may respectively contain the metal particles of different average particle diameters. For example, as shown in FIG. 6, the first thermal-sensitive element 60 according to the present invention in which the thermal-sensitive color developing material is directly placed on the base substrate, may contain metal particles 64a, 64b and 64c respectively having a different average particle diameter in color developing regions 62a, 62b and 62c, respectively. Since the irreversibly increased size of the metal particles 64a, 64b and 64c in the thermal-sensitive element 60 are different from each other depending on the temperature of heat that is applied in the dark place for a certain time, each of the color developing regions 62a, 62b and 62c exhibits a different color tone, whereby temperature history of the thermal-sensitive element 60 may be checked. The metal particles of different average particle diameters may be obtained, for example, by varying the amount of UV light to be radiated at the time of producing the thermal-sensitive color developing material. Such an amount of UV light may suitably be selected by those skilled in the art.

In the case where the thermal-sensitive color developing material used in the present invention is held by the base substrate as a plurality of color developing regions, each of these color developing regions may consist of a thermal-sensitive color developing material containing a matrix substance and metal particles, each of the thermal-sensitive color developing material being formed under a different drying condition. In such thermal-sensitive color developing materials containing the matrix substances and the metal particles, which are formed under different drying conditions, degrees of freedom of the metal particles are different. Therefore, the increasing percentages of the size of the metal particles upon heat application differ in each color developing region, whereby each color developing region exhibits a different color tone. Such drying conditions may suitably be selected by those skilled in the art.

The first thermal-sensitive element according to the present invention may further include a color developed sample for checking a predetermined temperature at which the thermal-sensitive color developing material develops a color. The color developed sample is printed, in advance, in a color tone exhibited by the thermal-sensitive color developing material upon heat application at the predetermined temperature in the dark place for a certain time. The color developed sample may be directly printed on the base substrate or may be a sheet or a plate adhered on the base substrate, which is made from a material such as a metal film, a plastic film, fabric, paper or glass printed with a predetermined color tone. One or more color developed samples may be provided in the thermal-sensitive element. In such a manner, by printing the color developed samples in color tones that are obtained upon heat application at various temperatures in the dark place for a certain time, it becomes possible to visually check an approximate temperature of heat applied to the color-developed thermal-sensitive element in the dark place for a certain time.

Figure 7:
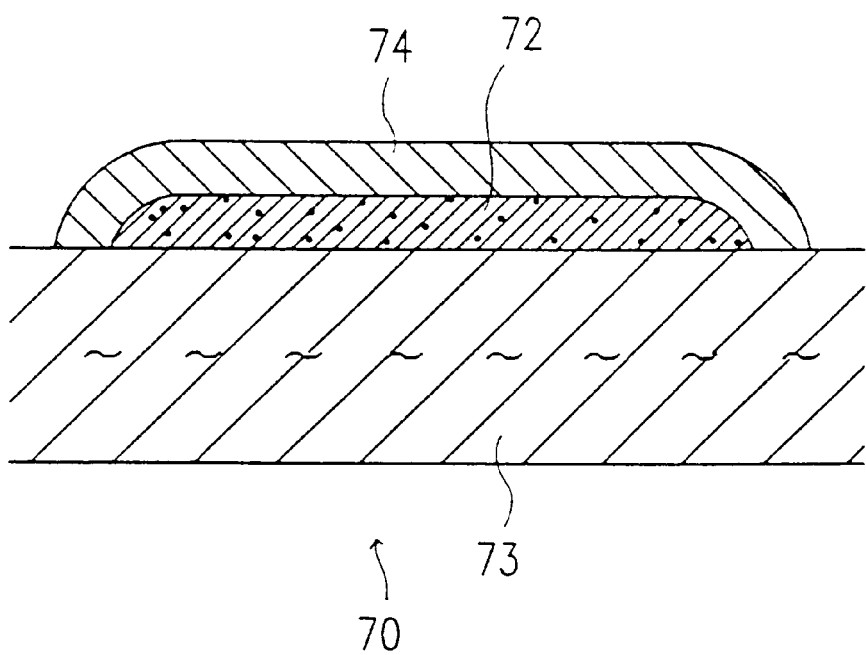
FIG. 7 is a partial cross-sectional view showing an example of the first thermal-sensitive element according to the present invention, which is provided with a light-shielding layer.

Moreover, for example, in order to make it usable under the direct sunlight, the first thermal-sensitive element according to the present invention may be provided with a light-shielding layer for preventing the thermal-sensitive color developing material from developing a color by exposure to light (especially, by exposure to UV light). One example of a first thermal-sensitive element 70 according to the present invention which is provided with a light-shielding layer is shown in FIG. 7. In the thermal-sensitive element 70 shown in FIG. 7, a thermal-sensitive color developing material 72 is provided on a base substrate 73, and a light-shielding layer 74 is further provided thereon so as to cover the thermal-sensitive color developing material 72. A material used for such a light-shielding layer can be a metal tape such as an aluminum foil tape, a glass tape or a paper tape, and is not specifically limited except that it should be capable of protecting the thermal-sensitive color developing material from light. Moreover, the shape of the light-shielding layer is not specifically limited. Although the thickness of the light-shielding layer is also not specifically limited, usually it is about 1 pm to about 30 $\mu$m.

<Method for Producing First Thermal-sensitive Element>

Hereinafter, a method for producing the first thermal-sensitive element according to the present invention will be described.

First, a mixture containing a metal ion, an $\alpha$-hydrogen-containing alcohol and a matrix-forming material is prepared. The method for preparing this mixture is the same as that for preparing the above-described thermal-sensitive color developing material according to the present invention.

Then, the mixture is held by the base substrate. As a method for such maintenance, any one of a painting method, a spin coating method or an immersion method is employed. Means known to those skilled in the art is used in such a maintenance method. In the case where a thermal-sensitive color developing material is provided on the base substrate via an adhesive layer in the first thermal-sensitive element according to the present invention, it is necessary to apply an adhesive (e.g., an epoxy type adhesive) on the surface of the base substrate for holding the mixture.

Then, the mixture held on the base substrate is irradiated with UV light, thereby forming the thermal-sensitive color developing material. Conditions used for the UV light radiation are the same as those in the case of the above-described thermal-sensitive color developing material.

Furthermore, according to necessity, a light-shielding layer may be provided on the thermal-sensitive color developing material formed by the UV light radiation.

In such a manner, the first thermal-sensitive element according to the present invention is produced. Since the first thermal-sensitive element according to the present invention develops a color by UV light radiation at room temperature, it is preferably stored in the dark place at a relatively low temperature (e.g., about −20° C. to about 4° C.) immediately after the formation.

<Second Thermal-sensitive Element>

Hereinafter, a second thermal-sensitive element according to the present invention will be described.

The second thermal-sensitive element according to the present invention is provided with a base substrate containing metal particles.

The type of the metal particles used in the second thermal-sensitive element according to the present invention is the same as that described above.

Although the content of the metal particles varies depending on a type of metal used, it is an amount that allows the particle diameter to be easily controlled and that prevents the metal particles from cohering independent from the heat application. The content of the metal particles is preferably about 0.01 wt % to about 20 wt %, and more preferably, it is about 0.05 wt % to about 10 wt % based on the total weight of a thermal-sensitive color developing material. When the content of the metal particles is lower than 0.01 wt %, there may be a case where the particles do not cohere to a size sufficient to develop a color (i.e., to visualize a color). When the content of the metal particles exceeds 20 wt %, even if heat of a later-described temperature is applied to the thermal-sensitive color developing material, the metal particles tend to cohere independent from the heat application and partially develop a color in the second thermal-sensitive element according to the present invention.

The metal particles cohere at room temperature, thereby irreversibly increasing the size thereof. In the second thermal-sensitive element according to the present invention, the average particle diameter of the metal particles before the heat application and the temperature at which the metal particles increases are the same as those of the first thermal-sensitive element according to the present invention.

The metal particles used in the second thermal-sensitive element according to the present invention are impregnated in the base substrate. Although the amount of the metal particles contained in the base substrate is not specifically limited, it is preferably about 0.001 mg to about 1.0 mg, and more preferably about 0.01 mg to about 0.1 mg per 1 cm$^2$ of the base substrate.

Examples of the base substrate used in the second thermal-sensitive element according to the present invention include a sheet or a plate made of at least one material selected from the group consisting of paper, fabric and a porous material.

Examples of the paper include filter paper, kraft paper and Kent paper. Examples of the fabric include woven fabric, knitted fabric and nonwoven fabric made from rayon, cotton, glass fiber, silica fiber, alumina fiber or the like. Examples of the porous material include a plate and granules made from gel such as zeolite and silica gel. A sheet or a plate made of silica gel or porous glass is preferably used as the base substrate in the second thermal-sensitive element according to the present invention. The thickness of the base substrate used in the present invention is not specifically limited.

In the case of the second thermal-sensitive element according to the present invention, as well as in the case of the first thermal-sensitive element according to the present invention, a plurality of color developing regions and/or color developed samples may be provided.

<Method for Producing Second Thermal-sensitive Element>

Hereinafter, a method for producing the second thermal-sensitive element according to the present invention will be described.

First, a mixture containing a metal ion and an α-hydrogen-containing alcohol is prepared.

The type and amount of the metal ion and α-hydrogen-containing alcohol used in the method for producing the second thermal-sensitive element according to the present invention are the same as those described in the case of the thermal-sensitive color developing material according to the present invention. A usable amount of metal ion is added so as to satisfy the above-described content of the metal particles in the thermal-sensitive color developing material according to the present invention.

Then, the base substrate is impregnated with the mixture. More specifically, the base substrate is immersed in the above-described prepared mixture by using means known by those skilled in the art.

Then, by irradiating the base substrate with UV light, metal particles are formed in the base substrate. The conditions used for the UV light radiation are the same as those described above for the thermal-sensitive color developing material. Furthermore, a light-shielding layer is provided on the base substrate if necessary.

In such a manner, the second thermal-sensitive element according to the present invention is produced. Since the second element according to the present invention develops a color by UV light radiation at room temperature, it is preferably stored in the dark place at a relatively low temperature (e.g., about −20° C. to about 4° C.) immediately after the formation.

EXAMPLES

Hereinafter, examples of the present invention will be described. It should be noted that the present invention is not limited by these examples.

Example 1

A solution containing materials listed below in Table 1 was prepared.

TABLE 1

| Material | | Mixed amount (g) |
|---|---|---|
| α-hydrogen-containing alcohol | HOCH$_2$CH$_2$OH | 20 |
| Matrix-forming material | Si(OC$_2$H$_5$)$_4$ | 30 |
| Dispersing medium | C$_2$H$_5$OH | 20 |

TABLE 1-continued

| | Material | Mixed amount (g) |
|---|---|---|
| | $H_2O$ | 30 |
| Catalyst | HCl | 1.0 |

0.18 g of $AuHCl_4 \cdot 4H_2O$ as the metal compound was added to the solution. The thus-obtained mixture was agitated at room temperature for 10 minutes. Then, the mixture was cast upon a flat plate; dried at room temperature for 5 days; and dried at a temperature of 20° C. for 24 hours, thereby obtaining a transparent light yellow gel film having a thickness of 300 μm.

The film was irradiated with white light at room temperature for 10 minutes using a 500 W xenon lamp which was placed 30 cm away from the film, thereby obtaining a film made of a colorless material containing Au particles. The thus-obtained film was immediately stored in a refrigerator (the dark place) at 0° C. for 2 months.

The film did not develop a color during the storage. After 2 months, the film was taken out from the refrigerator and was left in the dark place at a temperature of 25° C. for 20 minutes, whereby the film developed a color and exhibited a reddish purple color. The film that developed the color contained Au particles having a small particle diameter distribution and an average particle diameter of about 5 nm, and had an absorption peak at 525 nm based on surface plasmon absorption of the Au particles. Then, the film that developed the color was once again placed in the refrigerator at 0° C. but the developed color tone did not disappear. Thus, the temperature history could be checked. The types of the metal compound, α-hydrogen-containing alcohol and matrix-forming material used in the present example, and the results of evaluations of the obtained film are shown in Table 2.

Examples 2 to 11

Films made of materials irradiated by a xenon lamp were produced in the same manner as in Example 1 except that the metal compounds, the α-hydrogen-containing alcohols and the matrix-forming materials shown in Table 2 were used. The films were evaluated and the results thereof are shown in Table 2.

Comparative Example 1

A film made of materials irradiated by a xenon lamp was produced in the same manner as in Example 1 except that ethylene glycol (EG) was not used. The film was evaluated and the results thereof are shown in Table 2.

TABLE 2

| | Metal compound[1] | α-hydrogen-containing alcohol | Matrix-forming material | Particle diameter of metal particle after heat application[3] (nm) | Color tone of film before heat application[2] | Color tone of film after heat application[3] | Temperature history[4] | Peak of surface plasmon absorption of metal particles (nm) |
|---|---|---|---|---|---|---|---|---|
| Example 1 | $AuHCl_4 \cdot 4H_2O$ (0.18) | EG[5] | $Si(OC_2H_5)_4$ | 5 | Colorless | Reddish purple | ○ | 525 |
| Example 2 | $AuNaCl_4 \cdot 2H_2O$ (0.17) | EG | $Si(OC_2H_5)_4$ | 5 | Colorless | Reddish purple | ○ | 530 |
| Example 3 | $AuHCl_4 \cdot 4H_2O$ (0.18) | EG | $Al(OC_2H_5)_3$ | 5 | Colorless | Reddish purple | ○ | 540 |
| Example 4 | $AuHCl_4 \cdot 4H_2O$ (0.18) | EG | $Ti(OC_2H_5)_4$ | 5 | Colorless | Reddish purple | ○ | 560 |
| Example 5 | $H_2PtCl_6 \cdot 6H_2O$ (0.20) | EG | $Si(OC_2H_5)_4$ | 4 | Colorless | Blackish brown | ○ | No evident peak |
| Example 6 | $AgClO_4$ (0.20) | EG | $Si(OC_2H_5)_4$ | 6 | Colorless | Brown | ○ | 400 |
| Example 7 | $CuCl_2 \cdot 2H_2O$ (0.20) | EG | $Si(OC_2H_5)_4$ | 5 | Colorless | Light green | ○ | 580 |
| Example 8 | $SnCl_2$ (0.20) | EG | $Si(OC_2H_5)_4$ | 4 | Colorless | Dark brown | ○ | No evident peak |
| Example 9 | $IrCl_3$ (0.20) | EG | $Si(OC_2H_5)_4$ | 5 | Colorless | Blackish brown | ○ | No evident peak |
| Example 10 | $RhCl_3 \cdot 3H_2O$ (0.21) | EG | $Si(OC_2H_5)_4$ | 5 | Colorless | Blackish brown | ○ | No evident peak |
| Example 11 | $PdCl_2 \cdot 2H_2O$ (0.23) | EG | $Si(OC_2H_5)_4$ | 5 | Colorless | Blackish brown | ○ | No evident peak |
| Comparative example 1 | $AuHCl_4 \cdot 4H_2O$ (0.18) | Not contained | $Si(OC_2H_5)_4$ | —[6] | Light yellow | No change | X | — |

[1] Mixed amount (g) is shown in parentheses.
[2] This was observed immediately after the film production.
[3] This was observed after leaving the film in the dark place at 25° C. for 20 minutes.
[4] ○: able to check temperature history, X: unable to check temperature history
[5] Ethylene glycol
[6] Not measured Although the particle diameters of the metal particles contained in the materials produced in Examples 1 to 11 were too small to measure before the heat application, the size of the particles increased after the heat application and the particle diameters thereof were able to be measured.

With reference to Table 2, it can be understood that the materials produced in Examples 1 to 11 are able to develop colors due to an increase in the particle diameters of the metal particles upon heat application, and are useful as thermal-sensitive color developing materials for checking the temperature history. On the other hand, the material produced without an α-hydrogen-containing alcohol in Comparative Example 1 did not develop a color upon heat application and thus it is recognized useless as a thermal-sensitive color developing material.

Among the materials obtained in Example 1 and Examples 5 to 11, the material containing Au particles obtained in Example 1 developed a brilliant color with the most excellent contrast as a thermal-sensitive color developing material.

Examples 12 to 15

Solutions shown in Table 1 were prepared in the same manner as in Example 1. Metal compounds of types and amounts shown in Table 3 were respectively added to the solutions and then the resultant combinations were agitated at room temperature, thereby obtaining a mixture. Then, the mixture was applied on aluminum foil (a base substrate) having a thickness of 20 μm; dried at room temperature for 1 hour; and subsequently dried at a temperature of 60° C. for 1 hour. These application and drying processes were repeated 10 times so as to obtain laminated bodies including a transparent light yellow thin-film-like gel film having a thickness of 3 μm on the base substrate. The laminated bodies were irradiated by a xenon lamp in the same manner as in Example 1 for 3 minutes so as to obtain elements each including a film made of a colorless material on the base substrate. The elements were used so as to evaluate the temperature history in the same manner as in Example 1. The results are shown in Table 3.

Comparative Example 2

An element including a film made of a material irradiated by a xenon lamp was produced in the same manner as in Example 12 except that ethylene glycol (EG) was not used. The element was evaluated and the results thereof are shown in Table 3.

did not develop a color upon heat application and thus it is recognized useless as a thermal-sensitive element.

Example 16

A solution shown in Table 1 was prepared in the same manner as in Example 1. 0.18 g of $AuHCl_4 \cdot 4H_2O$ was added to the solution and the resultant combination was agitated at room temperature, thereby obtaining a mixture. Then, a bag (a base substrate) made of polypropylene having a thickness of 200 pm was immersed in the solution containing such a mixture. Thereafter, the bag was taken out; dried at room temperature for 1 hour; and subsequently dried at a temperature of 60° C. for 1 hour. These immersion and drying processes were repeated 3 times so as to form a transparent light yellow thin-film-like gel film having a thickness of about 1 μm on the surface of the bag. The thus-obtained bag was irradiated by a xenon lamp in the same manner as in Example 1 for 3 minutes, thereby obtaining an element including a film made of a colorless material on a base substrate. The element was used to evaluate the temperature history in the same manner as in Example 1.

The results are shown in Table 4.

Example 17

An element was produced in the same manner as in Example 16 except that fabric made of rayon having a

TABLE 3

| | Metal compound[1] | α-hydrogen-containing alcohol | Matrix-forming material | Particle diameter of metal particle after heat application[3] (nm) | Color tone of element before heat application[2] | Color tone of element after heat application[3] | Temperature history[4] | Peak of surface plasmon absorption of metal particles (nm) |
|---|---|---|---|---|---|---|---|---|
| Example 12 | $AuHCl_4 \cdot 4H_2O$ (0.18) | EG[5] | $Si(OC_2H_5)_4$ | 5 | Colorless | Reddish purple | ○ | 530 |
| Example 13 | $AuNaCl_4 \cdot 2H_2O$ (0.17) | EG | $Si(OC_2H_5)_4$ | 5 | Colorless | Reddish purple | ○ | 530 |
| Example 14 | $AuHCl_4 \cdot 4H_2O$ (0.18) | EG | $Al(OC_2H_5)_3$ | 5 | Colorless | Reddish purple | ○ | 540 |
| Example 15 | $AuHCl_4 \cdot 4H_2O$ (0.18) | EG | $Ti(OC_2H_5)_4$ | 5 | Colorless | Reddish purple | ○ | 550 |
| Comparative example 2 | $AuHCl_4 \cdot 4H_2O$ (0.18) | Not contained | $Si(OC_2H_5)_4$ | 5 | Light yellow | No change | X | —[6] |

[1]Mixed amount (g) is shown in parentheses.
[2]This was observed immediately after the element production.
[3]This was observed after leaving, the element in the dark place at 25° C. for 20 minutes.
[4]○: able to check temperature history, X: unable to check temperature history
[5]Ethylene glycol
[6]Not measured Although the particle diameters of the metal particles contained in the elements produced in Examples 12 to 15 were too small to measure before the heat application, the size of the particles increased after the heat application and the particle diameters thereof were able to be measured.

With reference to Table 3, it can be understood that the elements produced in Examples 12 to 15 are able to develop colors due to an increase in the particle diameters of the metal particles upon heat application, and are useful as thermal-sensitive elements for checking the temperature history. On the other hand, the element produced without an α-hydrogen-containing alcohol in Comparative Example 2 thickness of 500 μm was used instead of the polypropylene bag. The element was evaluated and the results thereof are shown in Table 4.

Comparative Example 3

An element including a film made of a material irradiated by a xenon lamp was produced in the same manner as in Example 16 except that ethylene glycol (EG) was not used. The element was evaluated and the results thereof are shown in Table 4.

TABLE 4

| | Base substrate | α-hydrogen-containing alcohol | Particle diameter of metal particle after heat application[2] (nm) | Color tone of element before heat application[1] | Color tone of element after heat application[2] | Temperature history[4] | Peak of surface plasmon absorption of metal particles (nm) |
|---|---|---|---|---|---|---|---|
| Example 16 | Polypropylene bag | EG[4] | 5 | Colorless | Reddish purple | ○ | 530 |
| Example 17 | Rayon fabric | EG | 5 | Colorless | Reddish purple | ○ | 530 |
| Comparative example 3 | Polypropylene bag | Not contained | 5 | Light yellow | No change | X | —[5] |

[1]This was observed immediately after the element production.
[2]This was observed after leaving the element in the dark place at 25° C. for 20 minutes.
[3]○: able to check temperature history, X: unable to check temperature history
[4]Ethylene glycol
[5]Not measured Although the particle diameters of the metal particles contained in the elements produced in Examples 16 and 17 were too small to measure before the heat application, the size of the particles increased after the heat application and the particle diameters thereof were able to be measured.

With reference to Table 4, it can be understood that the elements produced in Examples 16 and 17 are able to develop colors due to an increase in the particle diameters of the metal particles upon heat application, and are useful as thermal-sensitive elements for checking the temperature history. On the other hand, the element produced without an α-hydrogen-containing alcohol in Comparative Example 3 did not develop a color upon heat application and thus it is recognized useless as a thermal-sensitive element.

substrate. The laminated body was irradiated by a xenon lamp in the same manner as in Example 1 for 3 minutes so as to obtain an element including a film made of a colorless material on the base substrate. The element was used so as to evaluate the temperature history in the same manner as in Example 1. The results are shown in Table 5.

Comparative Example 4

An element including a film made of a material irradiated by a xenon lamp was produced in the same manner as in Example 18 except that ethylene glycol (EG) was not used. The element was evaluated and the results thereof are shown in Table 5.

TABLE 5

| | Metal compound[1] | α-hydrogen-containing alcohol | Matrix-forming material | Particle diameter of metal particle after heat application[3] (nm) | Color tone of film before heat application[2] | Color tone of film after heat application[3] | Temperature history[4] | Peak of surface plasmon absorption of metal particles (nm) |
|---|---|---|---|---|---|---|---|---|
| Example 18 | AuHCl$_4$·4H$_2$O (0.18) | EG[5] | Si(OC$_2$H$_5$)$_4$ | 5 | Colorless | Reddish purple | ○ | 530 |
| Comparative example 4 | AuHCl$_4$·4H$_2$O (0.18) | Not contained | Si(OC$_2$H$_5$)$_4$ | —[6] | Light yellow | No change | X | — |

[1]Mixed amount (g) is shown in parentheses.
[2]This was observed immediately after the element production.
3) This was observed after leaving element in the dark place at 25° C. for 20 minutes.
[4]○: able to check temperature history, X: unable to check temperature history
[5]Ethylene glycol
[6]Not measured Example 18

A solution shown in Table 1 was prepared in the same manner as in Example 1. A metal compound of a type and an amount shown in Table 3 was added to this solution and then the resultant combination was agitated at room temperature, thereby obtaining a mixture. Then, the mixture was applied on kraft paper (a base substrate) having a thickness of 50 μm by spin coating; dried at room temperature for 30 minutes; and subsequently dried at a temperature of 60° C. for 30 minutes. These application and drying processes were repeated 3 times so as to obtain a laminated body including a transparent light yellow thin-film-like gel film having a thickness of about 0.5 μm on the base Although the particle diameters of the metal particles contained in the element produced in Example 18 were too small to measure before the heat application, the size of the particles increased after the heat application and the particle diameters thereof were able to be measured.

With reference to Table 5, it can be understood that the element produced in Example 18 is able to develop a color due to an increase in the particle diameters of the metal particles upon heat application, and is useful as a thermal-sensitive element for checking the temperature history. On the other hand, the element produced without an α-hydrogen-containing alcohol in Comparative Example 4 did not develop a color upon heat application and thus it is recognized useless as a thermal-sensitive element.

Example 19

A solution containing materials listed below in Table 6 was prepared.

TABLE 6

| Material | | | Mixed amount (g) |
|---|---|---|---|
| α-hydrogen-containing alcohol | | $HOCH_2CH_2OH$ | 20 |
| Matrix-forming substance | Composite-forming inorganic component | $Si(OC_2H_5)_4$ | 30 |
| | Composite-forming organic component | Polacrylic acid | 5.0 |
| Dispersing medium | | $C_2H_5OH$ | 20 |
| | | $H_2O$ | 30 |
| Catalyst | | HCl | 1.0 |

0.2 g of $AuHCl_4 \cdot 4H_2O$ as the metal compound was added to the solution. The thus-obtained mixture was agitated at room temperature for 1 hour. Then, the mixture was cast upon a flat plate; dried at room temperature for 3 days; and dried at a temperature of 60° C. for 24 hours, thereby obtaining a transparent light yellow film having a thickness of 200 μm.

The film was irradiated with white light at room temperature for 5 minutes using a 500 W xenon lamp which was placed 30 cm away from the film, thereby obtaining a film made of a colorless material containing Au particles. The thus-obtained film was immediately stored in a refrigerator (the dark place) at 0 C. for 2 months. The film did not develop a color during the storage. After 2 months, the film was taken out from the refrigerator and was left in the dark place at a temperature of 25° C. for 10 minutes, whereby the film developed a color and exhibited a reddish purple color. The film that developed the color contained Au particles having a small particle diameter distribution and an average particle diameter of about 5 nm, and had an absorption peak at 525 nm based on surface plasmon absorption of the Au particles. Then, the film that developed the color was once again placed in the refrigerator at 0° C. but the developed color tone did not disappear. Thus, the temperature history could be checked. The types of the metal compounds, the α-hydrogen-containing alcohols and the matrix-forming materials used in the present example, and the results of evaluations of the obtained film are shown in Table 7.

Examples 20 to 24

Films made of materials irradiated by a xenon lamp were produced in the same manner as in Example 19 except that the metal compounds, the α-hydrogen-containing alcohols and the matrix-forming materials shown in Table 7 were used. The films were evaluated and the results thereof are shown in Table 7.

Examples 25 to 31

Films made of materials irradiated by a xenon lamp were produced in the same manner as in Example 19 except that the metal compounds, the α-hydrogen-containing alcohols and the matrix-forming materials shown in Table 7 were used and that the radiation was conducted by the xenon lamp for 10 minutes. The films were evaluated and the results thereof are shown in Table 7.

Comparative Example 5

A film made of a material irradiated by a xenon lamp was produced in the same manner as in Example 19 except that ethylene glycol (EG) was not used. The film was evaluated and the results thereof are shown in Table 7.

TABLE 7

| | Metal compound[1] | α-hydrogen-containing alcohol | Matrix-forming material Composite-forming inorganic component | Matrix-forming material Composite-forming organic component | Particle diameter of metal particle after heat application[3] (nm) | Color tone of film before heat application[2] | Color tone of film after heat application[3] | Temperature history[4] | Peak of surface plasmon absorption of metal particles (nm) |
|---|---|---|---|---|---|---|---|---|---|
| Example 19 | AuHCl$_4$·4H$_2$O (0.2) | EG[5] | Si(OC$_2$H$_5$)$_4$ | Polyacrylic acid | 5 | Colorless | Reddish purple | ○ | 525 |
| Example 20 | AuNaCl$_4$·2H$_2$O (0.2) | EG | Si(OC$_2$H$_5$)$_4$ | Polyacrylic acid | 5 | Colorless | Reddish purple | ○ | 530 |
| Example 21 | AuHCl$_4$·4H$_2$O (0.2) | EG | Al(OC$_2$H$_5$)$_3$ | Polyacrylic acid | 5 | Colorless | Reddish purple | ○ | 555 |
| Example 22 | AuHCl$_4$·4H$_2$O (0.2) | EG | Ti(OC$_2$H$_5$)$_4$ | Polyacrylic acid | 5 | Colorless | Reddish purple | ○ | 555 |
| Example 23 | AuHCl$_4$·4H$_2$O (0.2) | EG | Si(OC$_2$H$_5$)$_4$ | Polyacrylate | 5 | Colorless | Reddish purple | ○ | 525 |
| Example 24 | AuHCl$_4$·4H$_2$O (0.2) | EG | Si(OC$_2$H$_5$)$_4$ | Polyethylene oxide | 5 | Colorless | Reddish purple | ○ | 525 |
| Example 25 | H$_2$PtCl$_6$·6H$_2$O (0.2) | EG[5] | Si(OC$_2$H$_5$)$_4$ | Polyacrylic acid | 5 | Colorless | Blackish brown | ○ | No evident peak |
| Example 26 | AgClO$_4$ (0.2) | EG | Si(OC$_2$H$_5$)$_4$ | Polyacrylic acid | 4 | Colorless | Brown | ○ | 405 |
| Example 27 | CuCl$_2$·2H$_2$O (0.2) | EG | Si(OC$_2$H$_5$)$_4$ | Polyacrylic acid | 5 | Colorless | Light green | ○ | 585 |
| Example 28 | SnCl$_2$ (0.2) | EG | Si(OC$_2$H$_5$)$_4$ | Polyacrylic acid | 5 | Colorless | Dark brown | ○ | No evident peak |
| Example 29 | IrCl$_3$ (0.2) | EG | Si(OC$_2$H$_5$)$_4$ | Polyacrylic acid | 5 | Colorless | Blackish brown | ○ | No evident peak |
| Example 30 | RhCl$_3$·3H$_2$O (0.2) | EG | Si(OC$_2$H$_5$)$_4$ | Polyacrylic acid | 5 | Colorless | Blackish brown | ○ | No evident peak |
| Example 31 | PdCl$_2$·2H$_2$O (0.2) | EG | Si(OC$_2$H$_5$)$_4$ | Polyacrylic acid | 5 | Colorless | Blackish brown | ○ | No evident peak |
| Comparative example 5 | AuHCl$_4$·4H$_2$O (0.2) | Not contained | Si(OC$_2$H$_5$)$_4$ | Polyacrylic acid | —[6] | Light yellow | No change | X | — |

[1] Mixed amount (g) is shown in parentheses.
[2] This was observed immediately after the film production.
[3] This was observed after leaving the film in the dark place at 25° C. for 20 minutes.
[4] ○: able to check temperature history, X: unable to check temperature history
[5] Ethylene glycol
[6] Not measured Although the particle diameters of the metal particles contained in the materials produced in Examples 19 to 31 were too small to measure before the heat application, the size of the particles increased after the heat application and the particle diameters thereof were able to be measured.

With reference to Table 7, it can be understood that the materials produced in Examples 19 to 31 are able to develop colors due to an increase in the particle diameters of the metal particles upon heat application, and are useful as thermal-sensitive color developing materials for checking the temperature history. On the other hand, the material produced without an α-hydrogen-containing alcohol in Comparative Example 5 did not develop a color upon heat application and thus it is recognized useless as a thermal-sensitive color developing material.

Among the materials obtained in Example 19 and Examples 25 to 31, the material containing Au particles obtained in Example 19 developed a brilliant color with the most excellent contrast as a thermal-sensitive color developing material.

Example 32

Films A to C made of colorless materials were produced in the same manner as in Example 19 except that each amount of $AuHCl_4 \cdot 4H_2O$ was 0.018 g, 0.54 g and 1.8 g, respectively. The thus-obtained films were stored in a refrigerator at 0° C. for 2 months. None of the films developed a color during the storage. Then, these films were taken out from the refrigerator and were left in the dark place for 10 minutes at various temperatures. Film A developed a reddish purple color at a temperature of 28° C.; Film B developed a reddish purple color at a temperature of 15° C.; and Film C developed a reddish purple color at a temperature of 7° C.

Accordingly, it is understood that the material obtained in the present example is useful as a thermal-sensitive color developing material. Furthermore, it is further understood that in the case where these materials contain metal particles of various concentrations and heat is applied thereto in the dark place for a certain time, it can be appreciated that a temperature for obtaining a particular color tone varies depending on the concentration of the metal particles.

Example 33

Films made of a colorless material were produced in the same manner as in Example 19 and were stored in a refrigerator at 0° C. for 2 months. Then, these films were taken out from the refrigerator and were left in the dark place at temperatures of 25° C., 40° C. and 60° C., respectively for 10 minutes. These films developed a reddish purple color at 25° C., a brownish purple color at 40° C. and a brown color at 60 C., respectively.

Thus, it is appreciated that the material obtained in the present example is useful as a thermal-sensitive color developing material. Moreover, it can be also understood that under the conditions where heat is applied to the film made of such material in the dark place for a certain time, a color tone obtained upon color development varies depending on the temperature.

Examples 34 to 41

Materials were produced by performing irradiation by a xenon lamp in the same manner as in Example 19 and Examples 25 to 31 except that the temperature at the time of the xenon lamp radiation was set to 0° C. The materials were evaluated. All results of the evaluation of the obtained materials were same as those obtained in Example 19 and Examples 25 to 31 and the materials were found to be useful as thermal-sensitive color developing materials.

Examples 42 to 54

Solutions containing materials listed below in

TABLE 8

| Material | | Mixed amount (g) |
|---|---|---|
| α-hydrogen-containing alcohol | $HOCH_2CH_2OH$ | 5.0 |
| Dispersing medium | $C_2H_5OH$ | 20 |
|  | $H_2O$ | 30 |
| Matrix-forming material |  | 5.0 |

Metal compounds of types and amounts shown in Table 9 were respectively added to the solutions and then the resultant combinations were agitated at room temperature, thereby obtaining mixtures. Then, each of the mixtures was cast upon a flat plate and was dried at a temperature of 80° C. for 2 hours, thereby obtaining a transparent light yellow film having a thickness of 200 μm.

The film was irradiated by a xenon lamp in the same manner as in Example 19, thereby obtaining a film made of a colorless material. The film was evaluated in the same manner as in Example 19. The results are shown in Table 9.

Comparative Example 6

A film made of a material irradiated by a xenon lamp was produced in the same manner as in Example 42 except that ethylene glycol (EG) was not used. The film was evaluated and the results thereof are shown in Table 9.

TABLE 9

|  | Metal compound[1] | α-hydrogen-containing alcohol | Matrix-forming material | Particle diameter of metal particle after heat application[3] (nm) | Color tone of film before heat application[2] | Color tone of film after heat application[3] | Temperature history[4] | Peak of surface plasmon absorption of metal particles (nm) |
|---|---|---|---|---|---|---|---|---|
| Example 42 | $AuHCl_4 \cdot 4H_2O$ (0.05) | EG[5] | Polyvinyl alcohol | 4 | Colorless | Reddish purple | ○ | 530 |
| Example 43 | $AuNaCl_4 \cdot 2H_2O$ (0.05) | EG | Polyvinyl alcohol | 5 | Colorless | Reddish purple | ○ | 530 |

TABLE 9-continued

|  | Metal compound[1] | α-hydrogen-containing alcohol | Matrix-forming material | Particle diameter of metal particle after heat application[3] (nm) | Color tone of film before heat application[2] | Color tone of film after heat application[3] | Temperature history[4] | Peak of surface plasmon absorption of metal particles (nm) |
|---|---|---|---|---|---|---|---|---|
| Example 44 | AuHCl$_4$.4H$_2$O (0.05) | EG | Polyvinyl butyral | 5 | Colorless | Reddish purple | ○ | 540 |
| Example 45 | AuHCl$_4$.4H$_2$O (0.05) | EG | Polystyrene | 5 | Colorless | Reddish purple | ○ | 540 |
| Example 46 | AuHCl$_4$.4H$_2$O (0.05) | EG | Acrylonitrile-styrene copolymer | 5 | Colorless | Reddish purple | ○ | 540 |
| Example 47 | AuHCl$_4$.4H$_2$O (0.05) | EG | Fluorocarbon resin | 5 | Colorless | Reddish purple | ○ | 540 |
| Example 48 | H$_2$PtCl$_6$.6H$_2$O (0.05) | EG | Polyvinyl alcohol | 5 | Colorless | Blackish brown | ○ | No evident peak |
| Example 49 | AgClO$_4$(0.05) | EG | Polyvinyl alcohol | 5 | Colorless | Brown | ○ | 400 |
| Example 50 | CuCl$_2$.2H$_2$O (0.05) | EG | Polyvinyl alcohol | 5 | Colorless | Light green | ○ | 590 |
| Example 51 | SnCl$_2$(0.05) | EG | Polyvinyl alcohol | 5 | Colorless | Dark brown | ○ | No evident peak |
| Example 52 | IrCl$_3$(0.05) | EG | Polyvinyl alcohol | 5 | Colorless | Blackish brown | ○ | No evident peak |
| Example 53 | RhCl$_3$.3H$_2$O (0.05) | EG | Polyvinyl alcohol | 5 | Colorless | Blackish brown | ○ | No evident peak |
| Example 54 | PdCl$_2$.2H$_2$O (0.05) | EG | Polyvinyl alcohol | 5 | Colorless | Blackish brown | ○ | No evident peak |
| Comparative example 6 | AuHCl$_4$.4H$_2$O (0.05) | Not contained | Polyvinyl alcohol | —[6] | Light yellow | No change | X | — |

[1]Mixed amount (g) is shown in parentheses.
[2]This was observed immediately after the film production.
[3]This was observed after leaving the film in the dark place at 25° C. for 20 minutes.
[4]○: able to check temperature history, X: unable to check temperature history
[5]Ethylene glycol
[6]Not measured Although the particle diameters of the metal particles contained in the materials produced in Examples 42 to 54 were too small to measure before the heat application, the size of the particles increased after the heat application and the particle diameters thereof were able to be measured.

With reference to Table 9, it can be understood that the materials produced in Examples 42 to 54 are able to develop colors due to an increase in the particle diameters of the metal particles upon heat application, and are useful as thermal-sensitive color developing materials for checking the temperature history. On the other hand, the material produced without an α-hydrogen-containing alcohol in Comparative Example 6 did not develop a color upon heat application and thus it is recognized useless as a thermal-sensitive color developing material.

Among the materials obtained in Example 42 and Examples 44 to 47, the material using a fluorocarbon resin obtained in Example 47 was especially transparent and excellent in mechanical strength. Furthermore, among the materials obtained in Example 42 and Examples 48 to 54, the material containing Au particles obtained in Example 42 developed a brilliant color with the most excellent contrast as a thermal-sensitive color developing material.

Example 55

Films A to C made of colorless materials were produced in the same manner as in Example 42 except that amounts of AuHCl$_4$.4H$_2$O were 0.018 g, 0.54 g and 1.8 g, respectively. The thus-obtained films were stored in a refrigerator at 0° C. for 2 months. None of the films developed a color during the storage. Then, these films were taken out from the refrigerator and were left in the dark place for 30 minutes at various temperatures. Film A developed a reddish purple color at a temperature of 29° C.; Film B developed a reddish purple color at a temperature of 16° C.; and Film C developed a reddish purple color at a temperature of 7° C.

Accordingly, it is understood that the material obtained in the present example is useful as a thermal-sensitive color developing material. Furthermore, when these materials contain metal particles of various concentrations and heat is applied thereto in the dark place for a certain time, it can be appreciated that a temperature for obtaining a particular color tone varies depending on the concentration of the metal particles.

Example 56

Films made of a colorless material were produced in the same manner as in Example 42 and were stored in a refrigerator at 0° C. for 2 months. Then, these films were taken out from the refrigerator and were left in the dark place at temperatures of 25° C., 40° C. and 60° C., respectively for 20 minutes. These films developed a reddish purple color at 25° C., a brownish purple color at 40° C. and a brown color at 60° C., respectively.

Thus, it is appreciated that the material obtained in the present example is useful as a thermal-sensitive color developing material. Furthermore, it is also understood that under the conditions where heat is applied to such a material in the dark place for a certain time, a color tone obtained upon color development varies depending on the temperature.

Example 57

A solution containing materials listed below in Table 10 was prepared.

TABLE 10

| Material | | Mixed amount (g) |
|---|---|---|
| α-hydrogen-containing alcohol | HOCH$_2$CH$_2$OH | 5.0 |
| Matrix-forming material | Acrylonitrile-styrene copolymer | 5.0 |
| Dispersing medium | C$_2$H$_5$OH | 20 |
| | H$_2$O | 30 |
| Stabilizer | Polyvinyl pyrrolidone | 0.1 |

0.05 g of AuHCl$_4$.4H$_2$O was added to the solution and the resultant combination was agitated at room temperature, thereby obtaining a mixture. Then, the mixture was cast upon a flat plate, and dried at a temperature of 80° C. for 2 hours, thereby obtaining a transparent light yellow film having a thickness of 200 μm.

The film was irradiated by a xenon lamp in the same manner as in Example 19, thereby obtaining a film made of a colorless material. The obtained film was evaluated in the same manner as in Example 19. The results are shown in Table 11.

Comparative Example 7

A film made of a material irradiated by a xenon lamp was produced in the same manner as in Example 57 except that ethylene glycol (EG) was not used. The film was evaluated and the results thereof are shown in Table 11.

With reference to Table 11, it can be understood that the material produced in Example 57 is able to develop a color due to an increase in the particle diameters of the metal particles upon heat application, and is useful as a thermal-sensitive color developing material for checking the temperature history. Moreover, since the material produced in Example 57 contained polyvinylpyrrolidone, the metal particles were dispersed in a more uniform manner. On the other hand, the material produced without an α-hydrogen-containing alcohol in Comparative Example 7 did not develop a color upon heat application and thus it is recognized useless as a thermal-sensitive color developing material.

Example 58

A solution shown in Table 8 was prepared in the same manner as in Example 42. 0.1 g of AuHCl$_4$.4H$_2$O was added to the solution, and the resultant combination was agitated at room temperature, thereby obtaining a mixture. Then, the mixture was applied on a bag (a base substrate) made of polypropylene having a thickness of 20 μm; dried at room temperature for 5 minutes; and subsequently dried at a temperature of 60° C. for 30 minutes. These application and drying processes were repeated 2 times so as to obtain a laminated body having a transparent light yellow thin-film-like gel film with a thickness of about 1 μm on the base substrate. The thus-obtained laminated body was irradiated by a xenon lamp in the same manner as in Example 19 for 3 minutes, colorless material on the base substrate. The element was used to evaluate the temperature history in the same manner as in Example 19. The results are shown in Table 12.

Comparative Example 8

An element having a film made of a material irradiated by a xenon lamp was produced in the same manner as in

TABLE 11

| | Metal compound[1] | α-hydrogen-containing alcohol | Matrix-forming material | Stabilizer | Particle diameter of metal particle after heat application[3] (nm) | Color tone of film before heat application[2] | Color tone of film after heat application[3] | Temperature history[4] | Peak of surface plasmon absorption of metal particles (nm) |
|---|---|---|---|---|---|---|---|---|---|
| Example 57 | AuHCl$_4$.4H$_2$O (0.05) | EG[5] | Acrylonitrile styrene copolymer | Polyvinyl pyrrolidone | 6 | Colorless | Reddish purple | ◯ | 530 |
| Comparative example 7 | AuHCl$_4$.4H$_2$O (0.05) | Not contained | Acrylonitrile-sytrene copolymer | Polyvinyl pyrrolidone | —[6] | Light yellow | No change | X | — |

[1]Mixed amount (g) is shown in parentheses.
[2]This was observed immediately after the film production.
[3]This was observed after leaving the film in the dark place at 25° C. for 20 minutes.
[4]◯: able to check temperature history, X: unable to check temperature history
[5]Ethylene glycol
[6]Not measured Although the particle diameters of the metal particles contained in the material produced in Example 57 were too small to measure before the heat application, the size of the particles increased after the heat application and the particle diameters thereof were able to be measured.

Example 58 except that ethylene glycol (EG) was not used. The element was evaluated and the results thereof are shown in Table 12.

TABLE 12

| | Metal compound[1] | α-hydrogen-containing alcohol | Matrix-forming material | Particle diameter of metal particle after heat application[3] (nm) | Color tone of film before heat application[2] | Color tone of film after heat application[3] | Temperature history[4] | Peak of surface plasmon absorption of metal particles (nm) |
|---|---|---|---|---|---|---|---|---|
| Example 58 | AuHCl$_4$·4H$_2$O (0.05) | EG[5] | Si(OC$_2$H$_5$)$_4$ | 5 | Colorless | Reddish purple | ○ | 530 |
| Comparative example 8 | AuHCl$_4$·4H$_2$O (0.1) | Not contained | Si(OC$_2$H$_5$)$_4$ | —[6] | Light yellow | No change | X | — |

[1]Mixed amount (g) is shown in parentheses.
[2]This was observed immediately after the element production.
[3]This was observed after leaving the element in the dark place at 25° C. for 20 minutes.
[4]○: able to check temperature history, X: unable to check temperature history
[5]Ethylene glycol
[6]Not measured Although the particle diameters of the metal particles contained in the element produced in Example 58 were too small to measure before the heat application, the size of the particles increased after the heat application and the particle diameters thereof were able to be measured.

With reference to Table 12, it can be understood that the element produced in Example 58 is able to develop a color due to an increase in the particle diameters of the metal particles upon heat application, and is useful as a thermal-sensitive element for checking the temperature history. On the other hand, the element produced without an α-hydrogen-containing alcohol in Comparative Example 8 did not develop a color upon heat application and thus it is recognized useless as a thermal-sensitive element.

Example 59

A solution shown in Table 10 was prepared in the same manner as in Example 57. 0.1 g of AuHCl$_4$·4H$_2$O was added to the solution and the resultant combination was agitated at room temperature, thereby obtaining a mixture. Then, a bag (a base substrate) made of polypropylene having a thickness of 20 μm was immersed in the solution containing such a mixture. The bag was then taken out; dried at room temperature for 10 minutes; and subsequently dried at a temperature of 60° C. for 20 minutes. These immersion and drying processes were repeated 2 times so as to form a transparent light yellow thin-film-like gel film having a thickness of about 1 μm on the surface of the bag.

The thus-obtained bag was irradiated by a xenon lamp in the same manner as in Example 19 for 3 minutes, thereby obtaining an element having a film made of a colorless material. The element was used so as to evaluate the temperature history in the same manner as in Example 19. The results are shown in Table 13.

Example 60

An element was produced in the same manner as in Example 59 except that fabric made of rayon having a thickness of 200 μm was used instead of the polypropylene bag. The element was evaluated. The results are shown in Table 13.

Comparative Example 9

An element having a film made of a material irradiated by a xenon lamp was produced in the same manner as in Example 59 except that ethylene glycol (EG) was not used. The element was evaluated. The results are shown in Table 13.

TABLE 13

| | Base substrate | α-hydrogen-containing alcohol | Matrix-forming material | Particle diameter of metal particle after heat application[3] (nm) | Color tone of film before heat application[2] | Color tone of film after heat application[3] | Temperature history[4] | Peak of surface plasmon absorption of metal particles (nm) |
|---|---|---|---|---|---|---|---|---|
| Example 59 | Polypropylene bag | EG[4] | Acrylonitrile-styrene copolymer | 5 | Colorless | Reddish purple | ○ | 530 |
| Example 60 | Rayon fabric | EG | Acrylonitrile-styrene copolymer | 5 | Colorless | Reddish purple | ○ | 530 |
| Comparative example 9 | Polypropylene bay | Not contained | Acrylonitrile-styrene copolymer | —[5] | Light yellow | No change | X | — |

[1]This was observed immediately after the element production.
[2]This was observed after leaving the element in the dark place at 25 ° C. for 20 minutes.
[3]○: able to check temperature history, X: unable to check temperature history
[4]Ethylene glycol
[5]Not measured Although the particle diameters of the metal particles contained in the elements produced in Examples 59 and 60 were too small to measure before the heat application, the size of the particles increased after the heat application and the particle diameters thereof were able to be measured.

With reference to Table 13, it can be understood that the elements produced in Examples 59 and 60 are able to develop colors due to an increase in the particle diameters of the metal particles upon heat application, and are useful as thermal-sensitive elements for checking the temperature history. On the other hand, the element produced without an α-hydrogen-containing alcohol in Comparative Example 9 did not develop a color upon heat application and thus it is recognized useless as a thermal-sensitive element.

Example 61

A solution shown in Table 6 was prepared in the same manner as in Example 19. 0.2 g of $AuHCl_4 \cdot 4H_2O$ was added, and the resultant combination was agitated at room temperature, thereby obtaining a mixture. Then, the mixture was applied on kraft paper (a base substrate) having a thickness of 50 μm by spin coating; dried at room temperature for 30 minutes; and subsequently dried at a temperature of 60° C. for 30 minutes. These application and drying processes were repeated 2 times so as to obtain a laminated body having a transparent light yellow thin-film-like gel film having a thickness of 0.5 μm. The laminated body was irradiated by a xenon lamp in the same manner as in Example 19 for 3 minutes so as to obtain an element having a film made of a colorless material. The above-described element was used so as to evaluate the temperature history in the same manner as in Example 19. The results are shown in Table 14.

Comparative Example 10

An element having a film made of a material irradiated by a xenon lamp was produced in the same manner as in Example 61 except that ethylene glycol (EG) was not used. The element was evaluated. The results are shown in Table 14.

TABLE 14

| | | | Matrix-forming material | | Particle | | | | Peak of surface plasmon absorption of metal particles (nm) |
|---|---|---|---|---|---|---|---|---|---|
| | Metal compound[1] | α-hydrogen-containing alcohol | Composite-forming inorganic component | Composite-forming organic component | diameter of metal particle after heat application[3] (nm) | Color tone of film before heat application[2] | Color tone of film after heat application[3] | Temperature history[4] | |
| Example 61 | AuHCl₄·4H₂O (0.2) | EG[5] | Si(OC₂H₅)₄ | Polyacrylic acid | 5 | Colorless | Reddish purple | ○ | 530 |
| Comparative example 10 | AuHCl₄·4H₂O (0.2) | Not contained | Si(OC₂H₅)₄ | Polyacrylic acid | —[6] | Light yellow | No change | X | — |

[1]Mixed amount (g) is shown in parentheses.
[2]This was observed immediately after the element production.
[3]This was observed after leaving the element in the dark place at 25° C. for 20 minutes.
[4]○: able to check temperature history, X: unable to check temperature history
[5]Ethylene glycol
[6]Not measured Although the particle diameters of the metal particles contained in the element produced in Example 61 were too small to measure before the heat application, the size of the particles increased after the heat application and the particle diameters thereof were able to be measured.

With reference to Table 14, it can be understood that the element produced in Example 61 is able to develop a color due to an increase in the particle diameters of the metal particles upon heat application, and is useful as a thermal-sensitive element for checking the temperature history. On the other hand, the element produced without an α-hydrogen-containing alcohol in Comparative Example 10 did not develop a color upon heat application and thus it is recognized useless as a thermal-sensitive element.

Example 62

A solution containing materials listed below in Table 15 was prepared.

TABLE 15

| Material | | Mixed amount (g) |
|---|---|---|
| α-hydrogen-containing alcohol | $HOCH_2CH_2OH$ | 20 |
| Matrix-forming material | $Si(OC_2H_5)_4$ | 30 |
| Dispersing medium | $C_2H_5OH$<br>$H_2O$ | 20 |
| Catalyst | HCl | 1.0 |

0.18 g of $AuHCl_4 \cdot 4H_2O$ as the metal compound was added to the solution. The resultant mixture was agitated at room temperature for 1 hour. Then, the mixture was cast upon a flat plate; dried at room temperature for 3 days; and dried at a temperature of 60° C. for 24 hours, thereby obtaining a transparent light yellow gel film having a thickness of 200 μm.

A round-shaped sample having a diameter of 5 mm was cut out from the film and was adhered, by using an epoxy adhesive, on an outside surface of a packaging bag (a base substrate) having frozen food sealed therein, the packaging bag consisting of a three-layered sheet sequentially including an ethylene-vinyl acetate copolymer sheet, aluminum foil and a polyethylene sheet. Then, the film portion, i.e., the round-shaped sample was irradiated with white light at room temperature for 5 minutes using a 500 W xenon lamp which was placed 30 cm away from the film, thereby obtaining an element having a film made of a colorless material. The thus-obtained element was immediately stored in a refrigerator (the dark place) at 0° C. for 2 months.

The element did not develop a color during the storage. After 2 months, the element was taken out from the refrigerator and was left in the dark place at a temperature of 25° C. for 20 minutes, whereby the element developed a color and exhibited a reddish purple color. The element that developed the color contained Au particles having a small particle diameter distribution and an average particle diameter of about 5 nm, and had an absorption peak at 525 nm based on surface plasmon absorption of the Au particles. Then, the element was once again placed in the refrigerator at 0° C. but the color tone of the element that developed the color did not disappear. Thus, the temperature history could be checked. The results of the evaluation of the element obtained in the present example is shown in Table 16.

Examples 63 to 72

Elements made of materials irradiated by a xenon lamp were produced in the same manner as in Example 62 except that the metal compounds, the α-hydrogen-containing alcohols and the matrix-forming materials shown in Table 16 were used. The elements were evaluated. The results are shown in Table 16.

Comparative Example 11

An element was produced in the same manner as in Example 62 except that ethylene glycol (EG) was not used. The element was evaluated. The results are shown in Table 16.

TABLE 16

| | Metal compound[1] | α-hydrogen-containing alcohol | Matrix-forming material | Particle diameter of metal particle after heat application[3] (nm) | Color tone of film before heat application[2] | Color tone of film after heat application[3] | Temperature history[4] | Peak of surface plasmon absorption of metal particles (nm) |
|---|---|---|---|---|---|---|---|---|
| Example 62 | $AuHCl_4 \cdot 4H_2O$ (0.18) | EG[5] | $Si(OC_2H_5)_4$ | 5 | Colorless | Reddish purple | ○ | 525 |
| Example 63 | $AuNaCl_4 \cdot 2H_2O$ (0.17) | EG | $Si(OC_2H_5)_4$ | 5 | Colorless | Reddish purple | ○ | 525 |
| Example 64 | $AuHCl_4$ (0.18) | EG | $Al(OC_2H_5)_3$ | 4 | Colorless | Reddish purple | ○ | 535 |
| Example 65 | $AuHCl_4$ (0.18) | EG | $Ti(OC_2H_5)_4$ | 5 | Colorless | Reddish purple | ○ | 535 |
| Example 66 | $H_2PtCl_6$ (0.20) | EG | $Si(OC_2H_5)_4$ | 5 | Colorless | blackish brown | ○ | No evident peak |
| Example 67 | $AgClO_4$ (0.20) | EG | $Si(OC_2H_5)_4$ | 5 | Colorless | Brown | ○ | 400 |
| Example 68 | $CuCl_2 \cdot 2H_2O$ (0.20) | EG | $Si(OC_2H_5)_4$ | 5 | Colorless | Light green | ○ | 580 |
| Example 69 | $SnCl_2$ (0.20) | EG | $Si(OC_2H_5)_4$ | 5 | Colorless | Dark brown | ○ | No evident peak |
| Example 70 | $IrCl_3$ (0.20) | EG | $Si(OC_2H_5)_4$ | 6 | Colorless | blackish brown | ○ | No evident peak |
| Example 71 | $RhCl_3 \cdot 3H_2O$ (0.21) | EG | $Si(OC_2H_5)_4$ | 5 | Colorless | blackish brown | ○ | No evident peak |
| Example 72 | $PdCl_2 \cdot 2H_2O$ (0.23) | EG | $Si(OC_2H_5)_4$ | 6 | Colorless | blackish brown | ○ | No evident peak |
| Comparative example 11 | $AuHCl_4 \cdot 4H_2O$ (0.18) | Not contained | $Si(OC_2H_5)_4$ | —[6] | Light yellow | No change | X | — |

[1]Mixed amount (g) is shown in parentheses.
[2]This was observed immediately after the element production.
[3]This was observed after leaving the element in the dark place at 25° C. for 20 minutes.

TABLE 16-continued

| Metal compound[1] | α-hydrogen-containing alcohol | Matrix-forming material | Particle diameter of metal particle after heat application[3] (nm) | Color tone of film before heat application[2] | Color tone of film after heat application[3] | Temperature history[4] | Peak of surface plasmon absorption of metal particles (nm) |
|---|---|---|---|---|---|---|---|

[4]○: able to check temperature history, X: unable to check temperature history
[5]Ethylene glycol
[6]Not measured Although the particle diameters of the metal particles contained in the elements produced in Examples 62 to 72 were too small to measure before the heat application, the size of the particles increased after the heat application and the particle diameters thereof were able to be measured.

With reference to Table 16, it can be understood that the elements produced in Examples 62 to 72 are able to develop colors due to an increase in the particle diameters of the metal particles upon heat application, and are useful as thermal-sensitive elements for checking the temperature history. On the other hand, the element produced without an α-hydrogen-containing alcohol in Comparative Example 11 did not develop a color upon heat application and thus it is recognized useless as a thermal-sensitive element.

Among the elements obtained in Example 62 and Examples 66 to 72, the element containing Au particles obtained in Example 62 developed a brilliant color with the most excellent contrast as a thermal-sensitive element.

Example 73

Elements A to C were produced in the same manner as in Example 62 except that amounts of $AuHCl_4 \cdot 4H_2O$ were 0.018 g, 0.54 g and 1.8 g, respectively. The thus-obtained elements were stored in a refrigerator at 0° C. for 2 months. None of the elements developed a color during the storage. Then, these elements were taken out from the refrigerator and were left in the dark place for 30 minutes at various temperatures. Element A developed a reddish purple color at a temperature of 28 C.; element B developed a reddish purple color at a temperature of 15°C.; and element C developed a reddish purple color at a temperature of 7° C.

Thus, it is understood that the element obtained in the present example is useful as a thermal-sensitive element. Furthermore, when these elements contain metal particles of various concentrations and heat is applied thereto in the dark place for a certain time, it can be appreciated that a temperature for obtaining a particular color tone varies depending on the concentration of the metal particles.

Example 74

Elements were made in the same manner as in Example 62 and were stored in a refrigerator at 0° C. for 2 months. Then, the elements were taken out from the refrigerator and were left in the dark place at temperatures of 25° C., 40° C. and 60° C., respectively for 20 minutes. These elements developed a reddish purple color at 25° C., a brownish purple color at 40° C. and a brown color at 60° C., respectively.

Accordingly, it can be appreciated that the element obtained in the present example is useful as a thermal-sensitive element. Furthermore, it is also understood that under the conditions where heat is applied to the element in the dark place for a certain time, a color tone obtained by color development varies depending on the temperature.

Examples 75 to 82

Elements were produced in the same manner as in Example 62 and Examples 66 to 72 except that the temperature at the time of irradiation by a xenon lamp was set to 0° C. The elements were evaluated. All results of the evaluation of the obtained elements were same as those obtained in Example 62 and Examples 66 to 72 and the elements were found to be useful as thermal-sensitive element.

Examples 83 and 84

Solutions containing materials listed below in Table 17 were prepared.

TABLE 17

| Material | | | Mixed amount (g) |
|---|---|---|---|
| α-hydrogen-containing alcohol | | $HOCH_2CH_2OH$ | 20 |
| Matrix-forming substance | Composite-forming inorganic component | $Si(OC_2H_5)_4$ | 30 |
| | Composite-forming organic component | Polyvinyl alcohol | 5.0 |
| Dispersing medium | | $C_2H_5OH$ | 20 |
| | | $H_2O$ | 30 |
| Catalyst | | HCl | 1.0 |

Metal compounds of types and amounts shown in Table 18 were respectively added to each of the solutions and the resultant combinations were agitated at room temperature, thereby obtaining mixtures. Then, a transparent light yellow film having a thickness of 200 μm was obtained from each of the mixtures in the same manner as in Example 62. Moreover, a round-shaped sample was taken out from each film in the same manner as in Example 62 and elements were produced for evaluation. The results are shown in Table 18.

Comparative Example 12

An element was produced in the same manner as in Example 83 except that ethylene glycol (EG) was not used. The element was evaluated. The results are shown in Table 18.

TABLE 18

| | Metal compound[1] | α-hydrogen-containing alcohol | Matrix-forming material | | Particle | | | | Peak of surface plasmon absorption of metal particles (nm) |
|---|---|---|---|---|---|---|---|---|---|
| | | | Composite-forming inorganic component | Composite-forming organic component | diameter of metal particle after heat application[3] (nm) | Color tone of film before heat application[2] | Color tone of film after heat application[3] | Temperature history[4] | |
| Example 83 | AuHCl$_4$·4H$_2$O (0.18) | EG[5] | Si(OC$_2$H$_5$)$_4$ | Polyvinyl alcohol | 5 | Colorless | Reddish purple | ○ | 525 |
| Example 84 | AuNaCl$_4$·2H$_2$O (0.17) | EG | Si(OC$_2$H$_5$)$_4$ | Polyvinyl alcohol | 5 | Colorless | Reddish purple | ○ | 530 |
| Comparative example 12 | AuHCl$_4$·4H$_2$O (0.18) | Not contained | Si(OC$_2$H$_5$)$_4$ | Polyvinyl alcohol | —[6] | Light yellow | No change | X | — |

[1] Mixed amount (g) is shown in parentheses.
[2] This was observed immediately after the element production.
[3] This was observed after leaving the element in the dark place at 25° C. for 20 minutes.
[4] ○: able to check temperature history, X: unable to check temperature history
[5] Ethylene glycol
[6] Not measured Although the particle diameters of the metal particles contained in the elements produced in Examples 83 and 84 were too small to measure before the heat application, the size of the particles increased after the heat application and the particle diameters thereof were able to be measured.

With reference to Table 18, it can be understood that the elements produced in Examples 83 and 84 are able to develop colors due to an increase in the particle diameters of the metal particles upon heat application, and are useful as thermal-sensitive elements for checking the temperature history. On the other hand, the element produced without an α-hydrogen-containing alcohol in Comparative Example 12 did not develop a color upon heat application and thus it is recognized useless as a thermal-sensitive element.

Example 85

Elements A to C were produced in the same manner as in Example 83 except that amounts of $AuHCl_4 \cdot 4H_2O$ were 0.018 g, 0.54 g and 1.8 g, respectively. The thus-obtained elements were stored in a refrigerator at 0° C. for 2 months. None of the elements developed a color during the storage. Then, these elements were taken out from the refrigerator and were left in the dark place at various temperatures for 30 minutes. Element A developed a reddish purple color at a temperature of 28° C.; element B developed a reddish purple color at a temperature of 15° C.; and element C developed a reddish purple color at a temperature of 7° C.

Accordingly, it is understood that the element obtained in the present example is useful as a thermal-sensitive element. It is further understood that in the case where these elements contain metal particles of various concentrations and heat is applied thereto in the dark place for a certain time, the temperature for obtaining a particular color tone varies depending on the concentration of the metal particles.

Example 86

Elements were made in the same manner as in Example 83 and were stored in a refrigerator at 0° C. for 2 months. Then, the elements were taken out from the refrigerator and were left in the dark place at temperatures of 25° C., 40° C. and 60° C., respectively for 30 minutes. These elements developed a reddish purple color at 25° C., a brownish purple color at 40° C. and a brown color at 60° C., respectively.

Accordingly, it is appreciated that the element obtained in the present example is useful as a thermal-sensitive element. Furthermore, it is also understood that under the conditions where heat is applied to the element made of such a material in the dark place for a certain time, a color tone obtained upon color development varies depending on the temperature.

Examples 87 and 88

Elements were produced in the same manner as in Examples 83 and 84 except that the temperature at the time of the xenon lamp radiation was set to 0° C. The elements were evaluated. All results were same as those obtained in Examples 83 to 84 and the elements were found to be useful as thermal-sensitive elements.

Examples 89 to 101

Solutions containing materials listed below in Table 19 were prepared.

TABLE 19

| Material | | Mixed amount (g) |
|---|---|---|
| α-hydrogen-containing alcohol | $HOCH_2CH_2OH$ | 5.0 |
| Matrix-forming material | Polyvinyl alcohol | 5.0 |
| Dispersing medium | $C_2H_5OH$ | 20 |
| | $H_2O$ | 30 |

Metal compounds of types and amounts shown in Table 20 were respectively added to the solutions and the resultant combinations were agitated at room temperature, thereby obtaining mixtures. Then, a transparent light yellow film having a thickness of 200 μm was obtained from each of the mixtures in the same manner as in Example 62. Moreover, a round-shaped sample was cut out from each film in the same manner as in Example 62 so as to produce an element for evaluation. The results are shown in Table 20.

Comparative Example 13

An element was produced in the same manner as in Example 89 except that ethylene glycol (EG) was not used.

The element was evaluated. The results are shown in Table 20.

TABLE 20

| | Metal compound[1] | α-hydrogen-containing alcohol | Matrix-forming material | Particle diameter of metal particle after heat application[3] (nm) | Color tone of element before heat application[2] | Color tone of element after heat application[3] | Temperature history[4] | Peak of surface plasmon absorption of metal particles (nm) |
|---|---|---|---|---|---|---|---|---|
| Example 89 | $AuHCl_4 \cdot 4H_2O$ (0.05) | EG[5] | Polyvinyl alcohol | 4 | Colorless | Reddish purple | ○ | 530 |
| Example 90 | $AuNaCl_4 \cdot 2H_2O$ (0.05) | EG | Polyvinyl alcohol | 4 | Colorless | Reddish purple | ○ | 530 |
| Example 91 | $AuHCl_4 \cdot 4H_2O$ (0.05) | EG | Polyvinyl butyral | 5 | Colorless | Reddish purple | ○ | 540 |
| Example 92 | $AuHCl_4 \cdot 4H_2O$ (0.05) | EG | Polystyrene | 5 | Colorless | Reddish purple | ○ | 540 |
| Example 93 | $AuHCl_4 \cdot 4H_2O$ (0.05) | EG | Acrylonitrile-styrene | 4 | Colorless | Reddish purple | ○ | 540 |

TABLE 20-continued

| | Metal compound[1] | α-hydrogen-containing alcohol | Matrix-forming material | Particle diameter of metal particle after heat application[3] (nm) | Color tone of element before heat application[2] | Color tone of element after heat application[3] | Temperature history[4] | Peak of surface plasmon absorption of metal particles (nm) |
|---|---|---|---|---|---|---|---|---|
| Example 94 | AuHCl$_4$.4H$_2$O (0.05) | EG | copolymer Fluorocarbon resin | 5 | Colorless | Reddish purple | ○ | 540 |
| Example 95 | H$_2$PtCl$_6$.6H$_2$O (0.05) | EG | Polyvinyl alcohol | 5 | Colorless | Blackish brown | ○ | No evident peak |
| Example 96 | AgClO$_4$ (0.05) | EG | Polyvinyl alcohol | 4 | Colorless | Brown | ○ | 400 |
| Example 97 | CuCl$_2$.2H$_2$O (0.05) | EG | Polyvinyl alcohol | 5 | Colorless | Light green | ○ | 595 |
| Example 98 | SnCl$_2$ (0.05) | EG | Polyvinyl alcohol | 5 | Colorless | Dark brown | ○ | No evident peak |
| Example 99 | IrCl$_3$ (0.05) | EG | Polyvinyl alcohol | 5 | Colorless | Blackish brown | ○ | No evident peak |
| Example 100 | RhCl$_3$.3H$_2$O (0.05) | EG | Polyvinyl alcohol | 5 | Colorless | Blackish brown | ○ | No evident peak |
| Example 101 | PdCl$_2$.2H$_2$O (0.05) | EG | Polyvinyl alcohol | 5 | Colorless | Blackish brown | ○ | No evident peak |
| Comparative example 13 | AuHCl$_4$.4H$_2$O (0.05) | Not contained | Polyvinyl alcohol | —[6] | Light yellow | No change | X | — |

[1]Mixed amount (g) is shown in parentheses.
[2]This was observed immediately after the element production.
[3]This was observed after leaving the element in the dark place at 25° C. for 20 minutes.
[4]○: able to check temperature history, X: unable to check temperature history
[5]Ethylene glycol
[6]Not measured Although the particle diameters of the metal particles contained in the elements produced in Examples 89 to 101 were too small to measure before the heat application, the size of the particles increased after the heat application and the particle diameters thereof were able to be measured.

With reference to Table 20, it can be understood that the elements produced in Examples 89 to 101 are able to develop colors due to an increase in the particle diameters of the metal particles upon heat application, and are useful as thermal-sensitive elements for checking the temperature history. On the other hand, the element produced without an α-hydrogen-containing alcohol in Comparative Example 13 did not develop a color upon heat application and thus it is recognized useless as a thermal-sensitive element.

Among the elements obtained in Examples 89 to 94, the element using a fluorocarbon resin obtained in Example 94 was especially transparent and excellent in mechanical strength. Furthermore, among the elements obtained in Example 89 and Examples 95 to 101, the element containing Au particles obtained in Example 89 developed a brilliant color with the most excellent contrast as a thermal-sensitive element.

Example 102

Elements A to C were produced in the same manner as in Example 89 except that amounts of AuHCl$_4$.4H$_2$O were 0.005 g, 0.15 g and 0.5 g, respectively. The thus-obtained elements were stored in a refrigerator at 0° C. for 2 months. None of the elements developed a color during the storage. Then, these elements were taken out from the refrigerator and were left in the dark place for 30 minutes. Element A developed a reddish purple color at a temperature of 29° C.; element B developed a reddish purple color at a temperature of 16° C.; and element C developed a reddish purple color at a temperature of 7° C.

Accordingly, it is understood that the element obtained in the present example is useful as a thermal-sensitive element. It is further understood that in the case where these elements contain metal particles of various concentrations and heat is applied thereto in the dark place for a certain time, the temperature for obtaining a particular color tone varies depending on the concentration of the metal particles.

Example 103

Elements were made in the same manner as in Example 89 and were stored in a refrigerator at 0° C. for 2 months. Then, the elements were taken out from the refrigerator and were left in the dark place at temperatures of 25° C., 40° C. and 60° C., respectively for 30 minutes. These elements developed a reddish purple color at 25° C., a brownish purple color at 40° C. and a brown color at a temperature of 60° C., respectively.

Accordingly, it is appreciated that the element obtained in the present example is useful as a thermal-sensitive element. It is further understood that when heat is applied to the element made of such material in the dark place for a certain time, a color tone obtained upon color development varies depending on the temperature.

Example 104

A solution shown in Table 19 was prepared in the same manner as in Example 89. 0.05 g of AuHCl$_4$.4H$_2$O was added to the solution and the resultant combination was agitated at room temperature. Then, the obtained mixture was cast upon a flat plate, subjected to thermo compression and dried at 80° C. for 2 hours, thereby obtaining a bag made from a transparent light yellow sheet having a thickness of about 500 μm. Frozen food was put into this bag and thereafter the bag was sealed.

The bag was irradiated with white light at room temperature for 5 minutes using a 500 W xenon lamp which was

TABLE 21

| | Metal compound[1] | α-hydrogen-containing alcohol | Matrix-forming material | Particle diameter of metal particle after heat application[3] (nm) | Color tone of element before heat application[2] | Color tone of element after heat application[3] | Temperature history[4] | Peak of surface plasmon absorption of metal particles (nm) |
|---|---|---|---|---|---|---|---|---|
| Example 104 | AuHCl$_4$.4H$_2$O (0.05) | EG[5] | Polyvinyl alcohol | 4 | Colorless | Reddish purple | ◯ | 530 |
| Example 105 | AuNaCl$_4$.2H$_2$O (0.05) | EG | Polyvinyl alcohol | 5 | Colorless | Reddish purple | ◯ | 550 |
| Example 106 | AuHCl$_4$.4H$_2$O (0.05) | EG | Polyvinyl butyral | 5 | Colorless | Reddish purple | ◯ | 540 |
| Example 107 | AuHCl$_4$.4H$_2$O (0.05) | EG | Polystyrene | 5 | Colorless | Reddish purple | ◯ | 540 |
| Example 108 | AuHCl$_4$.4H$_2$O (0.05) | EG | Acrylonitrile-styrene copolymer | 5 | Colorless | Reddish purple | ◯ | 540 |
| Example 109 | AuHCl$_4$.4H$_2$O (0.05) | EG | Fluorocarbon resin | 5 | Colorless | Reddish purple | ◯ | 540 |
| Comparative example 14 | AuHCl$_4$.4H$_2$O (0.05) | Not contained | Polyvinyl | —[6] | Light yellow | No change | X | —[6] |

[1]Mixed amount (g) is shown in parentheses.
[2]This was observed immediately after the element production.
[3]This was observed after leaving the element in the dark place at 25° C. for 20 minutes.
[4]◯: able to check temperature history, X: unable to check temperature history
[5]Ethylene glycol
[6]Not measured placed 30 cm away from the film, thereby obtaining an element having a film made of a colorless material. The thus-obtained element was immediately stored in a refrigerator (the dark place) at 0° C. for 2 months.

The element did not develop a color during the storage. After 2 months, the element was taken out from the refrigerator and was left in the dark place at a temperature of 25° C. for 20 minutes, whereby the element developed a color and exhibited a reddish purple color. The element that developed the color contained Au particles having a small particle diameter distribution and an average particle diameter of about 4 nm, and had an absorption peak at 530 nm based on surface plasmon absorption of the Au particles. Then, the element was once again placed in the refrigerator at 0° C. but the color tone of the element that developed the color did not disappear. Thus, the temperature history could be checked. The results of the evaluation of the element obtained in the present example are shown in Table 21.

Examples 105 to 109

Elements were produced in the same manner as in Example 104 except that the metal compounds, the α-hydrogen-containing alcohols and the matrix-forming materials shown in Table 21 were used. The elements were evaluated and the results thereof are shown in Table 21.

Comparative Example 14

An element was produced in the same manner as in Example 104 except that ethylene glycol (EG) was not used. The element was evaluated and the results thereof are shown in Table 21.

Although the particle diameters of the metal particles contained in the elements produced in Examples 104 to 109 were too small to measure before the heat application, the size of the particles increased after the heat application and the particle diameters thereof were able to be measured.

With reference to Table 21, it can be understood that the elements produced in Examples 104 to 109 are able to develop colors due to an increase in the particle diameters of the metal particles upon heat application, and are useful as thermal-sensitive elements for checking the temperature history. On the other hand, the element produced without an α-hydrogen-containing alcohol in Comparative Example 14 did not develop a color upon heat application and thus it is recognized useless as a thermal-sensitive element.

Among the elements obtained in Example 104 to 109, the element using a fluorocarbon resin obtained in Example 109 was especially transparent and excellent in mechanical strength. Furthermore, the elements using polyvinyl alcohol described in Examples 104 and 105 exhibited excellent transparency and they were able to be produced at a relatively low cost.

Example 110

Elements A to C were produced in the same manner as in Example 104 except that amounts of AuHCl$_4$.4H$_2$O were 0.005 g, 0.15 g and 0.50 g, respectively. The thus-obtained elements were stored in a refrigerator at 0° C. for 2 months. None of the elements developed a color during the storage. Then, these elements were taken out from the refrigerator and were left in the dark place for 30 minutes. Element A developed a reddish purple color at a temperature of 29° C.;

element B developed a reddish purple color at a temperature of 16° C.; and element C developed a reddish purple color at a temperature of 7° C.

Accordingly, it is understood that the element obtained in the present example is useful as a thermal-sensitive element. It is further understood that in the case where these elements contain metal particles of various concentrations and heat is applied thereto in the dark place for a certain time, the temperature for obtaining a particular color tone varies depending on the concentration of the metal particles.

Example 111

Elements were made in the same manner as in Example 104 and were stored in a refrigerator at 0° C. for 2 months. Then, the elements were taken out from the refrigerator and were left in the dark place at temperatures of 25° C., 40° C. and 60° C., respectively for 30 minutes. These elements developed a reddish purple color at 25° C., a brownish purple color at 40° C. and a brown color at a temperature of 60° C., respectively.

Accordingly, it can be appreciated that the element obtained in the present example is useful as a thermal-sensitive element. Furthermore, it is also understood that under the conditions where heat is applied to the element made of such material in the dark place for a certain time, a color tone obtained upon color development varies depending on the temperature.

Example 112

A solution containing materials listed below in Table 22 was prepared.

TABLE 22

| Material | | Mixed amount (g) |
|---|---|---|
| α-hydrogen-containing alcohol | HOCH$_2$CH$_2$OH | 5.0 |
| Matrix-forming material | Acrylonitrile-styrene copolymer | 5.0 |
| Dispersing medium | C$_2$H$_5$OH | 20 |
| | H$_2$O | 30 |

TABLE 22-continued

| Material | | Mixed amount (g) |
|---|---|---|
| Stabilizer | Polyvinyl pyrrolidone | 0.1 |

0.05 g of AuHCl$_4$.4H$_2$O was added to the solution and the resultant combination was agitated at room temperature, thereby obtaining a mixture. Then, the mixture was cast upon a flat plate, and dried at a temperature of 80° C. for 2 hours, thereby obtaining a transparent light yellow film having a thickness of 200 μm.

A round-shaped sample having a diameter of 5 mm was cut out from-the film and was adhered, by using an epoxy adhesive, on an outside surface of a packaging bag (a base substrate) having frozen food sealed therein, the packaging bag consisting of a three-layered sheet sequentially including an ethylene-vinyl acetate copolymer sheet, aluminum foil and a polyethylene sheet. Then, the film portion, i.e., the round-shaped sample was irradiated by a xenon lamp in the same manner as in Example 62, thereby obtaining an element having a film made of a colorless material on the base substrate. The element was used to evaluate the temperature history in the same manner as in Example 62. The results are shown in Table 23.

Comparative Example 15

An element was produced in the same manner as in Example 112 except that ethylene glycol (EG) was not used. The element was evaluated. The results are shown in Table 23.

TABLE 23

| | Metal compound[1] | α-hydrogen-containing alcohol | Matrix-forming material | Stabilizer | Particle diameter of metal particle after heat application[3] (nm) | Color tone of element before heat application[2] | Color tone of element after heat application[3] | Temperature history[4] | Peak of surface plasmon absorption of metal particles (nm) |
|---|---|---|---|---|---|---|---|---|---|
| Example 112 | AuHCl$_4$.4H$_2$O (0.05) | EG[5] | Si(OC$_2$H$_5$)$_4$ | Polyvinyl pyrrolidone | 5 | Colorless | Reddish purple | ○ | 530 |
| Comparative example | AuHCl$_4$.4H$_2$O (0.05) | Not contained | Si(OC$_2$H$_5$)$_4$ | Polyvinyl pyrrolidone | —[6] | Light yellow | No change | X | — |

TABLE 23-continued

| Metal compound[1] | α-hydrogen-containing alcohol | Matrix-forming material | Stabilizer | Particle diameter of metal particle after heat application[3] (nm) | Color tone of element before heat application[2] | Color tone of element after heat application[3] | Temperature history[4] | Peak of surface plasmon absorption of metal particles (nm) |
|---|---|---|---|---|---|---|---|---|
| 15 | | | | | | | | |

[1] Mixed amount (g) is shown in parentheses.
[2] This was observed immediately after the element production.
[3] This was observed after leaving the element in the dark place at 25° C. for 20 minutes.
[4] ○: able to check temperature history, X: unable to check temperature history
[5] Ethylene glycol
[6] Not measured Although the particle diameters of the metal particles contained in the element produced in Example 112 were too small to measure before the heat application, the size of the particles increased after the heat application and the particle diameters thereof were able to be measured.

With reference to Table 23, it can be understood that the element produced in Example 112 was able to develop a color due to an increase in the particle diameters of the metal particles upon heat application, and was useful as a thermal-sensitive element for checking the temperature history. Moreover, since the element produced in Example 112 contained polyvinylpyrrolidone, the metal particles were dispersed in a more uniform manner. On the other hand, the element produced without an α-hydrogen-containing alcohol in Comparative Example 7 did not develop a color upon heat application and thus it is recognized useless as a thermal-sensitive element.

Example 113

A solution shown in Table 15 was prepared in the same manner as in Example 62. 0.18 g of $AuHCl_4 \cdot 4H_2O$ was added to the solution and the resultant combination was agitated at room temperature, thereby obtaining a mixture. Then, the mixture was applied to a three-layered packaging sheet (a base substrate) having a thickness of 50 μm which sequentially includes an ethylene-vinyl acetate copolymer sheet, aluminum foil and a polyethylene sheet; dried at room temperature for 5 minutes; and subsequently dried at a temperature of 60° C. for 30 minutes. These application and drying processes were repeated 2 times, thereby obtaining a laminated body having a transparent light yellow thin-film-like gel having a thickness of about 1 μm on the base substrate. Then, the laminated body was irradiated by a xenon lamp for 3 minutes in the same manner as in Example 62, thereby obtaining an element having a film made of a colorless material on the base substrate. The element was used so as to evaluate the temperature history in the same manner as in Example 62. The results are shown in Table 24.

Comparative Example 16

An element was produced in the same manner as in Example 113 except that ethylene glycol (EG) was not used. The element was evaluated. The results are shown in Table 24.

TABLE 24

| | Metal compound[1] | α-hydrogen-containing alcohol | Matrix-forming material | Particle diameter of metal particle after heat application[3] (nm) | Color tone of element before heat application[2] | Color tone of element after heat application[3] | Temperature history[4] | Peak of surface plasmon absorption of metal particles (nm) |
|---|---|---|---|---|---|---|---|---|
| Example 113 | $AuHCl_4 \cdot 4H_2O$ (0.18) | EG[5] | $Si(OC_2H_5)_4$ | 5 | Colorless | Reddish purple | ○ | 530 |
| Comparative example 16 | $AuHCl_4 \cdot 4H_2O$ (0.18) | Not contained | $Si(OC_2H_5)_4$ | —[6] | Light yellow | No change | X | — |

[1] Mixed amount (g) is shown in parentheses.
[2] This was observed immediately after the element production.
[3] This was observed after leaving the element in the dark place at 25° C. for 20 minutes.
[4] ○: able to check temperature history, X: unable to check temperature history
[5] Ethylene glycol
[6] Not measured Although the particle diameters of the metal particles contained in the element produced in Example 113 were too small to measure before the heat application, the size of the particles increased after the heat application and the particle diameters thereof were able to be measured.

With reference to Table 24, it can be understood that the element produced in Example 113 is able to develop a color due to an increase in the particle diameters of the metal particles upon heat application, and is useful as a thermal-sensitive element for checking the temperature history. On the other hand, the element produced without an α-hydrogen-containing alcohol in Comparative Example 16 did not develop a color upon heat application and thus it is recognized useless as a thermal-sensitive element.

Example 114

A solution shown in Table 17 was prepared in the same manner as in Example 83. 0.18 g of $AuCl_4 \cdot 4H_2O$ was added, and the resultant combination was agitated at room temperature, thereby obtaining a mixture. Then, the mixture was applied on kraft paper (a base substrate) having a thickness of 50 μm by spin coating; dried at room temperature for 30 minutes; and subsequently dried at a temperature of 60° C. for 30 minutes. These application and drying processes were repeated 2 times so as to obtain a laminated body having a transparent light yellow thin-film-like gel film having a thickness of about 0.5 μm. The laminated body was irradiated by a xenon lamp in the same manner as in Example 62 for 3 minutes so as to obtain an element having a film made of a colorless material. The element was used so as to evaluate the temperature history in the same manner as in Example 62. The results are shown in Table 25.

Comparative Example 17

An element was produced in the same manner as in Example 114, except that ethylene glycol (EG) was not used. The element was evaluated. The results are shown in Table 25.

TABLE 25

| | Metal compound[1] | Matrix-forming material | | | Particle diameter of metal particle after heat application[3] (nm) | Color tone of film before heat application[2] | Color tone of film after heat application[3] | Temperature history[4] | Peak of surface plasmon absorption of metal particles (nm) |
|---|---|---|---|---|---|---|---|---|---|
| | | α-hydrogen-containing alcohol | Composite-forming inorganic component | Composite-forming organic component | | | | | |
| Example 114 | AuHCl$_4$·4H$_2$O (0.18) | EG[5] | Si(OC$_2$H$_5$)$_4$ | Polyvinyl alcohol | 5 | Colorless | Reddish purple | ○ | 530 |
| Comparative example 17 | AuHCl$_4$·4H$_2$O (0.18) | Not contained | Si(OC$_2$H$_5$)$_4$ | Polyvinyl alcohol | —[6] | Light yellow | No change | X | — |

[1] Mixed amount (g) is shown in parentheses.
[2] This was observed immediately after the element production.
[3] This was observed after leaving the element in the dark place at 25° C. for 20 minutes.
[4] ○: able to check temperature history, X: unable to check temperature history
[5] Ethylene glycol
[6] Not measured Although the particle diameters of the metal particles contained in the element produced in Example 114 were too small to measure before the heat application, the size of the particles increased after the heat application and the particle diameters thereof were able to be measured.

With reference to Table 25, it can be understood that the element produced in Example 114 is able to develop a color due to an increase in the particle diameters of the metal particles upon heat application, and is useful as a thermal-sensitive element for checking the temperature history. On the other hand, the element produced without an α-hydrogen-containing alcohol in Comparative Example 17 did not develop a color upon heat application and thus it is recognized useless as a thermal-sensitive element.

Example 115

A solution shown in Table 19 was prepared in the same manner as in Example 89. 0.05 g of $AuHCl_4 \cdot 4H_2O$ was added to the solution and the resultant combination was agitated at room temperature, thereby obtaining a mixture. Then, the mixture was applied to a three-layered packaging sheet (a base substrate) having a thickness of 100 μm which sequentially includes an ethylene-vinyl acetate copolymer sheet, aluminum foil and a polyethylene sheet; dried at room temperature for 5 minutes; and subsequently dried at a temperature of 60° C. for 30 minutes. These application and drying processes were repeated 2 times, thereby obtaining a laminated body having a transparent light yellow thin-film-like gel having a thickness of about 1 μm on the base substrate. Then, the laminated body was irradiated by a xenon lamp for 3 minutes in the same manner as in Example 62, thereby obtaining an element having a film made of a colorless material on the base substrate. The element was used so as to evaluate the temperature history in the same manner as in Example 62. The results are shown in Table 26.

Example 116

An element was produced in the same manner as in Example 115 except that fabric made of rayon having a thickness of 200 μm was used instead of the polypropylene bag. The element was evaluated. The results are shown in Table 26.

Comparative Example 18

An element was produced in the same manner as in Example 115 except that ethylene glycol (EG) was not used. The element was evaluated. The results are shown in Table 26.

TABLE 26

| | Base substrate | α-hydrogen-containing alcohol | Matrix-forming material | Particle diameter of metal particle after heat application[3] (nm) | Color tone of element before heat application[2] | Color tone of element after heat application[3] | Temperature history[4] | Peak of surface plasmon absorption of metal particles (nm) |
|---|---|---|---|---|---|---|---|---|
| Example 115 | Polypropylene bag | EG[4] | Polyvinyl alcohol | 5 | Colorless | Reddish purple | ○ | 530 |
| Example 116 | Rayon fabric | EG | Polyvinyl alcohol | 5 | Colorless | Reddish purple | ○ | 530 |
| Comparative example 18 | Polypropylene bag | Not contained | Polyvinyl alcohol | —[5] | Light yellow | No change | X | — |

[1] This was observed immediately after the element production.
[2] This was observed after leaving the element in the dark place at 25° C. for 20 minutes.
[3] ○: able to check temperature history, X: unable to check temperature history
[4] Ethylene glycol
[5] Not measured Although the particle diameters of the metal particles contained in the elements produced in Examples 115 and 116 were too small to measure before the heat application, the size of the particles increased after the heat application and the particle diameters thereof were able to be measured.

With reference to Table 26, it can be understood that the elements produced in Examples 115 and 116 are able to develop colors due to an increase in the particle diameters of the metal particles upon heat application, and are useful as thermal-sensitive elements for checking the temperature history. On the other hand, the element produced without an α-hydrogen-containing alcohol in Comparative Example 18 did not develop a color upon heat application and thus it is recognized useless as a thermal-sensitive element.

Example 117

A solution containing materials listed below in Table 27 was prepared.

TABLE 27

| Material | | Mixed amount (g) |
|---|---|---|
| α-hydrogen-containing alcohol | $HOCH_2CH_2OH$ | 20 |
| Matrix-forming material | $Si(OC_2H_5)_4$ | 30 |
| Dispersing medium | $C_2H_5OH$ | 20 |
| | $H_2O$ | 30 |
| Catalyst | HCl | 1.0 |

0.18 g of $AuHCl_4 \cdot 4H_2O$ as the metal compound was added to the solution. The resultant mixture was agitated at room temperature for 1 hour. Then, the mixture was cast upon a flat plate; dried at room temperature for 3 days; and dried at a temperature of 60° C. for 24 hours, thereby obtaining a transparent light yellow film having a thickness of 200 μm.

The film was irradiated with white light at room temperature for 5 minutes using a 500 W xenon lamp which was placed 30 cm away from the film, thereby obtaining a film made of a colorless material. Metal tapes of aluminum foil having an adhesive layer on one surface were adhered on both surfaces of the film so as to produce an element that prevents transmission of external light. The element was immediately stored in a refrigerator (the dark place) at 0° C. for 2 months.

The element did not develop a color during the storage. After 2 months, the element was taken out from the refrigerator and was left under the direct sunlight at a temperature of 25° C. for 10 minutes. Then, the metal tapes were removed from the element and found that the film of the element developed a reddish purple color. The film of the element that developed the color contained Au particles having a small particle diameter distribution and an average particle diameter of about 5 nm, and had an absorption peak at 525 nm based on surface plasmon absorption of the Au particles. Then, the element was once again placed in the refrigerator at 0° C. but the color tone of the film of the element that developed the color did not disappear. Thus, the temperature history could be checked. The types of the used metal compound, the α-hydrogen-containing alcohol and the matrix-forming material, and the results of the evaluation of the obtained element are shown in Table 28.

It was found that an element made of a material irradiated by a xenon lamp in the same manner as described above but without adhering the metal tapes developed a color and changed a color tone thereof when it was exposed to the direct sunlight at room temperature for a substantially long time (about 10 hours or more).

Examples 118 to 127

Elements were produced in the same manner as in Example 117 except that the metal compounds, the α-hydrogen-containing alcohols and the matrix-forming materials shown in Table 28 were used. The elements were evaluated. The results are shown in Table 28.

Comparative Example 19

An element was produced in the same manner as in Example 117 except that ethylene glycol (EG) was not used. The element was evaluated. The results are shown in Table 28.

TABLE 28

| | Metal compound[1] | α-hydrogen-containing alcohol | Matrix-forming material | Particle diameter of metal particle after heat application[3] (nm) | Color tone of element before heat application[2] | Color tone of element after heat application[3] | Temperature history[4] | Peak of surface plasmon absorption of metal particles (nm) |
|---|---|---|---|---|---|---|---|---|
| Example 117 | $AuHCl_4 \cdot 4H_2O$ (0.18) | EG[5] | $Si(OC_2H_5)_4$ | 5 | Colorless | Reddish purple | ○ | 525 |
| Example 118 | $AuNaCl_4 \cdot 2H_2O$ (0.17) | EG | $Si(OC_2H_5)_4$ | 5 | Colorless | Reddish purple | ○ | No evident peak |
| Example 119 | $AuHCl_4 \cdot 4H_2O$ (0.18) | EG | $Al(OC_2H_5)_3$ | 5 | Colorless | Reddish purple | ○ | 530 |
| Example 120 | $AuHCl_4 \cdot 4H_2O$ (0.18) | EG | $Ti(OC_2H_5)_4$ | 4 | Colorless | Reddish purple | ○ | 555 |
| Example 121 | $H_2PtCl_6 \cdot 6H_2O$ (0.20) | EG | $Si(OC_2H_5)_4$ | 5 | Colorless | Blackish brown | ○ | No evident peak |
| Example 122 | $AgClO_4$ (0.20) | EG | $Si(OC_2H_5)_4$ | 5 | Colorless | Brown | ○ | 400 |
| Example 123 | $CuCl_2 \cdot 2H_2O$ (0.20) | EG | $Si(OC_2H_5)_4$ | 5 | Colorless | Light green | ○ | 590 |
| Example 124 | $SnCl_2$ (0.20) | EG | $Si(OC_2H_5)_4$ | 5 | Colorless | Dark brown | ○ | No evident peak |
| Example 125 | $IrCl_3$ (0.20) | EG | $Si(OC_2H_5)_4$ | 5 | Colorless | Blackish brown | ○ | No evident peak |
| Example 126 | $RhCl_3 \cdot 5H_2O$ (0.20) | EG | $Si(OC_2H_5)_4$ | 5 | Colorless | Blackish brown | ○ | No evident peak |
| Example 127 | $PdCl_2 \cdot 2H_2O$ (0.20) | EG | $Si(OC_2H_5)_4$ | 5 | Colorless | Blackish brown | ○ | No evident peak |
| Comparative example 19 | $AuHCl_4 \cdot 4H_2O$ (0.18) | Not contained | $Si(OC_2H_5)_4$ | —[6] | Light yellow | No change | X | — |

[1]Mixed amount (g) is shown in parentheses.
[2]This was observed immediately after the element production.
[3]This was observed after leaving the element provided with a light-shielding layer under the direct sunlight at 25° C. for 10 minutes.
[4]○: able to check temperature history, X: unable to check temperature history
[5]Ethylene glycol
[6]Not measured Although the particle diameters of the metal particles contained in the elements produced in Examples 117 to 127 were too small to measure before the heat application, the size of the particles increased after the heat application and the particle diameters thereof were able to be measured.

With reference to Table 28, it can be understood that the elements produced in Examples 117 to 127 are able to develop colors due to an increase in the particle diameters of the metal particles upon heat application, and are useful as thermal-sensitive elements for checking the temperature history. On the other hand, the element produced without an α-hydrogen-containing alcohol in Comparative Example 19 did not develop a color upon heat application and thus it is recognized useless as a thermal-sensitive element.

Among Examples 117 to 127, the elements using $Si(OC_2H_5)_4$ as a matrix-forming material formed the most stable matrix substances. These elements were able to produce at a relatively low cost. Furthermore, among the elements using obtained in Example 117 and Examples 121 to 127, the element in Example 117 which contains Au particles developed a brilliant color with the most excellent contrast as a thermal-sensitive element.

Example 128

Elements A to C were produced in the same manner as in Example 117 except that amounts of $AuHCl_4 \cdot 4H_2O$ were set to 0.018 g, 0.54 g and 1.8 g, respectively. The thus-obtained elements were stored in a refrigerator at 0° C. for 2 months. None of the elements developed a color during the storage. Then, these elements were taken out from the refrigerator and were left under the direct sunlight for 10 minutes. Then, metal tapes were removed from each of the elements and found that: Element A developed a reddish purple color at a temperature of 28° C.; element B developed a reddish purple color at a temperature of 15° C.; and element C developed a reddish purple color at a temperature of 7° C.

Accordingly, it is understood that the element obtained in the present example is useful as a thermal-sensitive element. It is further understood that under the conditions where heat is applied to these elements containing metal particles of various concentrations in the dark place for a certain time, the temperature for obtaining a particular color tone varies depending on the concentration of the metal particles.

Example 129

Elements were produced in the same manner as in Example 117 and were stored in a refrigerator at 0° C. for 2 months. Then, the elements were taken out from the refrigerator and were left under the direct sunlight for 10 minutes at temperatures of 25° C., 40° C. and 60° C., respectively. Then, metal tapes were removed from each element and found that the films of the elements respectively developed a reddish purple color at 25° C., a brownish purple color at 40° C. and a brown color at a temperature of 60° C.

Accordingly, it is appreciated that the element obtained in the present example is useful as a thermal-sensitive element. Furthermore, it is also understood that under the conditions where heat is applied to the elements in the dark place for a certain time, color tones of the elements obtained upon color development vary depending on the temperature.

Examples 130 to 140

Elements were produced in the same manner as in Examples 117 to 127 except that the temperature was set to 0° C. at the time of the xenon lamp radiation. The elements were evaluated. All results were same as those obtained in Examples 117 to 127 and these elements were found to be useful as thermal-sensitive elements.

Example 141

A solution containing materials listed below in Table 29 was prepared.

TABLE 29

| Material | | | Mixed amount (g) |
|---|---|---|---|
| α-hydrogen-containing alcohol | | $HOCH_2CH_2OH$ | 20 |
| Matrix-forming substance | Composite-forming inorganic component | $Si(OC_2H_5)_4$ | 30 |
| | Composite-forming organic component | Polyacrylic acid | 5.0 |
| Dispersing medium | | $C_2H_5OH$ | 20 |
| | | $H_2O$ | 30 |
| Catalyst | | HCl | 1.0 |

0.18 g of $AuHCl_4 \cdot 4H_2O$ as the metal compound was added to the solution, and the resultant combination was agitated at room temperature, thereby obtaining a mixture. Then, the mixture was cast upon a flat plate; dried at room temperature for 3 days; and subsequently dried at a temperature of 60° C. for 24 hours, thereby obtaining a transparent light yellow film having a thickness of 200 μm. An element was produced using the above-described film in the same manner as in Example 117 where a glass tape were used as a light-shielding layer. The element was evaluated and the results thereof are shown in Table 30.

Examples 142 to 151

Elements were produced in the same manner as in Example 141 except that the metal compounds, the α-hydrogen-containing alcohols and the matrix-forming materials shown in Table 30 were used. The elements were evaluated and the results thereof are shown in Table 30.

Comparative Examples 20 to 22

Elements were produced in the same manner as in Examples 141, 143 and 144, respectively except that ethylene glycol (EG) was not used. The elements were evaluated and the results thereof are shown in Table 30.

TABLE 30

| | Metal compound[1] | Matrix-forming material | | | Particle diameter of metal particle after heat application[3] (nm) | Color tone of film before heat application[2] | Color tone of film after heat application[3] | Temperature history[4] | Peak of surface plasmon absorption of metal particles (nm) |
|---|---|---|---|---|---|---|---|---|---|
| | | α-hydrogen-containing alcohol | Composite-forming inorganic component | Composite-forming organic component | | | | | |
| Example 141 | AuHCl$_4$,4H$_2$O (0.18) | EG[5] | Si(OC$_2$H$_5$)$_4$ | Polyacrylic acid | 6 | Colorless | Reddish purple | ○ | 530 |
| Example 142 | AuNaCl$_4$,2H$_2$O (0.17) | EG | Si(OC$_2$H$_5$)$_4$ | Polyacrylic acid | 5 | Colorless | Reddish purple | ○ | 530 |
| Example 143 | AuHCl$_4$,4H$_2$O (0.18) | EG | Si(OC$_2$H$_5$)$_4$ | Polyacrylate | 6 | Colorless | Reddish purple | ○ | 530 |
| Example 144 | AuHCl$_4$,4H$_2$O (0.18) | EG | Si(OC$_2$H$_5$)$_4$ | Polyethylene oxide | 6 | Colorless | Reddish purple | ○ | 530 |
| Example 145 | H$_2$PtCl$_6$,6H$_2$O (0.20) | EC[5] | Si(OC$_2$H$_5$)$_4$ | Polyacrylic acid | 5 | Colorless | Blackish brown | ○ | No evident peak |
| Example 146 | AgClO$_4$ (0.20) | EG | Si(OC$_2$H$_5$)$_4$ | Polyacrylic acid | 5 | Colorless | Brown | ○ | 400 |
| Example 147 | CuCl$_2$,2H$_2$O (0.20) | EG | Si(OC$_2$H$_5$)$_4$ | Polyacrylic acid | 5 | Colorless | Light green | ○ | 590 |
| Example 148 | SnCl$_2$ (0.20) | EG | Si(OC$_2$H$_5$)$_4$ | Polyacrylic acid | 5 | Colorless | Dark brown | ○ | No evident peak |
| Example 149 | IrCl$_3$ (0.20) | EG | Si(OC$_2$H$_5$)$_4$ | Polyacrylic acid | 5 | Colorless | Blackish brown | ○ | No evident peak |
| Example 150 | RhCl$_3$,3H$_2$O (0.20) | EG | Si(OC$_2$H$_5$)$_4$ | Polyacrylic acid | 6 | Colorless | Blackish brown | ○ | No evident peak |
| Example 151 | PdCl$_2$,2H$_2$O (0.20) | EG | Si(OC$_2$H$_5$)$_4$ | Polyacrylic acid | 6 | Colorless | Blackish brown | ○ | No evident peak |
| Comparative example 20 | AuHCl$_4$,4H$_2$O (0.18) | Not contained | Si(OC$_2$H$_5$)$_4$ | Polyacrylic acid | —[6] | Light yellow | No change | X | — |
| Comparative example 21 | AuHCl$_4$,4H$_2$O (0.18) | Not contained | Si(OC$_2$H$_5$)$_4$ | Polyacrylate | — | Light yellow | No change | X | — |
| Comparative example 22 | AuHCl$_4$,4H$_2$O (0.18) | Not contained | Si(OC$_2$H$_5$)$_4$ | Polyethylene oxide | — | Light yellow | No change | X | — |

[1]Mixed amount (g) is shown in parentheses.
[2]This was observed immediately after the element production.
[3]This was observed after leaving the element provided with a light-shielding layer under the direct sunlight at 25° C. for 10 minutes.
[4]○: able to check temperature history, X: unable to check temperature history
[5]Ethylene glycol
[6]Not measured Although the particle diameters of the metal particles contained in the elements produced in Examples 141 to 151 were too small to measure before the heat application, the size of the particles increased after the heat application and the particle diameters thereof were able to be measured.

With reference to Table 30, it can be understood that the elements produced in Examples 141 to 151 are able to develop colors due to an increase in the particle diameters of the metal particles upon heat application, and are useful as thermal-sensitive elements for checking the temperature history. On the other hand, the elements produced without an α-hydrogen-containing alcohol in Comparative Examples 20 to 22 did not develop a color upon heat application and thus they are recognized useless as thermal-sensitive elements.

Among Example 141 and Examples 145 to 151, the element containing Au particles obtained in Example 141 developed a brilliant color with the most excellent contrast as a thermal-sensitive element. In Examples 141 to 151, color tones of the films of the elements that developed colors were able to check via the glass tapes. Moreover, it was found that all of the elements made of materials irradiated by a xenon lamp in the same manner as in Examples 141 to 151 but without adhering the glass tapes developed a color and changed a color tone thereof when they were exposed to the direct sunlight at room temperature for a substantially long time (about 10 hours or more).

Examples 152 to 162

Elements were produced in the same manner as in Examples 141 to 151 except that the temperature was set to 0° C. at the time of the xenon lamp radiation. The elements were evaluated. All results of the obtained elements were same as those obtained in Examples 141 to 151 and the elements were found to be useful as thermal-sensitive elements.

Examples 163 to 175

Solutions containing materials listed below in Table 31 were prepared. Materials shown in Table 32 were used as matrix-forming materials.

TABLE 31

| Material | | Mixed amount (g) |
|---|---|---|
| α-hydrogen-containing alcohol | HOCH$_2$CH$_2$OH | 5.0 |
| Dispersing medium | C$_2$H$_5$OH | 20 |
|  | H$_2$O | 30 |
| Catalyst | HCl | 1.0 |

Metal compounds of types and amounts shown in Table 32 were respectively added to the solutions and the resultant combinations were agitated at room temperature, thereby obtaining mixtures. Then, each of the mixtures was cast upon a flat plate and dried at 80° C. for 2 hours, thereby obtaining a transparent light yellow film having a thickness of 200 μm. Elements were produced using the above-described films in the same manner as in Example 117. The elements were evaluated. The results are shown in Table 32.

TABLE 32

| | Metal compound[1] | α-hydrogen-containing alcohol | Matrix-forming material | Particle diameter of metal particle after heat application[3] (nm) | Color tone of element before heat application[2] | Color tone of element after heat application[3] | Temperature history[4] | Peak of surface plasmon absorption of metal particles (nm) |
|---|---|---|---|---|---|---|---|---|
| Example 163 | AuHCl$_4$.4H$_2$O (0.05) | EG[5] | Polyvinyl alcohol | 4 | Colorless | Reddish purple | ◯ | 530 |
| Example 164 | AuNaCl$_4$.2H$_2$O (0.05) | EG | Polyvinyl alcohol | 4 | Colorless | Reddish purple | ◯ | 550 |
| Example 165 | AuHCl$_4$.4H$_2$O (0.05) | EG | Polyvinyl butyral | 4 | Colorless | Reddish purple | ◯ | 540 |
| Example 166 | AuHCl$_4$.4H$_2$O (0.05) | EG | Polystyrene | 4 | Colorless | Reddish purple | ◯ | 540 |
| Example 167 | AuHCl$_4$.4H$_2$O (0.05) | EG | Acrylonitrile-styrene copolymer | 4 | Colorless | Reddish purple | ◯ | 540 |
| Example 168 | AuHCl$_4$.4H$_2$O (0.05) | EG | Fluorocarbon resin | 4 | Colorless | Reddish purple | ◯ | 540 |
| Example 169 | H$_2$PtCl$_6$.6H$_2$O (0.05) | EG | Polyvinyl alcohol | 5 | Colorless | Blackish brown | ◯ | No evident peak |
| Example 170 | AgClO$_4$ (0.05) | EG | Polyvinyl alcohol | 4 | Colorless | Brown | ◯ | 400 |
| Example 171 | CuCl$_2$.2H$_2$O (0.05) | EG | Polyvinyl alcohol | 4 | Colorless | Light green | ◯ | 590 |
| Example 172 | SnCl$_2$(0.05) | EG | Polyvinyl alcohol | 5 | Colorless | Dark brown | ◯ | No evident peak |
| Example 173 | IrCl$_3$(0.05) | EG | Polyvinyl | 5 | Colorless | Blackish brown | ◯ | No evident peak |

TABLE 32-continued

|  | Metal compound[1] | α-hydrogen-containing alcohol | Matrix-forming material | Particle diameter of metal particle after heat application[3] (nm) | Color tone of element before heat application[2] | Color tone of element after heat application[3] | Temperature history[4] | Peak of surface plasmon absorption of metal particles (nm) |
|---|---|---|---|---|---|---|---|---|
| Example 174 | RhCl$_3$.5H$_2$O (0.05) | EG | alcohol Polyvinyl alcohol | 5 | Colorless | Blackish brown | ◯ | No evident peak |
| Example 175 | PdCl$_2$.2H$_2$O (0.05) | EG | Polyvinyl alcohol | 5 | Colorless | Blackish brown | ◯ | No evident peak |

[1] Mixed amount (g) is shown in parentheses.
[2] This was observed immediately after the element production.
[3] This was observed after leaving the element provided with a light-shielding layer under the direct sunlight at 25° C. for 10 minutes.
[4] ◯: able to check temperature history, X: unable to check temperature history
[5] Ethylene glycol Although the particle diameters of the metal particles contained in the elements produced in Examples 163 to 175 were too small to measure before the heat application, the size of the particles increased after the heat application and the particle diameters thereof were able to be measured.

With reference to Table 32, it can be understood that the elements produced in Examples 163 to 175 are able to develop colors due to an increase in the particle diameters of the metal particles upon heat application, and are useful as thermal-sensitive elements for checking the temperature history.

Among the elements obtained in Examples 163 to 168 which are provided with thermal-sensitive color developing materials containing Au particles, the element using a fluorocarbon resin obtained in Example 168 was especially transparent and excellent in mechanical strength. Furthermore, among the elements containing various metal compounds obtained in Example 163 and Examples 169 to 175, the element containing Au particles obtained in Example 163 developed a brilliant color with the most excellent contrast as a thermal-sensitive element.

Furthermore, among the elements obtained in Examples 163 and 175, the elements using polyvinyl alcohol as matrix-forming materials formed the most stable matrix substances and these elements were able to be produced at a relatively low cost. Moreover, it was found that all of the elements made of materials irradiated by a xenon lamp in the same manner as in Examples 163 to 175 but without adhering the metal tapes developed a color and changed a color tone thereof when it was exposed to the direct sunlight at room temperature for a substantially long time (about 5 hours or more).

Example 176

In a same manner as in Example 117, 0.18 g of AuHCl$_4$.4H$_2$O as the metal compound was added to a solution shown in Table 27 and the resultant combination was agitated at room temperature, thereby obtaining a mixture. Then, the mixture was applied on a stainless steel film (a base substrate) having a thickness of 50 μm; dried at room temperature for 5 minutes; and subsequently dried at a temperature of 20° C. for 30 minutes. These application and drying processes were repeated 2 times so as to obtain a laminated body having a transparent light yellow thin-film-like gel film having a thickness of about 0.2 μm on the base substrate. The laminated body was irradiated with white light at room temperature for 30 seconds using a 500 W xenon lamp which was placed 30 cm away from the laminated body, thereby obtaining an element having a film made of a colorless material containing Au particles. Furthermore, metal tapes of aluminum foil having an adhesive layer on one surface were adhered on both surfaces of the element so as to produce an element that prevents transmission of external light. The element was evaluated in the same manner as in Example 117. The results are shown in Table 33.

Moreover, it was found that an element produced in the same manner as described above but without adhering the metal tapes developed a color and changed a color tone thereof when it was exposed to the direct sunlight at room temperature for a substantially long time (about 3 hours or more).

Comparative Example 23

An element was produced in the same manner as in Example 176 except that ethylene glycol (EG) was not used. The element was evaluated. The result is shown in Table 33.

TABLE 33

|  | Metal compound[1] | α-hydrogen-containing alcohol | Matrix-forming material | Particle diameter of metal particle after heat application[3] (nm) | Color tone of element before heat application[2] | Color tone of element after heat application[3] | Temperature history[4] | Peak of surface plasmon absorption of metal particles (nm) |
|---|---|---|---|---|---|---|---|---|
| Example 176 | AuHCl$_4$.4H$_2$O (0.18) | EG[5] | Si(OC$_2$H$_5$)$_4$ | 5 | Colorless | Reddish purple | ○ | 530 |
| Comparative example 23 | AuHCl$_4$.4H$_2$O (0.18) | Not contained | Si(OC$_2$H$_5$)$_4$ | —[6] | Light yellow | No change | X | —[6] |

[1]Mixed amount (g) is shown in parentheses.
[2]This was observed immediately after the element production.
[3]This was observed after leaving the element provided with a light-shielding layer under the direct sunlight at 25° C. for 10 minutes.
[4]○: able to check temperature history, X: unable to check temperature history
[5]Ethylene glycol
[6]Not measured Although the particle diameters of the metal particles contained in the element produced in Example 176 were too small to measure before the heat application, the size of the particles increased after the heat application and the particle diameters thereof were able to be measured.

With reference to Table 33, it can be understood that the element produced in Example 176 is able to develop a color due to an increase in the particle diameters of the metal particles upon heat application, and is useful as a thermal-sensitive element for checking the temperature history. On the other hand, the element produced without an α-hydrogen-containing alcohol in Comparative Example 23 did not develop a color upon heat application and thus it is recognized useless as a thermal-sensitive element.

Example 177

In a same manner as in Example 141, 0.18 g of AuHCl$_4$.4H$_2$O as the metal compound was added to a solution shown in Table 29 and the resultant combination was agitated at room temperature, thereby obtaining a mixture. Then, the mixture was applied on a transparent glass plate (a base substrate) having a thickness of 50 μm; dried at room temperature for 5 minutes; and subsequently dried at a temperature of 60° C. for 30 minutes. These application and drying processes were repeated 2 times so as to obtain a laminated body having a transparent light yellow thin-film-like gel film having a thickness of about 0.5 μm on the base substrate. An element was produced using the above-described laminated body in the same manner as in Example 117. The element was evaluated and the results thereof are shown in Table 34.

Examples 178 and 179

Elements were produced in the same manner as in Example 177 except that the matrix-forming materials shown in Table 34 were used and the thickness of the obtained laminated bodies were about 0.2 μm. The elements were evaluated and the results thereof are shown in Table 34.

Comparative Examples 24 to 26

Elements were produced in the same manner as in Examples 177 to 179 except that ethylene glycol (EG) was not used. The elements were evaluated and the results thereof are shown in Table 34.

TABLE 34

| | Metal compound[1] | Matrix-forming material | | | Particle diameter of metal particle after heat application[3] (nm) | Color tone of film before heat application[2] | Color tone of film after heat application[3] | Temperature history[4] | Peak of surface plasmon absorption of metal particles (nm) |
|---|---|---|---|---|---|---|---|---|---|
| | | α-hydrogen-containing alcohol | Composite-forming inorganic component | Composite-forming organic component | | | | | |
| Example 177 | AuHCl$_4$·4H$_2$O(0.18) | EG[5] | Si(OC$_2$H$_5$)$_4$ | Polyacrylic acid | 6 | Colorless | Reddish purple | ○ | 530 |
| Example 178 | AuHCl$_4$·4H$_2$O(0.18) | EG | Si(OC$_2$H$_5$)$_4$ | Polyacrylate | 6 | Colorless | Reddish purple | ○ | 530 |
| Example 179 | AuHCl$_4$·4H$_2$O(0.18) | EG | Si(OC$_2$H$_5$)$_4$ | Polyethylene oxide | 6 | Colorless | Reddish purple | ○ | 550 |
| Comparative example 24 | AuHCl$_4$·4H$_2$O(0.18) | Not contained | Si(OC$_2$H$_5$)$_4$ | Polyacrylic acid | —[6] | Light yellow | No change | X | — |
| Comparative example 25 | AuHCl$_4$·4H$_2$O(0.18) | Not contained | Si(OC$_2$H$_5$)$_4$ | Polyacrylate | — | Light yellow | No change | X | — |
| Comparative example 26 | AuHCl$_4$·4H$_2$O(0.18) | Not contained | Si(OC$_2$H$_5$)$_4$ | Polyethylene oxide | — | Light yellow | No change | X | — |

[1]Mixed amount (g) is shown in parentheses.
[2]This was observed immediately after the element production.
[3]This was observed after leaving the element provided with a light-shielding layer under the direct sunlight at 25° C. for 10 minutes.
[4]○: able to check temperature history, X: unable to check temperature history
[5]Ethylene glycol
[6]Not measured Although the particle diameters of the metal particles contained in the elements produced in Examples 177 to 179 were too small to measure before the heat application, the size of the particles increased after the heat application and the particle diameters thereof were able to be measured.

With reference to Table 34, it can be understood that the elements produced in Examples 177 to 179 are able to develop colors due to an increase in the particle diameters of the metal particles upon heat application, and thus are useful as thermal-sensitive elements for checking the temperature history. On the other hand, the elements produced without an α-hydrogen-containing alcohol in Comparative Examples 24 to 26 did not develop a color upon heat application and thus they are recognized useless as thermal-sensitive elements.

Moreover, it was found that elements made of materials irradiated by a xenon lamp in the same manner as in Examples 177 to 179 but without adhering the metal tapes developed colors and changed color tones thereof when they were exposed to the direct sunlight at room temperature for a substantially long time (about 5 hours or more).

Examples 180 to 185

In a same manner as in Example 163, a solution shown in Table 31 was prepared. Materials shown in Table 35 were used as matrix-forming materials.

TABLE 35

| | Metal compound[1] | α-hydrogen-containing alcohol | Matrix-forming material | Particle diameter of metal particle after heat application[3] (nm) | Color tone of element before heat application[2] | Color tone of element after heat application[3] | Temperature history[4] | Peak of surface plasmon absorption of metal particles (nm) |
|---|---|---|---|---|---|---|---|---|
| Example 180 | AuHCl$_4$.4H$_2$O (0.05) | EG[5] | Polyvinyl alcohol | 8 | Colorless | Reddish purple | ◯ | 535 |
| Example 181 | AuNaCl$_4$.2H$_2$O (0.05) | EG | Polyvinyl alcohol | 7 | Colorless | Reddish purple | ◯ | 535 |
| Example 182 | AuHCl$_4$.4H$_2$O (0.05) | EG | Polyvinyl butyral | 8 | Colorless | Reddish purple | ◯ | 530 |
| Example 183 | AuHCl$_4$.4H$_2$O (0.05) | EG | Polystyrene | 8 | Colorless | Reddish purple | ◯ | 530 |
| Example 184 | AuHCl$_4$.4H$_2$O (0.05) | EG | Acrylonitrile-styrene copolymer | 8 | Colorless | Reddish purple | ◯ | 535 |
| Example 185 | AuHCl$_4$.4H$_2$O (0.05) | EG | Fluorocarbon resin | 8 | Colorless | Reddish purple | ◯ | 530 |

[1]Mixed amount (g) is shown in parentheses.
[2]This was observed immediately after the element production.
[3]This was observed after leaving the element provided with a light-shielding layer under the direct sunlight at 25° C. for 10 minutes.
[4]◯: able to check temperature history, X: unable to check temperature history
[5]Ethylene glycol Metal compounds of types and amounts shown in Table 32 were added and the resultant combinations were agitated at room temperature, thereby obtaining mixtures. Then, each of the mixtures was applied on a transparent glass plate (a base substrate) having a thickness of 50 μm; dried at room temperature for 5 minutes; and subsequently dried at a temperature of 60° C. for 30 minutes. These application and drying processes were repeated 2 times so as to obtain a laminated body having a transparent light yellow thin-film-like gel film with a thickness of about 0.6 μm on the base substrate. An element was produced in the same manner as in Example 117 except the above-described laminated body was used. The element was evaluated and the results thereof are shown in Table 35.

Although the particle diameters of the metal particles contained in the elements produced in Examples 180 to 185 were too small to measure before the heat application, the size of the particles increased after the heat application and the particle diameters thereof were able to be measured.

With reference to Table 35, it can be understood that the elements produced in Examples 180 to 185 are able to develop colors due to an increase in the particle diameters of the metal particles upon heat application, and these elements are useful as thermal-sensitive elements for checking the temperature history.

Among the elements obtained in Examples 180 to 185, the element using a fluorocarbon resin obtained in Example 185 was especially transparent and excellent in mechanical strength. Furthermore, among the elements obtained in Examples 180 to 185, the elements using polyvinyl alcohol as matrix-forming materials formed the most stable matrix substance and were produced at a relatively low cost. Moreover, it was found that all of the elements made of materials irradiated by a xenon lamp in the same manner as in Examples 180 to 185 but without adhering the metal tapes developed colors and changed color tones thereof when they were exposed to the direct sunlight at room temperature for a substantially long time (about 3 hours or more).

TABLE 36

| | Metal compound[1] | α-hydrogen containing alcohol | Matrix-forming material | Particle diameter of metal particle after heat application[3] (nm) | Color tone of element before heat application[2] | Color tone of element after heat application[3] | Temperature history[4] | Peak of surface plasmon absorption of metal particles (nm) |
|---|---|---|---|---|---|---|---|---|
| Example 186 | AuHCl$_4$.4H$_2$O (0.18) | EG[5] | Si(OC$_2$H$_5$)$_4$ | 5 | White | Reddish purple | ○ | 530 |
| Comparative example 27 | AuHCl$_4$.4H$_2$O (0.18) | Not contained | Si(OC$_2$H$_5$)$_4$ | —[6] | Light yellow | No change | X | — |

[1]Mixed amount (g) is shown in parentheses.
[2]This was observed immediately after the element production.
[3]This was observed after leaving the element provided with a light-shielding layer under the direct sunlight at 25° C. for 10 minutes.
[4]○: able to check temperature history, X: unable to check temperature history
[5]Ethylene glycol
[6]Not measured

Example 186

In a same manner as in Example 117, 0.18 g of AuHCl$_4$.4H$_2$O as the metal compound was added to a solution shown in Table 27 and the resultant combination was agitated at room temperature, thereby obtaining a mixture. Then, the mixture was applied on a surface of a white paper tape (a base substrate having an adhesive layer on one surface) having a thickness of 30 μm; dried at room temperature for 5 minutes; and subsequently dried at a temperature of 60° C. for 30 minutes, thereby obtaining a light yellow paper tape impregnated with the mixture. The impregnated paper tape was irradiated with white light at room temperature for 30 seconds using a 500 W xenon lamp which was placed 30 cm away from the paper tape, thereby obtaining an element containing Au particles having the adhesive layer on one surface. Furthermore, a metal tape of aluminum foil having an adhesive layer on one surface was adhered on a surface of the element opposite to the surface having the adhesive layer thereon so as to produce an element that prevents transmission of external light. The element was evaluated in the same manner as in Example 117. The results are shown in Table 36.

Moreover, it was found that an element which was produced in the same manner as described above but without adhering the metal tapes developed a color and changed the color tone when it was exposed to the direct sunlight at room temperature for a substantially long time (about 1 hour or more).

Comparative Example 27

An element was produced in the same manner as in Example 186 except that ethylene glycol (EG) was not used. The element was evaluated. The result is shown in Table 36.

Although the particle diameters of the metal particles contained in the element produced in Example 186 were too small to measure before the heat application, the size of the particles increased after the heat application and the particle diameters thereof were able to be measured.

With reference to Table 36, it can be understood that the element produced in Example 186 is able to develop a color due to an increase in the particle diameters of the metal particles upon heat application, and is useful as a thermal-sensitive element for checking the temperature history. On the other hand, the element produced without an α-hydrogen-containing alcohol in Comparative Example 27 did not develop a color upon heat application and thus it is recognized useless as a thermal-sensitive element.

Example 187

In a same manner as in Example 117, 0.18 g of AuHCl$_4$.4H$_2$O as the metal compound was added to a solution shown in Table 27 and the resultant combination was agitated at room temperature, thereby obtaining a mixture. Then, the mixture was applied on a glass plate (a base substrate made from a ground glass having an adhesive layer on one surface) having a thickness of 100 μm; dried at room temperature for 5 minutes; and subsequently dried at a temperature of 60° C. for 30 minutes. The glass plate applied with the mixture had a light yellow color. Then, the glass plate applied with the mixture was irradiated with white light at room temperature for 30 seconds using a 500 W xenon lamp which was placed 30 cm away from the glass plate, thereby obtaining an element having a film made of a material containing Au particles and having the adhesive layer on one surface. Furthermore, metal tapes of aluminum foil having an adhesive layer on one surface were adhered on the film of the element so as to produce an element that prevents transmission of external light. The element was evaluated in the same manner as in Example 117. The results are shown in Table 37.

Moreover, it was found that an element which was produced in the same manner as described above but without adhering the metal tapes developed a color and changed the color tone when it was exposed to the direct sunlight at room temperature for a substantially long time (about 2 hour or more).

Comparative Example 28

An element was produced in the same manner as in Example 187 except that ethylene glycol (EG) was not used. The element was evaluated. The result is shown in Table 37.

of the element so as to produce an element that prevents transmission of external light. The element was evaluated in the same manner as in Example 117. The results are shown in Table 38.

Moreover, it was found that an element which was produced in the same manner as described above but without adhering the metal tapes developed a color when it was exposed to the direct sunlight at room temperature for a substantially long time (about 2 hour or more).

Comparative Example 29

An element was produced in the same manner as in Example 188 except that ethylene glycol (EG) was not used.

TABLE 37

| | Metal compound[1] | α-hydrogen containing alcohol | Matrix-forming material | Particle diameter of metal particle after heat application[3] (nm) | Color tone of element before heat application[2] | Color tone of element after heat application[3] | Temperature history[4] | Peak of surface plasmon absorption of metal particles (nm) |
|---|---|---|---|---|---|---|---|---|
| Example 187 | $AuHCl_4 \cdot 4H_2O$ (0.18) | EG[5] | $Si(OC_2H_5)_4$ | 6 | Colorless | Reddish purple | ○ | 530 |
| Comparative example 28 | $AuHCl_4 \cdot 4H_2O$ (0.18) | Not contained | $Si(OC_2H_5)_4$ | —[6] | Light yellow | No change | X | — |

[1]Mixed amount (g) is shown in parentheses.
[2]This was observed immediately after the element production.
[3]This was observed after leaving the element provided with a light-shielding layer under the direct sunlight at 25° C. for 10 minutes.
[4]○: able to check temperature history, X: unable to check temperature history
[5]Ethylene glycol
[6]Not measured Although the particle diameters of the metal particles contained in the element produced in Example 187 were too small to measure before the heat application, the size of the particles increased after the heat application and the particle diameters thereof were able to be measured.

With reference to Table 37, it can be understood that the element produced in Example 187 is able to develop a color due to an increase in the particle diameters of the metal particles upon heat application, and is useful as a thermal-sensitive element for checking the temperature history. On the other hand, the element produced without an α-hydrogen-containing alcohol in Comparative Example 28 did not develop a color upon heat application and thus it is recognized useless as a thermal-sensitive element.

Example 188

In a same manner as in Example 141, 0.18 g of $AuHCl_4 \cdot 4H_2O$ as the metal compound was added to a solution shown in Table 29 and the resultant combination was agitated at room temperature, thereby obtaining a mixture. Then, the mixture was applied on a white glass tape (a base substrate made from a glass fiber fabric having an adhesive layer on one surface) having a thickness of 100 μm; dried at room temperature for 5 minutes; and subsequently dried at a temperature of 60∞ C. for 30 minutes, thereby obtaining a light yellow glass tape impregnated with the mixture. The impregnated glass tape was irradiated with white light at room temperature for 5 minutes using a 500 W xenon lamp which was placed 30 cm away from the glass tape, thereby obtaining a white element having a film containing Au particles and having the adhesive layer on one surface. Furthermore, metal tapes of aluminum foil having an adhesive layer on one surface were adhered on the film The element was evaluated. The result is shown in Table 38.

TABLE 38

|  | Metal compound[1] | α-hydrogen containing alcohol | Matrix-forming material | Particle diameter of metal particle after heat application[3] (nm) | Color tone of element before heat application[2] | Color tone of element after heat application[3] | Temperature history[4] | Peak of surface plasmon absorption of metal particles (nm) |
|---|---|---|---|---|---|---|---|---|
| Example 188 | AuHCl$_4$.4H$_2$O (0.18) | EG[5] | Si(OC$_2$H$_5$)$_4$ | 5 | White | Reddish purple | ○ | 530 |
| Comparative example 29 | AuHCl$_4$.4H$_2$O (0.18) | Not contained | Si(OC$_2$H$_5$)$_4$ | —[6] | Light yellow | No change | X | — |

[1]Mixed amount (g) is shown in parentheses.
[2]This was observed immediately after the element production.
[3]This was observed after leaving the element provided with a light-shielding layer under the direct sunlight at 25° C. for 10 minutes.
[4]○: able to check temperature history, X: unable to check temperature history
[5]Ethylene glycol
[6]Not measured Although the particle diameters of the metal particles contained in the elements produced in Example 188 were too small to measure before the heat application, the size of the particles increased after the heat application and the particle diameters thereof were able to be measured.

With reference to Table 38, it can be understood that the elements produced in Example 188 are able to develop colors due to an increase in the particle diameters of the metal particles upon heat application, and are useful as thermal-sensitive elements for checking the temperature history. On the other hand, the elements produced without an α-hydrogen-containing alcohol in Comparative Example 29 did not develop a color upon heat application and thus it is recognized useless as a thermal-sensitive element.

Example 189

In a same manner as in Example 163, a solution shown in Table 31 was prepared. Materials shown in Table 39 were used as matrix-forming materials. 0.05 g of AuHCl$_4$.4H$_2$O as the metal compound was added to the solution and the resultant combination was agitated at room temperature, thereby obtaining a mixture. Then, the mixture was applied on a surface of a white paper tape (a base substrate having an adhesive layer on one surface) having a thickness of 30 μm; dried at room temperature for 5 minutes; and subsequently dried at a temperature of 60° C. for 30 minutes, thereby obtaining a light yellow paper tape impregnated with the mixture. The impregnated paper tape was irradiated with white light at room temperature for 30 seconds using a 500 W xenon lamp which was placed 30 cm away from the paper tape, thereby obtaining a white element having a film containing Au particles and having the adhesive layer on one surface. Furthermore, a metal tape of aluminum foil having an adhesive layer on one surface was adhered on the film of the element so as to produce an element that prevents transmission of external light. The element was evaluated in the same manner as in Example 117. The results are shown in Table 39.

Moreover, it was found that an element which was produced in the same manner as described above but without adhering the metal tapes developed a color and changed the color tone when it was exposed to the direct sunlight at room temperature for a substantially long time (about 1 hour or more).

Comparative Example 30

An element was produced in the same manner as in Example 189 except that ethylene glycol (EG) was not used. The element was evaluated. The result is shown in Table 39.

TABLE 39

|  | Metal compound[1] | α-hydrogen containing alcohol | Matrix-forming material | Particle diameter of metal particle after heat application[3] (nm) | Color tone of element before heat application[2] | Color tone of element after heat application[3] | Temperature history[4] | Peak of surface plasmon absorption of metal particles (nm) |
|---|---|---|---|---|---|---|---|---|
| Example 189 | AuHCl$_4$.4H$_2$O (0.05) | EG[5] | Si(OC$_2$H$_5$)$_4$ | 6 | White | Reddish purple | ○ | 540 |
| Comparative example 30 | AuHCl$_4$.4H$_2$O (0.05) | Not contained | Si(OC$_2$H$_5$)$_4$ | —[6] | Light yellow | No change | X | — |

[1]Mixed amount (g) is shown in parentheses.
[2]This was observed immediately after the element production.
[3]This was observed after leaving the element provided with a light-shielding layer under the direct sunlight at 25° C. for 10 minutes.
[4]○: able to check temperature history, X: unable to check temperature history
[5]Ethylene glycol
[6]Not measured Although the particle diameters of the metal particles contained in the elements produced in Example 189 were too small to measure before the heat application, the size of the particles increased after the heat application and the particle diameters thereof were able to be measured.

With reference to Table 39, it can be understood that the element produced in Example 189 is able to develop a color due to an increase in the particle diameters of the metal particles upon heat application, and is useful as a thermal-sensitive element for checking the temperature history. On the other hand, the elements produced without an α-hydrogen-containing alcohol in Comparative Example 30 did not develop a color upon heat application and thus it is recognized useless as a thermal-sensitive element.

Example 190

Figure 8A:
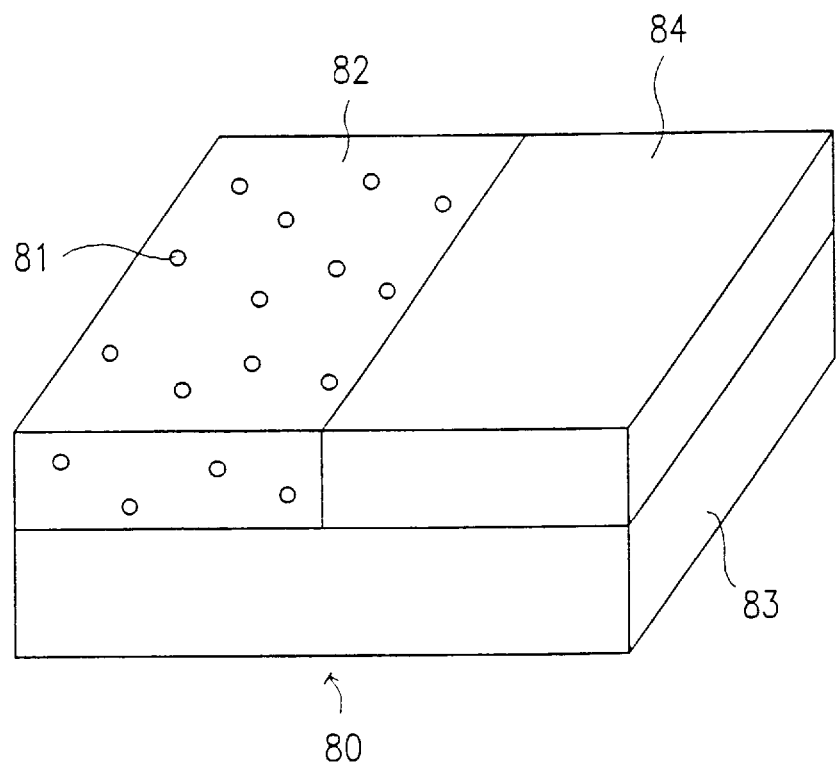
FIGS. 8A and 8B are perspective views each showing an example of a thermal-sensitive element according to the present invention, which has a thermal-sensitive color developing material containing metal particles and a color reference on a base substrate.
Figure 8B:
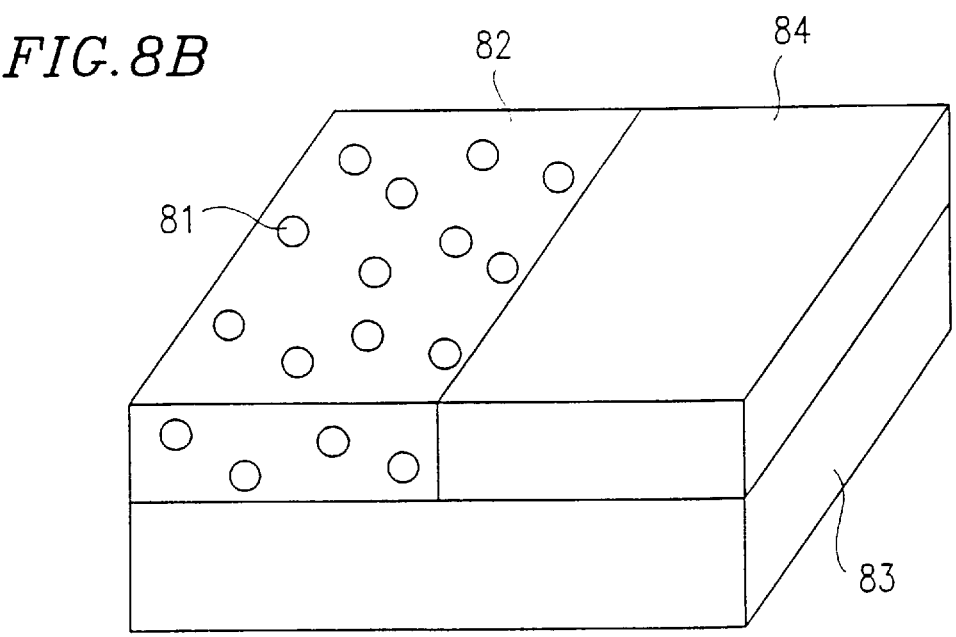

In the present example, a thermal-sensitive element 80 shown in FIGS. 8A and 8B which includes a thermal-sensitive color developing material 82 containing metal particles 81 and a color reference 84 on a base substrate 83 will be described. FIG. 8A shows the thermal-sensitive element according to the present example where it is stored in the dark place at a relatively low temperature (for example, 0° C. or lower) before heat application; and FIG. 8B shows the thermal-sensitive element according to the present example in which the metal particles have cohered after the heat application.

First, a solution containing materials listed below in Table 40 was prepared.

TABLE 40

| Material | | Mixed amount (g) |
|---|---|---|
| α-hydrogen-containing alcohol | HOCH$_2$CH$_2$OH | 5 |
| Matrix-forming material | Si(OC$_2$H$_5$)$_4$ | 10 |
| Dispersing medium | C$_2$H$_5$OH | 10 |
| | H$_2$O | 10 |
| Catalyst | HCl | 5 |

0.06 g of AuHCl$_4$.4H$_2$O as the metal compound was added to the solution. The resultant mixture was agitated at room temperature for 1 hour. Then, the mixture was applied on a predetermined region of a filter paper (a base substrate) 83 for 5 mg per square centimeter; dried at room temperature for 2 days; and dried at a temperature of 60° C. for 48 hours, thereby obtaining a laminated body having a transparent light yellow gel film having a thickness of 0.1 μm on the base substrate.

The laminated body was irradiated with white light at room temperature for 5 minutes using a 500 W xenon lamp which was placed 30 cm away from the film, thereby forming a film 82 made of a colorless material on the base substrate 83. Paper (color reference) which is printed in a color tone (reddish purple) identical to a color tone obtained when the above-described film is left in the dark place at a temperature of 25° C. for 30 minutes, is adhered on the remaining region of the base substrate 83 by using an adhesive, thereby obtaining the element 80 shown in FIG. 8A. The thus-obtained element 80 was immediately stored in the dark place at a temperature of 0° C. or lower for 2 months.

The element 80 did not develop a color during the storage. After 2 months, the element was taken out from the refrigerator and was left in the dark place at a temperature of 25° C. for a predetermined time, whereby the film 82 of the element 80 developed a color and exhibited a reddish purple color. Since the color tone of the film 82 after the color development was identical to the color tone of the color reference, it was found that the element was left in the dark place at a temperature of 25° C. for about 30 minutes.

It was found that the element obtained according to the present example provided with the above-described color reference was useful as a thermal-sensitive element for quantitating a time of exposure in the dark place at a predetermined temperature.

Figure 9:
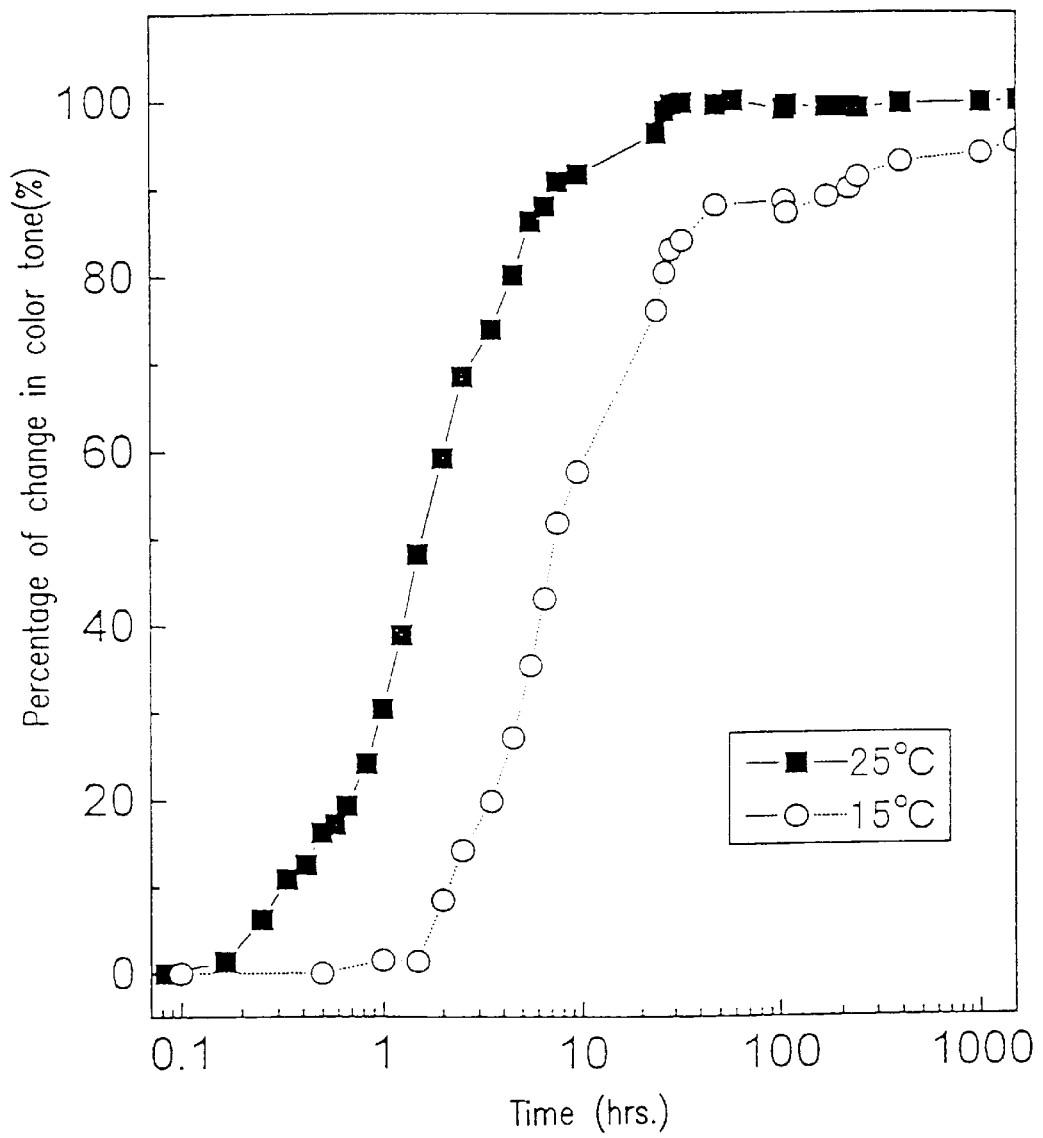
FIG. 9 is a graph showing a relationship between time and the percentage of change in color tone obtained in the case where the thermal-sensitive color developing material used for producing the thermal-sensitive element according to the present invention is placed in a dark place at a predetermined temperature.

The relationship between percentage of change in the color tone of the colorless material produced as described above and time of exposure in the dark place at a predetermined temperature is shown in FIG. 9. The percentages of change in color tone (%) were obtained by measuring each of the luminance of the produced material using a luminance meter before and after the color development and applying the following formula:

$$\text{Percentage of change in color tone (\%)} = \frac{\text{Luminance of material before color development} - \text{Luminance of material after color development}}{\text{Luminance of material before color development}} \times 100$$

As shown in FIG. 9, when the colorless material according to the present example is exposed to heat of a predetermined temperature in the dark place, the color development initiates earlier as the predetermined temperature becomes higher. Since the percentage of change in color tone of the material according to the present example which is radiated by a xenon lamp is not deteriorated with the lapse of time, it is useful as a material for checking temperature history.

Examples 191 to 212

Elements were produced in the same manner as in Example 190 except that the metal compounds, the matrix-forming materials and the base substrates shown in Tables 41 to 45 were used. The elements were evaluated.

TABLE 41

| | Metal compound[1] | Matrix-forming material | Base substrate |
|---|---|---|---|
| Example 191 | AuNaCl$_4$.2H$_2$O(0.06) | Si(OC$_2$H$_5$)$_4$ | Filter paper |
| Example 192 | AuHCl$_4$.4H$_2$O(0.06) | Al(OC$_2$H$_5$)$_3$ | Filter paper |
| Example 193 | AuHCl$_4$.4H$_2$O(0.06) | Ti(OC$_2$H$_5$)$_4$ | Filter paper |

[1]Mixed amount (g) is shown in parentheses.

TABLE 42

| | | Matrix-forming material | | |
|---|---|---|---|---|
| | Metal compound[1] | Composite-forming inorganic component | Composite-forming organic component | Base substrate |
| Example 194 | AuHCl$_4$.4H$_2$O(0.06) | Si(OC$_2$H$_5$)$_4$ | Polyacrylic acid | Filter paper |
| Example 195 | AuHCl$_4$.4H$_2$O(0.06) | Si(OC$_2$H$_5$)$_4$ | Polyacrylate | Filter paper |
| Example 196 | AuHCl$_4$.4H$_2$O(0.06) | Si(OC$_2$H$_5$)$_4$ | Polyethylene oxide | Filter paper |

TABLE 42-continued

| Metal compound[1] | Matrix-forming material | | Base substrate |
|---|---|---|---|
| | Composite-forming inorganic component | Composite-forming organic component | |

[1]Mixed amount (g) is shown in parentheses.

TABLE 43

| | Metal compound [1] | Matrix-forming material | Base substrate |
|---|---|---|---|
| Example 197 | AuNaCl$_4$ · 2H$_2$O (0.01) | Polyvinyl alcohol | Filter paper |
| Example 198 | AuHCl$_4$ · 4H$_2$O (0.01) | Polyvinyl butyral | Filter paper |
| Example 199 | AuHCl$_4$ · 4H$_2$O (0.01) | Polystrene | Filter paper |
| Example 200 | AuHCl$_4$ · 4H$_2$O (0.01) | Acrylonitrile-styrene copolymer | Filter paper |
| Example 201 | AuHCl$_4$ · 4H$_2$O (0.01) | Fluorocarbon resin | Filter paper |

[1] Mixed amount (g) is shown in parentheses.

TABLE 44

| | Metal compound [1] | Matrix-forming material | Base substrate |
|---|---|---|---|
| Example 202 | H$_2$PtCl$_6$ · 6H$_2$O (0.06) | Si(OC$_2$H$_5$)$_4$ | Filter paper |
| Example 203 | AgClO$_4$ (0.06) | Si(OC$_2$H$_5$)$_4$ | Filter paper |
| Example 204 | CuCl$_2$ · 2H$_2$O (0.06) | Si(OC$_2$H$_5$)$_4$ | Filter paper |
| Example 205 | SnCl$_2$ (0.06) | Si(OC$_2$H$_5$)$_4$ | Filter paper |
| Example 206 | IrCl$_3$ (0.06) | Si(OC$_2$H$_5$)$_4$ | Filter paper |
| Example 207 | RhCl$_3$ · 3H$_2$O (0.06) | Si(OC$_2$H$_5$)$_4$ | Filter paper |
| Example 208 | PdCl$_2$ · 2H$_2$O (0.06) | Si(OC$_2$H$_5$)$_4$ | Filter paper |

[1] Mixed amount (g) is shown in parentheses.

TABLE 45

| | Metal compound [1] | Matrix-forming material | Base substrate |
|---|---|---|---|
| Example 209 | AuHCl$_4$ · 4H$_2$O (0.05) | Si(OC$_2$H$_5$)$_4$ | Aluminum film |
| Example 210 | AuHCl$_4$ · 4H$_2$O (0.05) | Si(OC$_2$H$_5$)$_4$ | Polyproplene film |
| Example 211 | AuHCl$_4$ · 4H$_2$O (0.05) | Si(OC$_2$H$_5$)$_4$ | Cotton fabric |
| Example 212 | AuHCl$_4$ · 4H$_2$O (0.05) | Si(OC$_2$H$_5$)$_4$ | Transparent glass plate |

It was found that all of the above-described elements provided with the color references were useful as thermal-sensitive elements for quantitating time of exposure in the dark place at a predetermined temperature.

Comparative Example 31

An element was produced in the same manner as in Example 190 except that ethylene glycol was not used. The element was evaluated. It was found that since the thus-obtained element did not develop a color, it was unable to quantitate a time of exposure at a predetermined temperature in the dark place and thus the element cannot be used as a thermal-sensitive element.

Examples 213 to 235

Elements were produced in the same manner as in Examples 190 to 212 except that a temperature set to 0° C. or lower at the time of xenon lamp radiation. The elements were evaluated. The obtained result were the same as those obtained in Examples 190 to 212 and the elements were found useful as thermal-sensitive elements for quantitating a time of exposure in the dark place at a predetermined temperature.

Example 236

Figure 10:
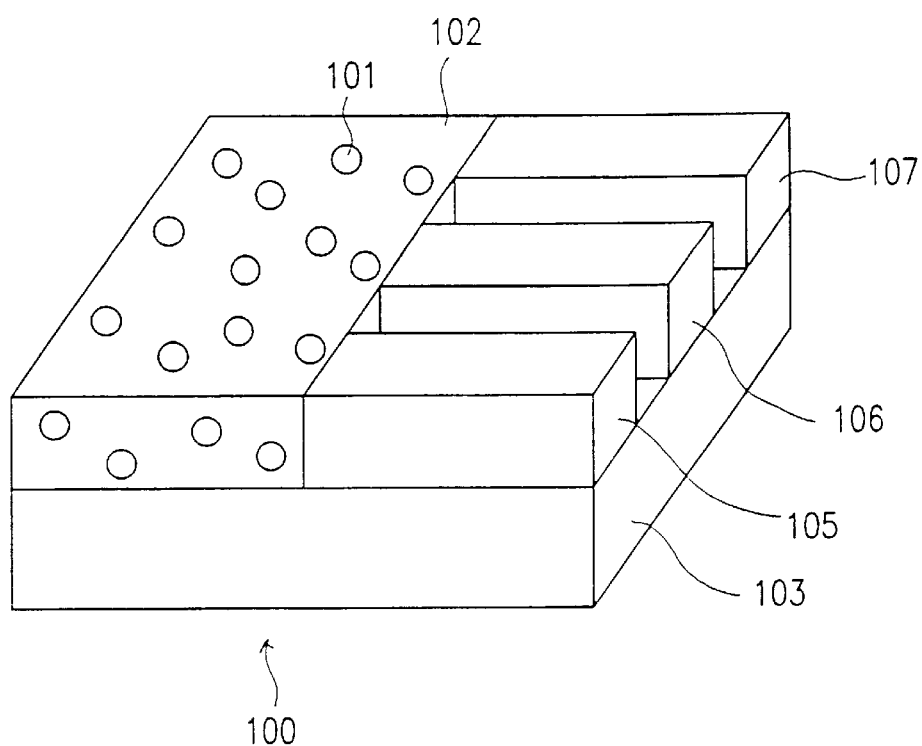
FIG. 10 is a perspective view showing an example of the thermal-sensitive element according to the present invention, which has a thermal color developing material containing metal particles and a plurality of color references on a base substrate.

In the present example, a production of a thermal-sensitive element 100 shown in FIG. 10 which includes a thermal-sensitive color developing material 102 containing metal particles 101 and color references 105, 106 and 107 on a base substrate 103 will be described.

First, a mixture containing AuHCl$_4$.4H$_2$O was prepared in the same manner as in Example 190. Then, the mixture was applied on a predetermined region of a filter paper (the base substrate) 103 for 5 mg per square centimeter; dried at room temperature for 2 days; and dried at a temperature of 60° C. for 48 hours, thereby obtaining a laminated body having a transparent light yellow gel film having a thickness of 0.1 μm on the base substrate.

The laminated body was irradiated by a xenon lamp in the same manner as in Example 190, thereby forming a film 102 made of a colorless material on the base substrate 103. The followings were adhered on the remaining region of the base substrate 103 by an adhesive, thereby obtaining the element 100 shown in FIG. 10: paper (color reference) 105 which was printed in a color tone (purple) identical to a color tone obtained when the above-described film was left in the dark place at a temperature of 25° C. for 20 minutes; paper (color reference) 106 which was printed in a color tone (reddish purple) identical to a color tone obtained when the above-described film was left in the dark place at a temperature of 25° C. for 40 minutes; and paper (color reference) 107 which was printed in a color tone (dark brown) identical to a color tone obtained when the abovedescribed film was left in the dark place at a temperature of 25° C. for 60 minutes. The thus-obtained element 100 was immediately stored in the dark place at a temperature of 0° C. or lower for 2 months.

The element 100 did not develop a color during the storage. After 2 months, the element was taken out from the refrigerator and was left in the dark place at a temperature of 25° C. for a predetermined time, whereby the film 102 of the element 100 developed a color. Since the color tone of the film 102 after the color development was generally identical to the color tone of the color reference 107, it was found that the element was left in the dark place at the temperature of 25° C. for about 60 minutes.

It was found that the element according to the present invention provided with the above-described plurality of color references was useful as a thermal-sensitive element for quantitating a time of exposure in the dark place at a predetermined temperature.

Example 237

An element 100 was obtained in the same manner as in Example 236 expect that the followings were adhered on the remaining region of the base substrate 103 by an adhesive: paper (color reference) 105 printed in a color tone (dark brown) identical to a color tone which is obtained when the film produced in Example 190 was left in the dark place at a temperature of 30° C. for 60 minutes; paper (color reference) 106 printed in a color tone (purple) identical to a color tone obtained when the above-described film was left in the dark place at a temperature of 20° C. for 60 minutes; and paper (color reference) 107 printed in a color tone (light purple) identical to a color tone obtained when the above-described film was left in the dark place at a temperature of 10° C. for 60 minutes. The thus-obtained element 100 was immediately stored in the dark place at a temperature of 0° C. or lower for 2 months.

The element 100 did not develop a color during the storage. After 2 months, the element was taken out from the refrigerator and was left in the dark place at a certain temperature for 60 minutes, whereby the film 102 of the element 100 developed a color. Since the color tone of the film 102 after the color development was generally identical to the color tone of the color reference 106, it was found that the element was left in the dark place at the temperature of about 20° C.

It was found that the element according to the present invention provided with the above-described plurality of color references, was useful as a thermal-sensitive element for quantitating a temperature of exposure in the dark place for a predetermined time.

Example 238

Figure 11A:
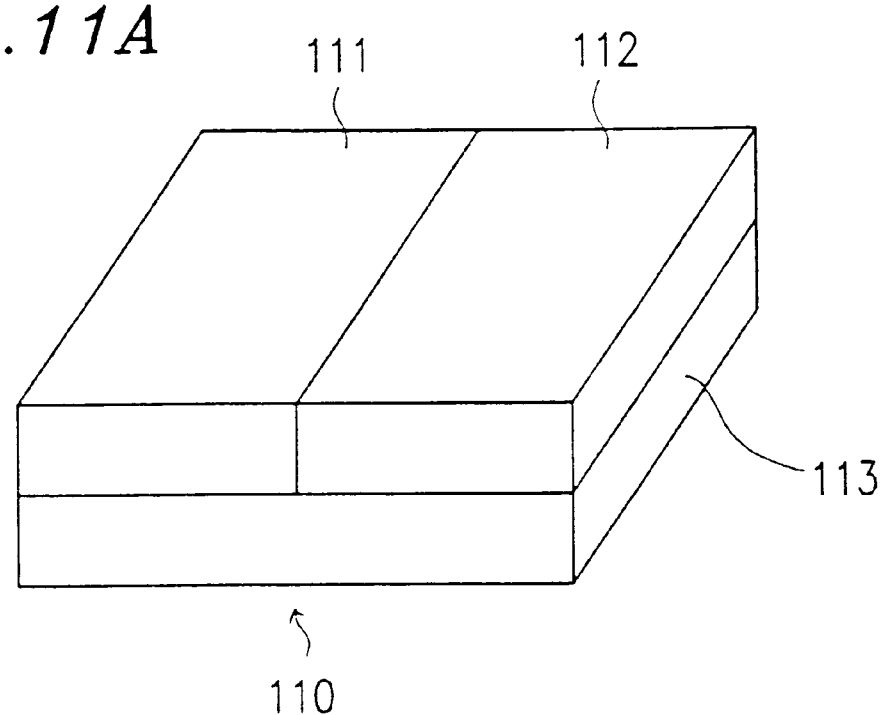
FIG. 11A shows an example where the thermal-sensitive element according to the present invention is stored in a dark place at a relatively low temperature (for example, 0° C. or lower) before heat application.
Figure 11B:
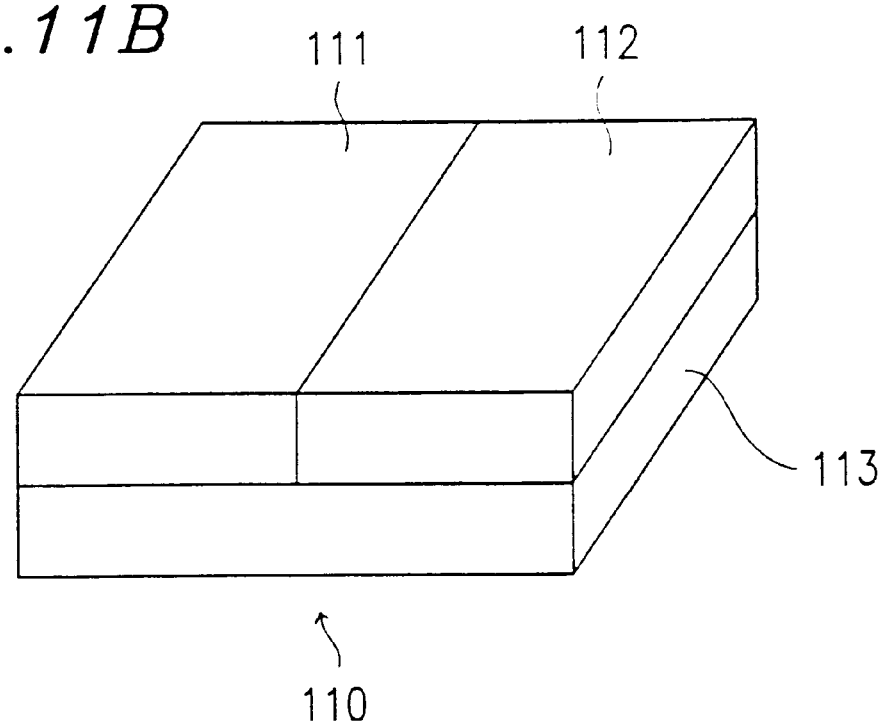

In the present example, an example of production of a thermal-sensitive element 110 shown in FIGS. 11A and 11B which is provided with thermal-sensitive portions 111 and 112 of different thermal characteristics on a base substrate 113 will be described. FIG. 11A shows the thermal-sensitive element according to the present invention which is stored in the dark place at a relatively low temperature (e.g., 0° C. or lower) before heat application; and FIG. 11B shows the thermal-sensitive element according to the present invention which has developed a color due to cohesion of metal particles after the heat application.

First, solutions A and B containing materials shown in Table 40 were prepared in the same manner as in Example 190. Then, 0.10 g of $AuHCl_4 \cdot 4H_2O$ as the metal compound was added to the solution A and the resultant combination was agitated at room temperature, thereby obtaining a mixture A. On the other hand, 0.05 g of $AuHCl_4 \cdot 4H_2O$ as the metal compound was added to the solution B and the resultant combination was agitated at room temperature, thereby obtaining a mixture B.

Figure 12A:
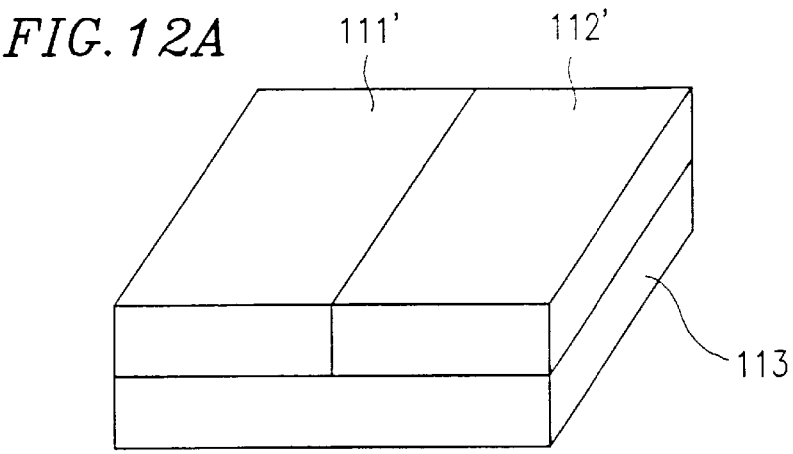
FIGS. 12A, 12B and 12C are schematic views for illustrating an exemplary procedure of producing the thermal-sensitive elements shown in FIG. 11A and 11B according to the present invention.

Then, the mixture A was applied on a predetermined region of a filter paper (a base substrate) 113 for 5 mg per square centimeter and the mixture B was applied on the remaining region of the base substrate for 5 mg per square centimeter. The resultant combinations were dried at room temperature for 2 days and subsequently dried at a temperature of 60° C. for 48 hours, thereby obtaining a laminated body having transparent light yellow films 111' and 112' on the base substrate 113 as shown in FIG. 12A.

Figure 12B:
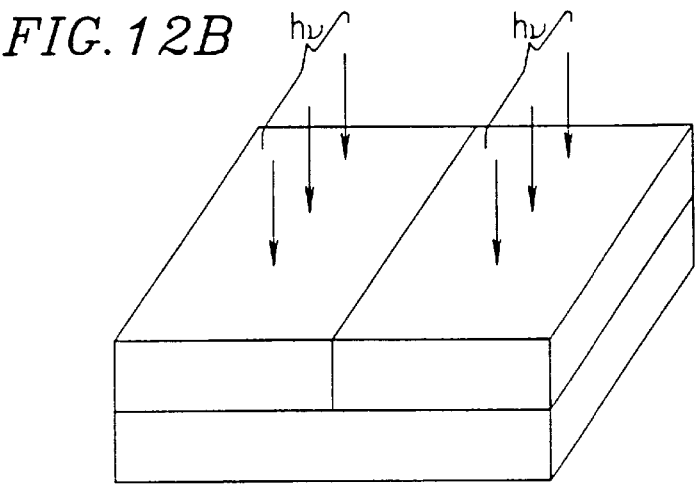
Figure 12C:
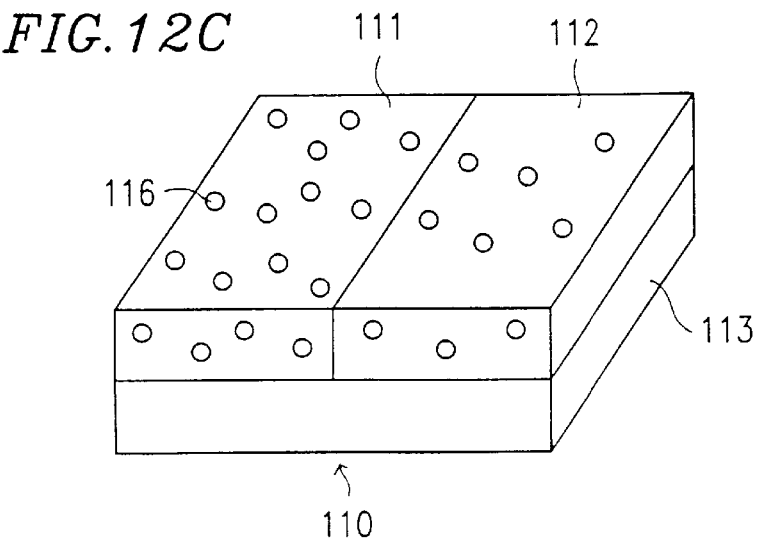

The laminated body was subjected to irradiation (hv) by a xenon lamp in the same manner as in Example 190 (see FIG. 12B), thereby obtaining an element 110 having thermal-sensitive portions 111 and 112 made of colorless materials containing Au particles 116 of different concentrations on the base substrate 113 shown in FIG. 12C. The thus-obtained element 110 was immediately stored in a freezer (the dark place) at a temperature of 0° C. for 2 months.

The element 110 did not develop a color during the storage. After 2 months, the element was taken out from the freezer and was left in the dark place at a temperature of 25° C., whereby the thermal-sensitive portion 111 of the element 110 developed a reddish purple color in 5 minutes while the thermal-sensitive portion 112 took 30 minutes to develop a reddish purple color.

Accordingly, it can be appreciated that the element according to the present example is useful as a thermal-sensitive element for quantitating a thermal time of exposure in the dark place at a temperature of 25° C. Specifically, (1) when the thermal-sensitive portion 111 (and the thermal-sensitive portion 112) did not develop a color, the thermal time is 5 minutes or less; (2) when the thermal-sensitive portion 111 developed a color while the thermal-sensitive portion 112 did not develop a color, the thermal time is less than 5 minutes but less than 30 minutes; and (3) when the thermal-sensitive portion 112 (and the thermal-sensitive portion 111) developed a color, the thermal time is 30 minutes or more.

In the above-mentioned example, time required for each of the thermal-sensitive portions 111 and 112 to develop a color upon heat application at a predetermined temperature in the dark place, is measured so as to obtain the difference therebetween in advance. Thus, the time of exposure (thermal time) of the elements under such conditions can be quantitated. Similarly, by knowing, in advance, a difference between color tones of the thermal-sensitive portions 111 and 112 upon heat application for a predetermined time in the dark place, the temperature of exposure (the thermal temperature) of the elements under such conditions can be quantitated.

Example 239

In the present example, another example of producing a thermal-sensitive element 110 shown in FIGS. 11A and 11B which is provided with thermal-sensitive color developing materials 111 and 112 having different thermal characteristics on a base substrate 113, will be described.

Figure 13A:
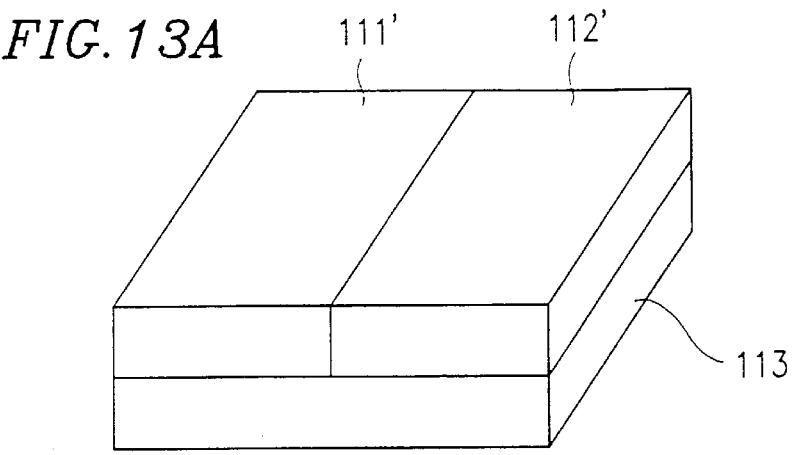
FIGS. 13A, 13B and 13C are schematic views for illustrating another exemplary procedure of producing the thermal-sensitive elements shown in FIGS. 11A and 11B according to the present invention.

First, a mixture containing $AuHCl_4 \cdot 4H_2O$ was prepared in the same manner as in Example 190. Then, the mixture was applied on the filter paper (a base substrate) 113 for 5 mg per square centimeter; dried at room temperature for 2 days; and subsequently dried at a temperature of 60° C. for 48 hours, thereby obtaining a laminated body shown in FIG. 13A having transparent light yellow gel films 111' and 112' on the base substrate 113.

Figure 13B:
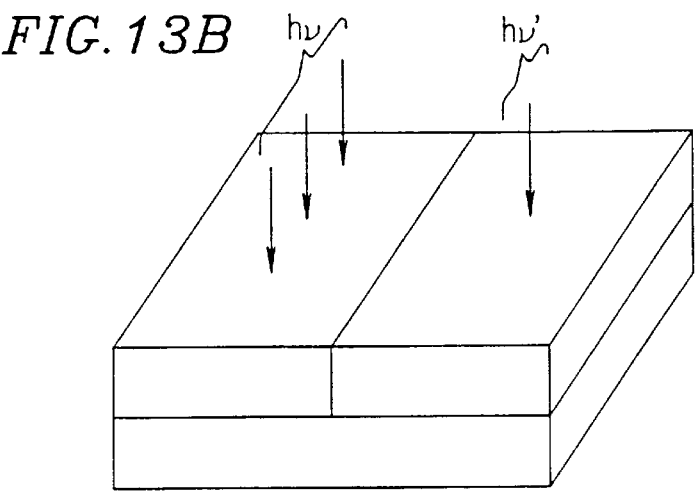
Figure 13C:
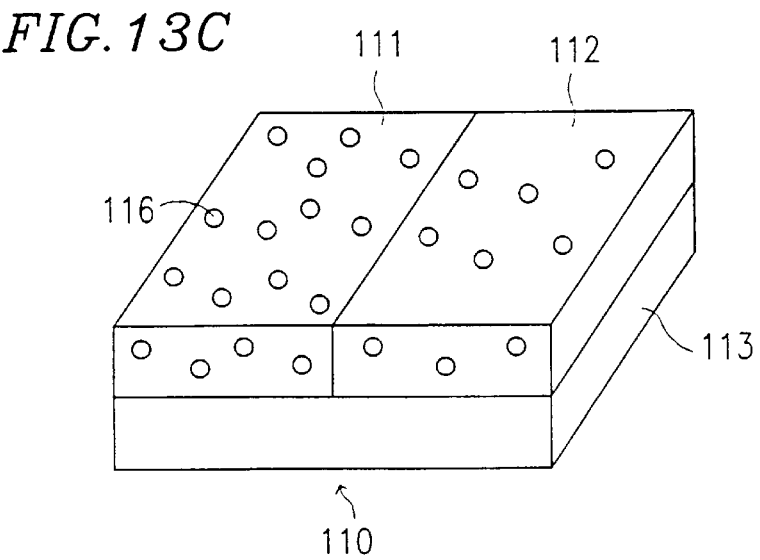

Then, as shown in FIG. 13B, each of the films 111' and 112' of the laminated body were irradiated with light of different intensities, and more specifically as follows. The film 112' of the laminated body was covered with a photomask (not shown) while the film 111' was irradiated with white light (hv) at room temperature for 4 minutes by a 500 W xenon lamp which was placed 20 cm away from the film. Then, the photomask on the film 112' was removed and the film 111' that has been irradiated with light was covered with a photomask (not shown) while the film 112' was irradiated (hv') for 1 minute by a xenon lamp in the same manner as before. As a result of such light irradiation, the thermal-sensitive element 110 shown in FIG. 13C which includes thermal-sensitive portions 111 and 112 made of colorless materials each containing a different concentration of Au particles 116 on the base substrate 113. The thus-obtained element 110 was immediately stored in a freezer (the dark place) at 0° C. or less for 2 months.

The thermal-sensitive element 110 did not develop a color during the storage. After 2 months, the element was taken out from the freezer and was left in the dark place at a temperature of 25° C. The thermal-sensitive portion 111 of the element 110 developed a reddish purple color in 5 minutes while the thermal-sensitive portion 112 took 20 minutes to develop a reddish purple color.

Accordingly, it can be appreciated that the element according to the present example is useful as a thermal-sensitive element for quantitating time of exposure to heat of a temperature of 25° C. in the dark place. Specifically: (1) when the thermal-sensitive portion 111 (and the thermal-sensitive portion 112) did not develop a color, the thermal time is less than 5 minutes; (2) when the thermal-sensitive portion 111 developed a color while the thermal-sensitive portion 112 did not develop a color, the thermal time is 5 minutes or more but less than 20 minutes; and (3) when the thermal-sensitive portion 112 (and the thermal-sensitive portion 111) developed a color, the thermal time is 20 minutes or longer.

In the above-mentioned example, time required for each of the thermal-sensitive portions 111 and 112 to develop a predetermined color upon heat application at a predetermined temperature in the dark place, is measured so as to obtain the difference therebetween in advance. Thus, the time of exposure (thermal time) of the elements under such conditions can be quantitated. Similarly, by knowing, in advance, a difference between color tones of the thermal-sensitive portions 111 and 112 upon heat application for a predetermined time in the dark place, the temperature of exposure (the thermal temperature) of the elements under such conditions can be quantitated.

Example 240

In the present example, another example of producing a thermal-sensitive element 110 shown in FIGS. 11A and 11B which includes a thermal-sensitive portions 111 and 112 having different thermal characteristics on a base substrate 113, will be described.

Figure 14A:
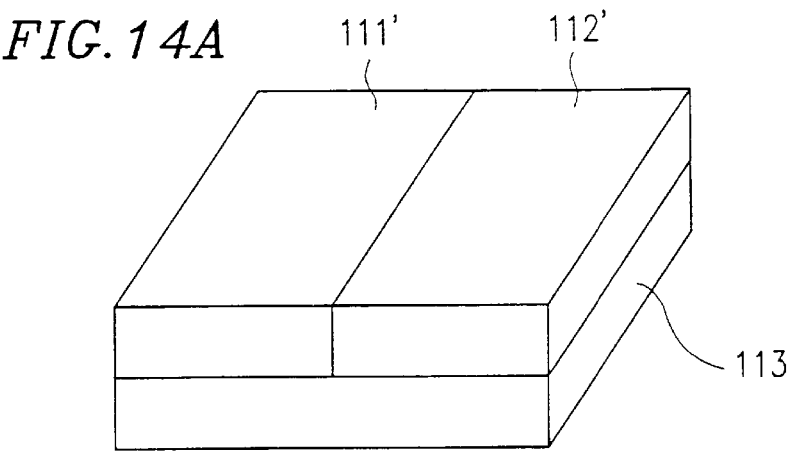
FIGS. 14A, 14B and 14C are schematic views showing another exemplary procedure of producing the thermal-sensitive elements shown in FIGS. 11A and 11B according to the present invention.

First, a mixture containing $AuHCl_4 \cdot 4H_2O$ was prepared in the same manner as in Example 190. Then, the mixture is applied on the filter paper (a base substrate) 113 for 5 mg per square centimeter; dried at room temperature for 2 days; and subsequently dried at a temperature of 60° C. for 48 hours. A predetermined region of the dried mixture was further dried at a temperature of 100° C. for 24 hours by a heater, thereby obtaining a laminated body shown in FIG. 14A having transparent light yellow gel films 111' and 112' on the base substrate 113. The film 111' is in a region where it was not dried by the heater whereas the film 112' is in a region where it was dried by the heater.

Figure 14B:
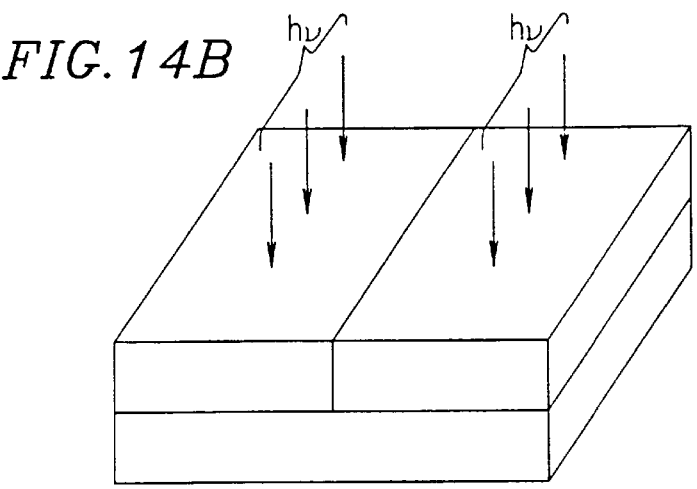
Figure 14C:
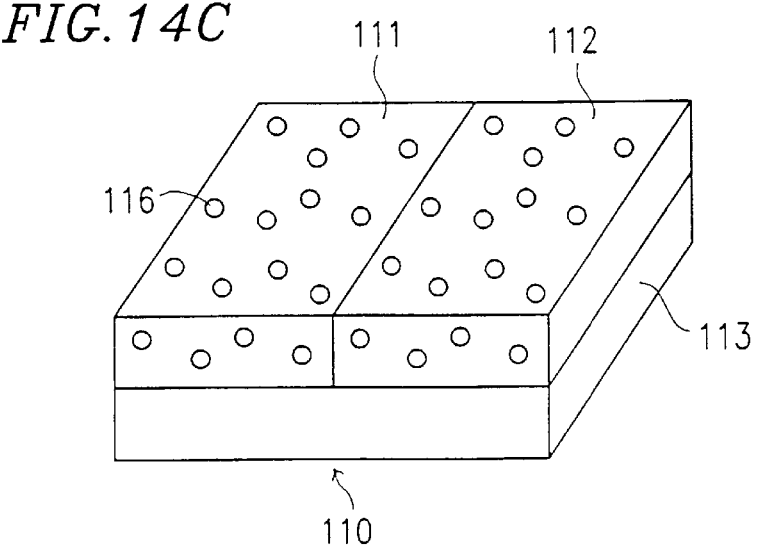
Figure 15:
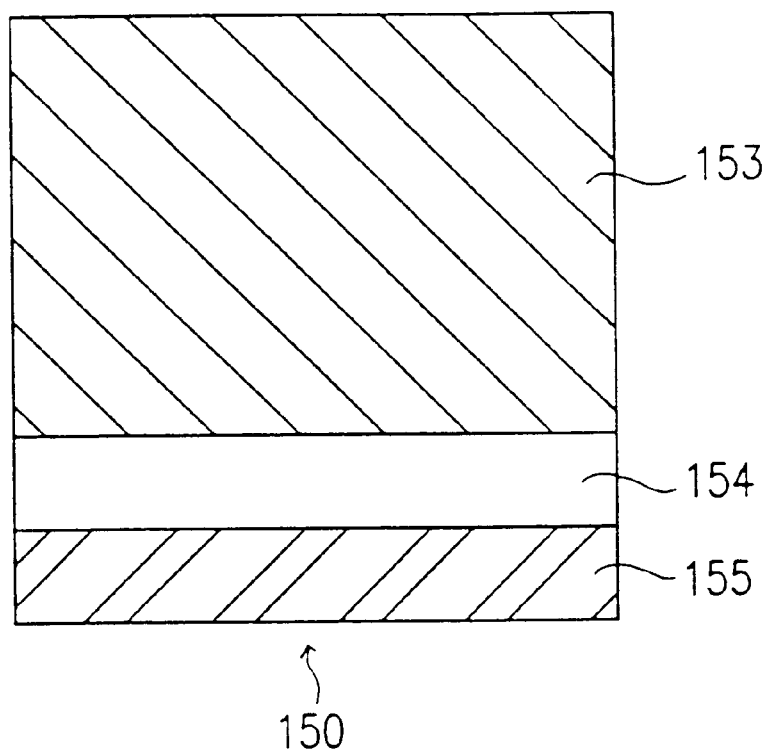
FIG. 15 is a schematic cross-sectional view showing an example of a conventional thermal-sensitive element.

The laminated body was irradiated by a xenon lamp in the same manner as in Example 190 (see FIG. 14B), thereby obtaining an element 110 shown in FIG. 14C which includes thermal-sensitive portions 111 and 112 made of colorless materials containing Au particles 116 on the base substrate 113. The thus-obtained element 110 was immediately stored in a freezer (the dark place) at a temperature of 0° C. or less for 2 months.

The thermal-sensitive element 110 did not develop a color during the storage. After 2 months, the element was taken out from the freezer and was left in a the place at a temperature of 25° C. The thermal-sensitive portion 111 of the element 110 developed a reddish purple color in 5 minutes while the thermal-sensitive portion 112 took 45 minutes to develop a reddish purple color.

Accordingly, it can be appreciated that the element according to the present example is useful as a thermal-sensitive element for quantitating time of exposure in the dark place at a temperature of 25° C. Specifically: (1) when the thermal-sensitive portion 111 (and the thermal-sensitive portion 112) did not develop a color, the thermal time is less than 5 minutes; (2) when the thermal-sensitive portion 111 developed a color but the thermal-sensitive portion 112 did not develop a color, the thermal time is 5 minutes or more but less than 45 minutes; and (3) when the thermal-sensitive portion 112 (and the thermal-sensitive portion 111) developed a color, the thermal time is 45 minutes or longer.

In the above-mentioned example, time required for each of the thermal-sensitive portions 111 and 112 to develop a predetermined color upon heat application at a predetermined temperature, is measured so as to obtain the difference therebetween in advance. Thus, the time of exposure (thermal time) of the elements under such conditions can be quantitated. Similarly, by knowing, in advance, a difference between color tones of the thermal-sensitive portions 111 and 112 upon heat application for a predetermined time in the dark place, the temperature of exposure (the thermal temperature) of the elements under such conditions can be quantitated.

Example 241

A solution containing $HOCH_2CH_2OH$, $C_2H_5OH$, $H_2O$ and HCl for a weight ratio of 1:1:1:0.01 was prepared. 0.05 wt % of $AuHCl_4 \cdot 4H_2O$ based on the weight of the solution was added to the solution, and the resultant combination was agitated at room temperature, thereby obtaining a mixture. Then, the mixture was impregnated in a filter paper (containing 99% cellulose; having a thickness of 230 μm;

and having a weight of 110 g per unit area m$^2$) (a base substrate) for 3 mg per square centimeter. The filter paper was dried at room temperature for 20 minutes and subsequently dried at a temperature of 80° C. for 60 minutes, thereby obtaining a transparent light yellow sheet.

The sheet was irradiated with white light at room temperature by a 500 W xenon lamp which was placed 5 cm away from the sheet for 30 seconds, thereby obtaining a white element. The thus-obtained element was immediately stored in a freezer (the dark place) at a temperature of −10° C. for 2 months.

The element did not develop a color during the storage. After 2 months, the element was taken out from the freezer and was left in the dark place at a temperature of 25° C. for 10 minutes, whereby the element developed a reddish purple color. Then, the element that developed the color was once again placed in the freezer at a temperature of −10° C. but the developed color tone did not disappear. Thus, the temperature history could be checked.

Accordingly, it can be understood that the element produced in the present example is able to develop a color due to an increase in the particle diameters of the metal particles upon heat application, and is useful as a thermal-sensitive element for checking the temperature history.

Comparative Example 32

A white element was obtained in the same manner as in Example 241 except that a mixture was obtained by adding 0.05 wt % of $AuHCl_4 \cdot 4H_2O$ to $H_2O$ and that the irradiation by a xenon lamp was conducted for 300 seconds. The element was used for evaluation in the same manner as in Example 241. When the obtained element was left in the dark place at a temperature of 25° C., the element did not develop a color even after 30 minutes and required 2 hours to develop a reddish purple color. Thus, the element according to the present comparative example was recognized useless as a thermal-sensitive element.

Comparative Example 33

A mixture obtained in Example 241 was directly irradiated with a xenon lamp for 3 hours without using a base substrate. The mixture did not react with light and did not develop a color upon heat application at a temperature of 25° C.

Example 242

A mixture was impregnated in a filter paper in the same manner as in Example 241 and the resultant combination was irradiated by a xenon lamp. Metal tapes of aluminum foil having an adhesive layer on one surface were adhered on both surfaces of the filter paper so as to produce an element that prevents transmission of external light. The element was immediately stored in a freezer (the dark place) at a temperature of −10° C. for 2 months.

The element did not develop a color during the storage. After 2 months, the element was taken out from the refrigerator and was left under the direct sunlight at a temperature of 25° C. for 10 minutes. Then, the metal tapes were removed from the element and found that the film of the element developed a reddish purple color. Then, the element was once again placed in the freezer at −10° C. but the developed color tone did not disappear. Thus, the temperature history could be checked.

Accordingly, it can be understood that the element produced in the present example is able to develop a color due to an increase in the particle diameters of the metal particles upon heat application, and is useful as a thermal-sensitive element for checking the temperature history.

Examples 243 to 246

Elements were produced in the same manner as in Examples 241 and 242 except that fabric made of silica fiber and white fabric made of cotton were used as base substrates instead of the filter paper. The elements were evaluated. All results of the obtained elements were same as those obtained in Examples 241 and 242 and the elements were found to be useful as thermal-sensitive elements.

Example 247

A mixture obtained in a same manner as in Example 241 was impregnated in a porous glass plate (containing 99% of $SiO_2$; having a thickness of 100 μm; and a specific surface of 230 m$^2$/g) (a base substrate) for 10 mg per square centimeter. The porous glass plate was dried at room temperature for 60 minutes and subsequently dried at a temperature of 110° C. for 120 minutes, thereby obtaining a transparent light yellow plate.

The plate was irradiated by a xenon lamp in a same manner as in Example 241 for 50 seconds, thereby obtaining a colorless element. The thus-obtained element was immediately stored in a freezer (the dark place) at a temperature of −10° for 4 months.

The element did not develop a color during the storage. After 4 months, the element was taken out from the freezer and was left at a temperature of 25° C. for 10 minutes, whereby the element developed a reddish purple color. Then, the element that developed the color was once again placed in the freezer at a temperature of −10° C. but the developed color tone did not disappear. Thus, the temperature history could be checked.

Accordingly, it can be understood that the element produced in the present example is able to develop a color due to an increase in the particle diameters of the metal particles upon heat application, and is useful as a thermal-sensitive element for checking the temperature history.

Comparative Example 34

An element was obtained in the same manner as in Example 247 except that a mixture was obtained by adding 0.05 wt % of $AuHCl_4 \cdot 4H_2O$ to $H_2O$ and that the irradiation by a xenon lamp was conducted for 800 seconds. The element was used to evaluate the temperature history in the same manner as in Example 247. When the obtained element was left in the dark place at a temperature of 25° C., the element did not develop a color even after 30 minutes and required 4 hours to develop a reddish purple color. Thus, the element according to the present comparative example was recognized useless as a thermal-sensitive element.

Example 248

A mixture was impregnated in a porous glass plate in the same manner as in Example 247 and the resultant combination was irradiated by a xenon lamp. Metal tapes of aluminum foil having an adhesive layer on one surface were adhered on both surfaces of the porous glass plate irradiated with light so as to produce an element that prevents transmission of external light. The element was immediately stored in a freezer (the dark place) at a temperature of −10° C. for 6 months.

The element did not develop a color during the storage. After 6 months, the element was taken out from the refrigerator and was left under the direct sunlight at a temperature of 25° C. for 10 minutes. Then, the metal tapes were removed from the element and found that the film of the element developed a reddish purple color. Then, the element was once again placed in the freezer at −10° C. but the developed color tone did not disappear. Thus, the temperature history could be checked.

Accordingly, it can be understood that the element produced in the present example is able to develop a color due to an increase in the particle diameters of the metal particles upon heat application, and is useful as a thermal-sensitive element for checking the temperature history.

Examples 249 and 250

Elements were produced in the same manner as in Examples 247 and 248 except that zeolite plates having pores with a diameter of 5 nm were used as base substrates instead of the porous glass plate. The elements were evaluated. All results of the obtained elements were same as those obtained in Examples 247 and 248 and the elements were found to be useful as thermal-sensitive elements.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

INDUSTRIAL APPLICABILITY

The present invention is useful as a thermal-sensitive color developing material and as a thermal-sensitive element for checking a change in the temperature in the case where a product, such as a frozen food or a drug, that needs to be stored at a relatively low temperature (for example, about −20° C. to about 4° C.) has been exposed to heat at about room temperature.

We claim:

1. A thermal-sensitive color developing material comprising metal particles and a matrix substance, wherein the size of the metal particles irreversibly increases at room temperature due to cohesion, and wherein the metal particles are formed from a mixture of a metal ion and an α-hydrogen-containing, alcohol upon irradiation with light, and the metal ion is at least one member selected from the group consisting of gold, platinum, silver, copper, tin, rhodium, palladium and iridium.

2. A material according to claim 1, wherein the matrix substance is selected from the group consisting of an sinorganic substance, an inorganic/organic composite and a resin.

3. A material according to claim 2, wherein the inorganic substance is formed of at least one inorganic alkoxide which contains silicon, aluminum or titanium.

4. A material according to claim 2, wherein:
the inorganic/organic composite is formed of a composite-forming material which contains at least one inorganic composite-forming component and at least one organic composite-forming component; and
the inorganic composite-forming component is formed of an inorganic alkoxide which contains silicon, aluminum or titanium and the organic composite-forming component is selected from the group consisting of a polyacrylic acid, a polyacrylate and a polyethylene oxide.

5. A material according to claim 2, wherein the resin is formed of a matrix-forming resin selected from the group consisting of a polyvinyl alcohol, a polyvinyl butyral, a polystyrene, an acrylonitrile-styrene copolymer and a fluorocarbon resin.

6. A material according to claim 5 further comprising polyvinylpyrrolidone.

7. A thermal-sensitive element comprising a base substrate and a thermal sensitive color developing material held by the base substrate, wherein:
the thermal-sensitive color developing material contains metal particles a d a matrix substance;
the size of the metal particles are irreversibly increased at room temperature due to cohesion; and
the metal particles are formed from a mixture of a metal ion and an α-hydrogen-containing alcohol upon irradiation with light, and the metal ion is at least one member selected from the group consisting of gold, platinum, silver, copper, tin, rhodium, palladium and iridium.

8. A thermal-sensitive element according to claim 7, wherein the matrix substance is selected from the group consisting of an inorganic substance, an inorganic/organic composite and a resin.

9. A thermal-sensitive element according to claim 8, wherein the inorganic substance is formed of at least one inorganic alkoxide which contains silicon, aluminum or titanium.

10. A thermal-sensitive element according to claim 8, wherein:
the inorganic/organic composite is formed of a composite-forming material which contains at least one inorganic composite-forming component and at least one organic composite-forming component; and
the inorganic composite-forming component is formed of an inorganic alkoxide which contains silicon, aluminum or titanium and the organic composite-forming component is selected from the group consisting of a polyacrylic acid, a polyacrylate and a polyethylene oxide.

11. A thermal-sensitive element according to claim 8, wherein the resin is formed of a matrix-forming resin selected from the group consisting of a polyvinyl alcohol, a polyvinyl butyral, a polystyrene, an acrylonitrile-styrene copolymer and a fluorocarbon resin.

12. A thermal-sensitive element according to claim 11, wherein the thermal-sensitive color developing material further contains polyvinylpyrrolidone.

13. A thermal-sensitive element according to claim 7, wherein the thermal-sensitive color developing material is directly placed on the base substrate as a color developing layer.

14. A thermal-sensitive element according to claim 13, wherein the base substrate is a sheet or a plate that is made from at least one material selected from the group consisting of a metal film, a plastic film, fabric, paper and glass.

15. A thermal-sensitive element according to claim 13, wherein the base substrate is a packaging material.

16. A thermal-sensitive element according to claim 7, wherein the thermal-sensitive color developing material as a color developing layer is placed on the base substrate via an adhesive layer.

17. A thermal-sensitive element according to claim 16, wherein the base substrate is a sheet or a plate that is made from at least one material selected from the group consisting of a metal film, a plastic film, fabric, paper and glass.

18. A thermal-sensitive element according to claim 16, wherein the base substrate is a packaging material.

19. A thermal-sensitive element according to claim 7, wherein the thermal-sensitive color developing material is impregnated in the base substrate.

20. A thermal-sensitive element according to claim 19, wherein the base substrate is a sheet made from at least one material selected from the group consisting of fabric, paper, a plastic film having a plurality of pores and a metal film having a plurality of pores.

21. A thermal-sensitive element according to claim 7, wherein: the thermal-sensitive color developing material forms color developing regions held by a plurality of regions of the base substrate; and each of the color developing regions contains the metal particles, the concentrations of the metal particles being different in the different color developing regions.

22. A thermal-sensitive element according to claim 21, wherein the plurality of color developing regions as a whole are arranged in a bar code manner.

23. A thermal-sensitive element according to claim 7, wherein the thermal-sensitive color developing material forms color developing regions held by the plurality of regions of the base substrate; and each of the color developing regions contains the metal particles, the average particle diameters of the metal particles being different in the different color developing regions.

24. A thermal-sensitive element according to claim 7, wherein the thermal-sensitive color developing material forms color developing regions held by a plurality of regions of the base substrate; and each of the thermal-sensitive color developing materials contains the matrix substance and the metal particles, the matrix substance and the metal particles being formed under different drying conditions in different color development regions.

25. A thermal-sensitive element according to claim 7, further comprising a color developed sample for checking a temperature at which the thermal-sensitive color developing material develops a color.

26. A thermal-sensitive element according to claim 7, comprising a light-shielding layer for preventing the thermal-sensitive color developing material from developing a color by exposure to light.

27. A thermal-sensitive element according to claim 7, wherein a color tone obtained upon heat application at a predetermined temperature differs depending on a concentration of the metal particles.

28. A thermal-sensitive element according to claim 7, wherein a obtained color tone differs depending on a temperature of applied heat.

29. A thermal-sensitive element comprising a base substrate containing metal particles, wherein the size of the metal particles irreversibly increases at room temperature due to cohesion and
wherein the metal particles are formed from a mixture of a metal ion and an α-hydrogen-containing alcohol upon irradiation with light, and the metal ion is at least one member selected from the group consisting of gold, platinum, silver, copper, tin, rhodium, palladium and iridium.

30. A thermal-sensitive element according to claim 29, wherein the metal particles are at least one metal selected from the group consisting of gold, platinum, silver, copper, tin, rhodium, palladium and iridium.

31. A thermal-sensitive element according to claim 29, wherein the base substrate is a sheet made of at least one material selected from the group consisting of paper, fabric and a porous material.

32. A method for producing a thermal-sensitive color developing material, comprising the steps of:
preparing a mixture containing metal ion, an α-hydrogen-containing alcohol and a matrix-forming material; and
irradiating the mixture with light,
wherein the metal ion is at least one member selected from the group consisting of gold, platinum, silver, copper, tin, rhodium, palladium and iridium.

33. A method according to claim 32, wherein the α-hydrogen-containing alcohol is a dihydric alcohol selected from the group consisting of ethylene glycol and propylene glycol.

34. A thermal-sensitive element produced by the method according to claim 32, wherein the matrix-forming material is formed of at least one inorganic alkoxide which contains silicon, aluminum, or titanium.

35. A method according to claim 32, wherein:
the matrix-forming material is a composite-forming material which contains at least one inorganic composite-forming component and at least one organic composite-forming component; and
the inorganic composite-forming component is formed of an inorganic alkoxide which contains silicon, aluminum or titanium and the organic composite-forming component is selected from the group consisting of a polyacrylic acid, a polyacrylate and a polyethylene oxide.

36. A method according to claim 32, wherein the matrix-forming material is a matrix-forming resin selected from the group consisting of a polyvinyl alcohol, a polyvinyl butyral, a polystyrene, an acrylonitrile-styrene copolymer and a fluorocarbon resin.

37. A method according to claim 36, wherein the matrix-forming material further comprises polyvinylpyrrolidone.

38. A method for producing a thermal-sensitive element including a base substrate and a thermal-sensitive color developing material held by the base substrate, comprising the steps of:
preparing a mixture containing metal ion, an α-hydrogen-containing alcohol and a matrix-forming material;
making the mixture held by the base substrate; and irradiating the mixture held by the base substrate with light so as to form the thermal-sensitive color developing material, wherein the metal ion is at least one member selected from the group consisting of gold, platinum, silver, copper, tin, rhodium, palladium and iridium.

39. A method according to claim 38, werein the α-hydrogen-containing alcohol is a dihydric alcohol selected from the group consisting of ethylene glycol and propylene glycol.

40. A thermal-sensitive element produced by the method according to claim 38, wherein the matrix-forming material is formed of at least one inorganic alkoxide which contains silicon, aluminum, or titanium.

41. A method according to claim 38, wherein:

the matrix-forming material is a composite-forming material which contains at least one inorganic composite-forming component and at least one organic composite-forming component; and the inorganic composite-forming component is formed of an inorganic alkoxide which contain silicon, aluminum or titanium and the organic composite-forming component is selected from the group consisting of a polyacrylic acid, a polyacrylate and a polyethylene oxide.

42. A method according to claim 38, wherein the matrix-forming material is a matrix-forming resin selected from the group consisting of a polyvinyl alcohol, a polyvinyl butyral, a polystyrene, an acrylonitrile-styrene copolymer and a fluorocarbon resin.

43. A method according to claim 42, wherein the matrix-forming material further comprises polyvinylpyrrolidone.

44. A method according to claim 38, wherein the base substrate is a sheet or a plate made from at least one material selected from the group consisting of at metal film, a plastic film, fabric, paper and glass.

45. A method according to claim 38, wherein the base substrate is a packaging material.

46. A method according to claim 38, wherein the mixture is held by the base substrate by a painting method, a spin coating method or an immersion method.

47. A method according to claim 38 further comprising a step of providing a light-shielding layer for preventing the thermal-sensitive color developing material from developing a color by exposure to light.

48. A method for producing a thermal-sensitive element including a base substrate containing metal particles, comprising the steps of:

preparing a mixture containing metal ion and an α-hydrogen-containing alcohol;

impregnating the mixture into the base substrate; and irradiating the mixture impregnated in the base substrate with light so as to form the metal particles, wherein the metal ion is at least one member selected from the group consisting of gold, platinum, silver, copper, tin, rhodium, palladium and iridium.

49. A method according to claim 48, wherein the α-hydrogen-containing alcohol is a dihydric alcohol selected from the group consisting of ethylene glycol and propylene glycol.

50. A method according to claim 48, wherein the base substrate is a sheet or plate made of at least one material selected from the group consisting of paper, fabric and a porous material.

51. A composition comprising metal ion, an α-hydrogen-containing alcohol and a matrix substance, wherein the metal ion and the α-hydrogen-containing alcohol are reactive together upon irradiation with light, forming metal particles which irreversibly increase in size at room temperature due to cohesion, and wherein the metal ion is at least one member selected from the group consisting of gold, platinum, silver, copper, tin, rhodium, palladium and iridium.

* * * * *